US012757100B2

(12) United States Patent
Zhou et al.

(10) Patent No.: US 12,757,100 B2
(45) Date of Patent: Oct. 6, 2026

(54) FULL DUPLEX RELAY PROCEDURES

(71) Applicant: QUALCOMM Incorporated, San Diego, CA (US)

(72) Inventors: Yan Zhou, San Diego, CA (US); Hemant Saggar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/408,430

(22) Filed: Jan. 9, 2024

(65) Prior Publication Data

US 2024/0323801 A1 Sep. 26, 2024

Related U.S. Application Data

(60) Provisional application No. 63/492,150, filed on Mar. 24, 2023.

(51) Int. Cl.

*H04W 40/22* (2009.01)
*H04L 5/14* (2006.01)

(52) U.S. Cl.

CPC ............... *H04W 40/22* (2013.01); *H04L 5/14* (2013.01)

(58) Field of Classification Search

CPC ....... H04B 17/345; H04L 5/0073; H04L 5/14; H04W 24/10; H04W 40/22; H04W 72/02; H04W 72/04; H04W 72/12; H04W 72/25; H04W 72/40; H04W 72/50; H04W 92/16; H04W 92/18; H04W 92/20

See application file for complete search history.

(56) References Cited

U.S. PATENT DOCUMENTS

2021/0321250 A1* 10/2021 Ryu ........................ H04W 4/08
2021/0351838 A1* 11/2021 Zhang ................... H04L 5/0023
2021/0409936 A1* 12/2021 Kuo ...................... H04W 88/04
2023/0155711 A1* 5/2023 Zhang ................. H04W 72/541 455/63.1
2023/0269611 A1* 8/2023 Ren ....................... H04W 24/10 370/252
2023/0328564 A1* 10/2023 Bai ....................... H04W 24/10 370/252
2024/0333363 A1* 10/2024 Zhou ...................... H04B 7/088

* cited by examiner

*Primary Examiner* — Frank Duong

(74) *Attorney, Agent, or Firm* — Holland & Hart LLP/QUALCOMM Incorporated

(57) ABSTRACT

Methods, systems, and devices for wireless communications are described. A relay user equipment (UE) may transmit, to a network entity, a relay report message including information supporting full duplex relaying of reverse link signaling from the remote UE. Such a relay report message may include information that facilitates relaying of the reverse link communications while reducing or mitigating cross-link interference (CLI), self-interference (SI), or both, in a full duplex (FD) mode. For example, the relay report message may include information triggering beam sweeping, beam selection, resource selection, etc., for the relaying of the reverse link communications. In some examples, a network entity may configure sidelink UEs with an FD sidelink slot format that supports sidelink transmissions in the final symbol of a sidelink slot (e.g., instead of relying on one or more gap symbols).

30 Claims, 25 Drawing Sheets

FULL DUPLEX RELAY PROCEDURES

CROSS REFERENCE

The present Application for Patent claims the benefit of U.S. Provisional Patent Application No. 63/492,150 by Zhou et al., entitled "FULL DUPLEX RELAY PROCEDURES" and filed Mar. 24, 2023, which is assigned to the assignee hereof and is expressly incorporated by reference herein.

FIELD OF TECHNOLOGY

The following relates to wireless communications, including full duplex relay procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support full duplex relay procedures. For example, the described techniques provide for coordination and performance of full-duplex (FD) relaying by a relay user equipment (UE) for a remote UE and a network entity. The relay UE may transmit, to the network entity, a relay report message including information supporting full duplex relaying of reverse link signaling from the remote UE. Such a relay report message may include information that facilitates relaying of the reverse link communications while reducing or mitigating cross-link interference (CLI), self-interference (SI), or both. For example, the relay report message may include information triggering beam sweeping, beam selection, resource selection, etc., for the relaying of the reverse link communications. In some examples, a network entity may configure sidelink UEs with an FD sidelink slot format that supports sidelink transmissions in final symbols of sidelink slots (e.g., instead of relying on gap symbols).

A method for wireless communications at a first user equipment (UE) is described. The method may include transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, receiving, at the first UE while operating in the full duplex mode, a reverse link message for the network entity via the sidelink signaling from the second UE, and transmitting, by the first UE in accordance with the full duplex mode and the relay report, the reverse link message to the network entity via the uplink signaling while continuing to receive the sidelink signaling from the second UE.

An apparatus for wireless communications is described. The apparatus may include memory, a transceiver, and at least one processor of a first UE, the at least one processor coupled with the memory and the transceiver. The at least one processor may be configured to transmit, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, receive, at the first UE while operating in the full duplex mode, a reverse link message for the network entity via the sidelink signaling from the second UE, and transmit, by the first UE in accordance with the full duplex mode and the relay report, the reverse link message to the network entity via the uplink signaling while continuing to receive the sidelink signaling from the second UE.

Another apparatus for wireless communications at a first UE is described. The apparatus may include means for transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, means for receiving, at the first UE while operating in the full duplex mode, a reverse link message for the network entity via the sidelink signaling from the second UE, and means for transmitting, by the first UE in accordance with the full duplex mode and the relay report, the reverse link message to the network entity via the uplink signaling while continuing to receive the sidelink signaling from the second UE.

A non-transitory computer-readable medium storing code for wireless communications at a first UE is described. The code may include instructions executable by a processor to transmit, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, receive, at the first UE while operating in the full duplex mode, a reverse link message for the network entity via the sidelink signaling from the second UE, and transmit, by the first UE in accordance with the full duplex mode and the relay report, the reverse link message to the network entity via the uplink signaling while continuing to receive the sidelink signaling from the second UE.

Some examples of the method, apparatuses, and non-transitory computer-readable medium described herein may further include operations, features, means, or instructions for transmitting, via the relay report, a beam report including an indication of a set of multiple beams, where the set of multiple beams includes one or more beams for uplink transmission, one or more beams for sidelink transmission, or both, where a cross-link interference value corresponding to the one or more beams for sidelink transmission of the set of multiple beams satisfies a first threshold, and where a self-interference value corresponding to the one or more beams for uplink transmission of the set of multiple beams satisfies a second threshold, or any combination thereof.

Some examples of the method, apparatuses, and non-transitory computer-readable medium described herein may further include operations, features, means, or instructions for transmitting a measurement request message including an indication of a set of multiple candidate beams, candidate resources, or any combination thereof, for performing one or more channel quality measurements, cross-link interference measurements, or any combination thereof, where transmitting the beam report including the indication of the set of multiple beams may be based on transmitting the measurement request message.

Some examples of the method, apparatuses, and non-transitory computer-readable medium described herein may further include operations, features, means, or instructions for receiving, from the second UE, an indication of a sidelink resource and a sidelink beam selected by the second UE for transmitting the sidelink signaling to the first UE, where the relay report includes an indication of a candidate uplink resource or a candidate uplink beam for the first UE to use for transmitting the uplink signaling via an uplink resource that may be associated with the sidelink resource.

Some examples of the method, apparatuses, and non-transitory computer-readable medium described herein may further include operations, features, means, or instructions for receiving, from the network entity, an indication of an uplink resource and an uplink beam selected by the network entity for receiving the uplink signaling from the first UE and transmitting, to the second UE, an indication of a candidate sidelink beam or a candidate sidelink resource for the second UE to use for transmitting the sidelink signaling via a sidelink resource that may be associated with the uplink resource.

Some examples of the method, apparatuses, and non-transitory computer-readable medium described herein may further include operations, features, means, or instructions for transmitting, via the relay report, an indication of one or more sidelink measurement resources (e.g., allocated for transmission of sidelink reference signals by the second UE) for performing cross-link interference measurements by the network entity.

Some examples of the method, apparatuses, and non-transitory computer-readable medium described herein may further include operations, features, means, or instructions for transmitting, to the second UE, an indication of the one or more sidelink measurement resources or of sidelink beams via which the second UE may be to transmit sidelink reference signals associated with the cross-link interference measurements.

Some examples of the method, apparatuses, and non-transitory computer-readable medium described herein may further include operations, features, means, or instructions for transmitting, via the relay report, an indication to the network entity of one or more uplink beams to use for performing the cross-link interference measurements corresponding to the one or more sidelink measurement resources.

Some examples of the method, apparatuses, and non-transitory computer-readable medium described herein may further include operations, features, means, or instructions for receiving, from the network entity based on the relay report, a cross-link interference measurement report corresponding to cross-link interference generated by the second UE and selecting a sidelink receive beam and an uplink transmit beam based on having a low corresponding value in the cross-link interference measurement report, where transmitting the reverse link message via the uplink signaling while continuing to receive the sidelink signaling in accordance with the full duplex mode may be based on selecting the sidelink receive beam and the uplink transmit beam.

Some examples of the method, apparatuses, and non-transitory computer-readable medium described herein may further include operations, features, means, or instructions for transmitting, via the relay report, an indication that the first UE supports relaying the one or more reverse link messages in the full duplex mode, where the network entity allocates sidelink resources to the first UE and the second UE and allocates uplink resources to the UE based on the indication that the first UE supports relaying, where the sidelink resources and the uplink resources at least partially overlap in time according to the full duplex mode.

Some examples of the method, apparatuses, and non-transitory computer-readable medium described herein may further include operations, features, means, or instructions for transmitting, via the relay report, an indication of a quantity of sidelink grants corresponding to respective UEs of a set of multiple sidelink UEs including the second UE, each of the quantity of sidelink grants for sidelink resources that overlap at least partially in time with uplink resources corresponding to an uplink grant, where receiving the sidelink signaling and transmitting the uplink signaling may be based on the indication of the quantity of sidelink grants.

Some examples of the method, apparatuses, and non-transitory computer-readable medium described herein may further include operations, features, means, or instructions for transmitting, via the relay report for each sidelink grant of the quantity of sidelink grants, an indication of one or more parameter values including time and frequency resources, a transmit power, a beam identifier, a transmission configuration indicator state identifier, a rank, a precoding matrix, a multi-transmission reception point parameter value, or any combination thereof.

Some examples of the method, apparatuses, and non-transitory computer-readable medium described herein may further include operations, features, means, or instructions for receiving, from the network entity, control signaling scheduling periodic or aperiodic reporting indicating whether the first UE may be capable of supporting full duplex relaying, where transmitting the relay report may be based on receiving the control signaling.

Some examples of the method, apparatuses, and non-transitory computer-readable medium described herein may further include operations, features, means, or instructions for detecting, between an uplink transmission and a sidelink reception, that self-interference is below a threshold, where transmitting the relay report may be based on the detecting.

In some examples of the method, apparatuses, and non-transitory computer-readable medium described herein, transmitting the relay report may include operations, features, means, or instructions for multiplexing the relay report with an uplink data message via a physical uplink shared channel or with a control message via a physical uplink control channel.

Some examples of the method, apparatuses, and non-transitory computer-readable medium described herein may further include operations, features, means, or instructions for receiving, from the network entity, an indication of a full duplex relay application time and exiting the full duplex mode upon expiration of the full duplex relay application time after transmitting the relay report.

A method for wireless communications at a network entity is described. The method may include receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, transmitting an uplink grant to the first UE based on receiving the relay report, the uplink grant indicating uplink resources for the uplink signaling, the uplink resources at least partially overlapping in time with one or more sidelink resources for the sidelink signaling, and receiving, from the first UE via one or more of the uplink resources associated with the uplink grant, the uplink signaling including a reverse link message from the second UE for the network entity.

An apparatus for wireless communications is described. The apparatus may include memory, and at least one processor of a network entity, the at least one processor coupled with the memory. The at least one processor may be configured to receive, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, transmit an uplink grant to the first UE based on receiving the relay report, the uplink grant indicating uplink resources for the uplink signaling, the uplink resources at least partially overlapping in time with one or more sidelink resources for the sidelink signaling, and receive, from the first UE via one or more of the uplink resources associated with the uplink grant, the uplink signaling including a reverse link message from the second UE for the network entity.

Another apparatus for wireless communications at a network entity is described. The apparatus may include means for receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, means for transmitting an uplink grant to the first UE based on receiving the relay report, the uplink grant indicating uplink resources for the uplink signaling, the uplink resources at least partially overlapping in time with one or more sidelink resources for the sidelink signaling, and means for receiving, from the first UE via one or more of the uplink resources associated with the uplink grant, the uplink signaling including a reverse link message from the second UE for the network entity.

A non-transitory computer-readable medium storing code for wireless communications at a network entity is described. The code may include instructions executable by a processor to receive, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, transmit an uplink grant to the first UE based on receiving the relay report, the uplink grant indicating uplink resources for the uplink signaling, the uplink resources at least partially overlapping in time with one or more sidelink resources for the sidelink signaling, and receive, from the first UE via one or more of the uplink resources associated with the uplink grant, the uplink signaling including a reverse link message from the second UE for the network entity.

Some examples of the method, apparatuses, and non-transitory computer-readable medium described herein may further include operations, features, means, or instructions for receiving, via the relay report, an indication of a candidate uplink resource or a candidate uplink beam for the first UE to use for transmitting the uplink signaling via the one or more of the uplink resources, where receiving the uplink signaling includes receiving the uplink signaling via the candidate uplink resource or the candidate uplink beam.

Some examples of the method, apparatuses, and non-transitory computer-readable medium described herein may further include operations, features, means, or instructions for transmitting, to the first UE, an indication of an uplink resource and an uplink beam selected by the network entity for receiving the uplink signaling, where receiving the uplink signaling includes receiving the uplink signaling via the uplink resource or the uplink beam.

Some examples of the method, apparatuses, and non-transitory computer-readable medium described herein may further include operations, features, means, or instructions for receiving, via the relay report, an indication of one or more sidelink measurement resources allocated for transmission of sidelink reference signals by the second UE, for performing cross-link interference measurements by the network entity, receiving the sidelink reference signals via the one or more sidelink measurement resources, and performing one or more cross-link interference measurements based on receiving the sidelink reference signals.

Some examples of the method, apparatuses, and non-transitory computer-readable medium described herein may further include operations, features, means, or instructions for receiving, via the relay report, an indication of one or more beams associated with the one or more sidelink measurement resources.

Some examples of the method, apparatuses, and non-transitory computer-readable medium described herein may further include operations, features, means, or instructions for transmitting, to the first UE based on the relay report, a cross-link interference measurement report corresponding to cross-link interference associated with (e.g., generated by) signaling from the second UE.

Some examples of the method, apparatuses, and non-transitory computer-readable medium described herein may further include operations, features, means, or instructions for receiving, via the relay report, an indication that the first UE supports relaying the one or more reverse link messages in the full duplex mode, where the network entity allocates sidelink resources to the first UE and the second UE and allocates uplink resources to the first UE based on the indication that the first UE supports relaying, where the sidelink resources and the uplink resources at least partially overlap in time according to the full duplex mode.

Some examples of the method, apparatuses, and non-transitory computer-readable medium described herein may further include operations, features, means, or instructions for receiving, via the relay report, an indication of a quantity of sidelink grants corresponding to respective UEs of a set of multiple sidelink UEs including the second UE, each of the quantity of sidelink grants for sidelink resources that overlap at least partially in time with uplink resources corresponding to an uplink grant, where receiving the uplink signaling may be based on the indication of the quantity of sidelink grants.

Some examples of the method, apparatuses, and non-transitory computer-readable medium described herein may further include operations, features, means, or instructions for transmitting, to the first UE, control signaling scheduling periodic or aperiodic reporting indicating whether the first UE may be capable of supporting full duplex relaying, where receiving the relay report may be based on transmitting the control signaling.

A method for wireless communications at a UE is described. The method may include transmitting a full duplex capability report indicating that the UE is capable of supporting a full duplex mode of communication, receiving, based on transmitting the full duplex capability report, control signaling indicating a sidelink resource pool including a set of multiple sidelink symbols, where each sidelink symbol of the set of multiple sidelink symbols corresponds to a full duplex format, and transmitting sidelink signaling via one or more symbols of the set of multiple sidelink symbols according to the full duplex format.

An apparatus for wireless communications is described. The apparatus may include memory, a transceiver, and at least one processor of a first UE, the at least one processor coupled with the memory and the transceiver. The at least one processor may be configured to transmit a full duplex capability report indicating that the UE is capable of supporting a full duplex mode of communication, receive, based on transmitting the full duplex capability report, control signaling indicating a sidelink resource pool including a set of multiple sidelink symbols, where each sidelink symbol of the set of multiple sidelink symbols corresponds to a full duplex format, and transmit sidelink signaling via one or more symbols of the set of multiple sidelink symbols according to the full duplex format.

Another apparatus for wireless communications at a UE is described. The apparatus may include means for transmitting a full duplex capability report indicating that the UE is capable of supporting a full duplex mode of communication, means for receiving, based on transmitting the full duplex capability report, control signaling indicating a sidelink resource pool including a set of multiple sidelink symbols, where each sidelink symbol of the set of multiple sidelink symbols corresponds to a full duplex format, and means for transmitting sidelink signaling via one or more symbols of the set of multiple sidelink symbols according to the full duplex format.

A non-transitory computer-readable medium storing code for wireless communications at a UE is described. The code may include instructions executable by a processor to transmit a full duplex capability report indicating that the UE is capable of supporting a full duplex mode of communication, receive, based on transmitting the full duplex capability report, control signaling indicating a sidelink resource pool including a set of multiple sidelink symbols, where each sidelink symbol of the set of multiple sidelink symbols corresponds to a full duplex format, and transmit sidelink signaling via one or more symbols of the set of multiple sidelink symbols according to the full duplex format.

In some examples of the method, apparatuses, and non-transitory computer-readable medium described herein, transmitting the sidelink signaling may include operations, features, means, or instructions for transmitting the sidelink signaling via a final symbol of the set of multiple sidelink symbols.

In some examples of the method, apparatuses, and non-transitory computer-readable medium described herein, transmitting the sidelink signaling may include operations, features, means, or instructions for transmitting the sidelink signaling during a first symbol preceding a second symbol that may be adjacent to the first symbol and allocated for a physical sidelink feedback channel.

Some examples of the method, apparatuses, and non-transitory computer-readable medium described herein may further include operations, features, means, or instructions for receiving sidelink feedback signaling via the second symbol based on the full duplex mode.

A method for wireless communications at a network entity is described. The method may include receiving, from a UE a full duplex capability report indicating that the UE is capable of supporting a full duplex mode of communication and transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

An apparatus for wireless communications is described. The apparatus may include memory, and at least one processor of a network entity, the at least one processor coupled with the memory. The at least one processor may be configured to receive, from a UE a full duplex capability report indicating that the UE is capable of supporting a full duplex mode of communication and transmit, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

Another apparatus for wireless communications at a network entity is described. The apparatus may include means for receiving, from a UE a full duplex capability report indicating that the UE is capable of supporting a full duplex mode of communication and means for transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

A non-transitory computer-readable medium storing code for wireless communications at a network entity is described. The code may include instructions executable by a processor to receive, from a UE a full duplex capability report indicating that the UE is capable of supporting a full duplex mode of communication and transmit, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

DETAILED DESCRIPTION

Figure 1:
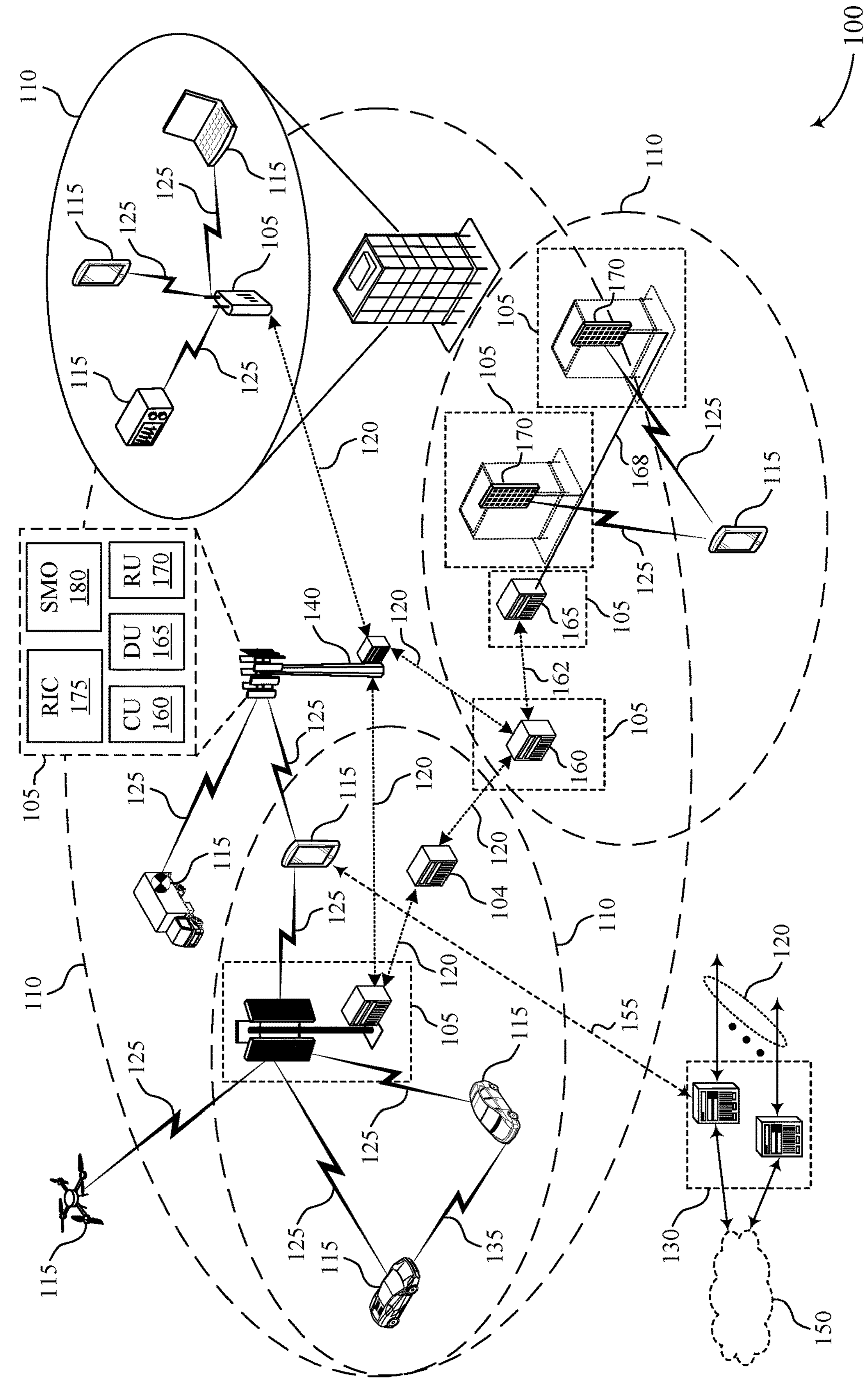
FIG. 1 shows an example of a wireless communications system that supports full duplex relay procedures in accordance with one or more aspects of the present disclosure.

One or more user equipments (UEs) may perform sidelink communications. A network entity may serve one or multiple sidelink UEs, and some sidelink UEs may be located outside of coverage of the network entity (e.g., remote to the network entity). For example, a first UE may be located close to the network entity, and a second UE may be located at the edge of a coverage area (e.g., both UEs may operate in a first mode of sidelink communications in which the network entity schedules the first UE and the second UE with sidelink resources, which may be referred to as Mode 1). In some examples, the second UE may be located outside of the coverage area (e.g., the UEs may communicate according to second mode of sidelink communication in which case the first UE and the second UE may negotiate use of available sidelink resources without scheduling from the network entity, which may be referred to as Mode 2). In either case, wireless communications between the network entity and the remote UE (e.g., the second UE) may be unreliable. In some examples, the closer UE (e.g., the first UE) may be capable of supporting full duplex (FD) communications. The first UE (e.g., a relay UE) may perform relaying of reverse link communications (e.g., communications from the remote UE for the network entity, received from the remote UE via sidelink signaling) to the network entity via uplink signaling in a full duplex mode. Such full duplex relaying at the first UE may improve the link performance, reduce the latency of communication, or improve end-to-end throughput between the second UE and the network entity as compared to half duplex relaying at the first UE, among other possible benefits. However, such full duplex relaying may result in cross-link interference (CLI) (e.g., between the remote UE and the network entity), self-interference (SI) at the relay UE (e.g., due to the full duplex signaling), or both.

As described herein, the relay UE may transmit, to the network entity, a relay report message including information supporting full duplex relaying of reverse link signaling from the remote UE. As used herein, reverse link refers to a communication direction that is to the network (e.g., to a network entity). A reverse link communication (e.g., transmission, message, signaling) from a remote UE to a network entity may traverse multiple links, including, for example, a sidelink between the remote UE and a relay UE and an uplink between the relay UE and the network entity. Also, as used herein, forward link refers to a communication direction that is from the network (e.g., from a network entity). A forward link communication (e.g., transmission, message, signaling) to a remote UE from a network entity may traverse multiple links, including, for example, a downlink between the network entity and a relay UE and a sidelink between the relay UE and a remote UE. A remote UE may sometimes alternatively be referred to herein as a second UE, and a relay UE may sometimes alternatively be referred to herein as a first UE.

A relay report message as described herein may include information that facilitates relaying of the reverse link communications while reducing or mitigating CLI, SI, or both. For example, the relay report message may include information triggering beam sweeping, beam selection, resource selection, etc., for the relaying of the reverse link communications. In some examples, the relay report message may include an indication of uplink resources and beams for the uplink signaling that will result in reduced or negligible CLI and SI. The relay UE may receive an indication from the remote UE of resources and beams used by the remote UE and may indicate in the relay report message suggested resources and beams for the network entity to use or assign to reduce CLI and SI. In some examples, the relay UE may receive an indication from the network entity of the resources and beam that the UE is to use for uplink signaling, and may transmit, to the remote UE, an indication of sidelink resources and a beam that the remote UE is to use for the sidelink signaling to the relay UE. In some examples, the relay UE may transmit, via the relay report message, an indication of one or more configured CLI measurement resources (e.g., already configured at the remote UE) that the network entity may use to measure CLI from the remote UE. In some examples, the relay UE may configure the remote UE with one or more CLI measurement resources, and then may indicate the configured CLI measurement resources to the network entity. The relay UE may transmit the relay report to the network entity via a report scheduled by the network entity (e.g., a periodic, semi-persistent, aperiodic report), an event triggered report, a UE autonomous report, a physical uplink control channel (PUCCH), or a physical uplink shared channel (PUSCH). Based on receiving the relay report, the network entity may request that the relay UE enter a relay mode (e.g., full duplex, half duplex) after an application time relative to the relay report. In some cases, the relay UE may exit a full duplex relay mode after an application time relative to an acknowledgement to the relay report.

In some examples, sidelink UEs may report their FD capabilities, and the network may configure the UEs with a sidelink resource pool where slots of the sidelink resource pool are configured according to an FD sidelink slot format supporting transmission of sidelink signaling via a final symbol of each slot. In some cases, some symbols of the sidelink slot may not be assigned to sidelink communications. In such cases, the FD sidelink slot format may support transmission of sidelink signaling via a final symbol of the one or more sidelink symbols within the sidelink slot.

Aspects of the disclosure are initially described in the context of wireless communications systems. Aspects of the disclosure are additionally illustrated with reference to timing diagrams, slot configurations, and process flows. Aspects of the disclosure are further illustrated by and described with reference to apparatus diagrams, system diagrams, and flowcharts that relate to full duplex relay procedures.

FIG. 1 shows an example of a wireless communications system 100 that supports full duplex relay procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support full duplex relay procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some UEs (e.g., V2X devices) may experience sufficient space to improve spatial isolation between transmission and reception panels and arrays. SI may be reduced due to large beamforming gain and more antenna elements per panel or array in some frequency bands.

In some cases, one or more UEs 115 may be remote (e.g., at an edge or outside of a coverage area 110). Techniques described herein for relaying reverse link signaling between remote UEs 115 and network entities 105 may support UEs 115 operating in Mode 1 or Mode 2. For example, a remote UE 115 outside of network coverage may improve coverage extensions based on techniques described herein.

In some examples, a relay UE 115 may transmit, to a network entity 105, a relay report message including information supporting full duplex relaying of reverse link signaling from a remote UE 115 that is outside of a coverage area 110 associated with the network entity 105. For example, the message may include an indication of uplink resources and beams for the uplink signaling that will result in reduced or negligible CLI and SI. The relay UE 115 may receive an indication from the remote UE 115 of resources and beams used by the remote UE 115 and may indicate in the relay report message suggested resources and beams for the network entity 105 to use/assign to reduce CLI and SI. In some examples, the relay UE 115 may receive an indication from the network entity of the resources and beam that the relay UE 115 is to use for uplink signaling, and may transmit, to the remote UE 115, an indication of sidelink resources and a beam that the remote UE 115 is to use for the sidelink signaling to the relay UE 115. In some examples, the relay UE may transmit, via the relay report message, an indication of one or more configured CLI measurement resources (e.g., already configured at the remote UE 115) that the network entity may use to measure CLI from the remote UE 115. In some examples, the relay UE 115 may configure the remote UE 115 with one or more CLI measurement resources, and then indicate the configured CLI measurement resources to the network entity 105.

Figure 2:
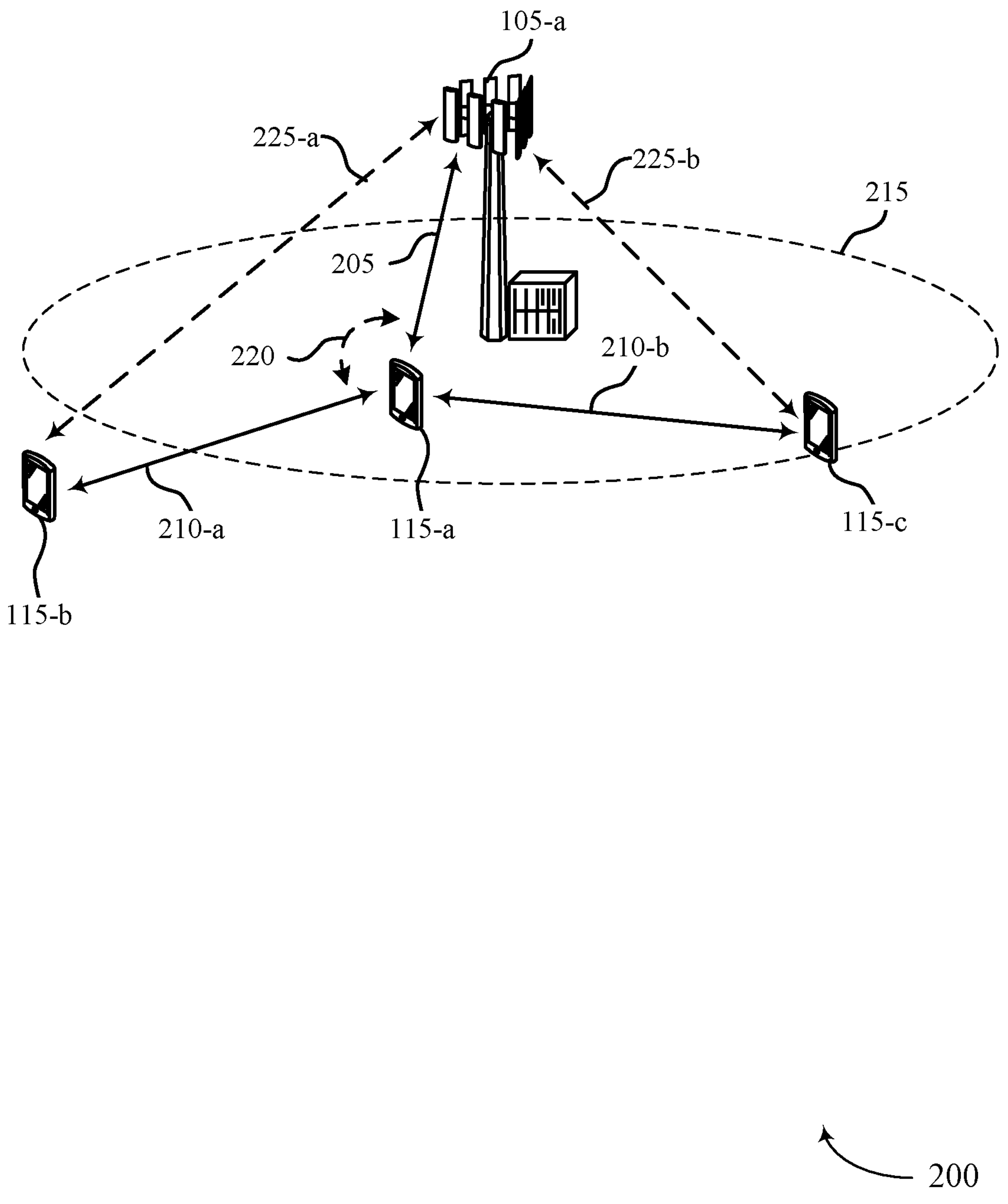
FIG. 2 shows an example of a wireless communications system that supports full duplex relay procedures in accordance with one or more aspects of the present disclosure.

FIG. 2 shows an example of a wireless communications system 200 that supports full duplex relay procedures in accordance with one or more aspects of the present disclosure. The wireless communication system may include a network entity 105-*a*, a relay UE 115-*a*, a remote UE 115-*b*, and a remote UE 115-*c*, which may be examples of corresponding devices as described herein, including with reference to FIG. 1. The relay UE 115-*a* may communicate with the network entity 105-*a* via a cellular communication link 205 (e.g., a Uu link). The relay UE 115-*a* may communicate with the remote UE 115-*b* and the remote UE 115-*c* via sidelink communication links 210 (e.g., a PC5 link). In some implementations, the wireless communications system 200 may include multiple relay UEs 115-*a*, multiple remote UEs 115, or any combination thereof.

The network entity 105-*a* may provide coverage over a geographic coverage area 215. The relay UE 115-*a* may be located within the geographic coverage area 215, and the remote UE 115-*b* may be located outside of the geographic coverage area 215. In some examples, the relay UE 115-*a* and the remote UE 115-*b* may perform sidelink communications according to Mode 2. In some cases, the remote UE 115-*c* may be located within the geographic coverage area 215, in which case the relay UE 115-*a* and the remote UE 115-*c* may communicate with each other according to Mode 1. Additionally, or alternatively, in some cases, the relay UE 115-*a*, the remote UE 115-*b*, and the remote UE 115-*c* may communicate according to Mode 2, even if the remote UE 115-*b*, the remote UE 115-*c*, or both are located within the geographic coverage area 215. In some other cases, the remote UE 115-*c* may be located at a cell edge of a geographic coverage area 215.

The relay UE 115-*a* may facilitate communications between the network entity 105-*a* and the remote UE 115-*b*, communications between the network entity 105-*a* and the remote UE 115-*c*, or both. In some implementations, the relay UE 115-*a* may act as a relay device (e.g., may receive a signal from one device within the wireless communications system 200 and may transmit the received signal to another device within the wireless communications system 200). Further, the relay UE 115-*a* may support full-duplex (FD) relay operations (e.g., may support simultaneous transmission and reception of signals). For example, the relay UE 115-*a* may receive a signal from a remote UE (e.g., the remote UE 115-*b* or the remote UE 115-*c*) and, based on receiving the signal from the remote UE, may transmit the signal to the network entity 105-*a* while simultaneously receiving signaling from the remote UE.

In some examples, the relay UE 115-*a* may support FD relaying between the network entity 105-*a* and the remote UE 115-*b*, which may be outside of the geographic coverage area 215 of the network entity 105-*a*. The relay UE 115-*a* may operate as a relay device to facilitate communications between the remote UE 115-*b* and the network entity 105-*a*. In such examples, the relay UE 115-*a* may receive signals from the remote UE 115-*b* via sidelink 210-*a* and may transmit signals to the network entity 105-*a* via cellular communication link 205. The relay UE 115-*a* and the remote UE 115-*b* may operate in sidelink mode 2. In sidelink mode 2, the remote UE 115-*b* may determine one or more beams and corresponding resources for sidelink communications with the relay UE 115-*a* based on sensing performed by the remote UE 115-*b*, and the network entity 105-*a* may determine and schedule one or more beams and corresponding resources for uplink communications between the relay UE 115-*a* and the network entity 105-*a*. The relay UE 115-*a* may simultaneously receive signals from the remote UE 115-*b* and transmit signals to the network entity 105-*a* in accordance with FD relay operations.

In some other examples, the relay UE 115-*a* may support FD relaying between the network entity 105-*a* and the remote UE 115-*c*, which may be within the geographic coverage area 215 of the network entity 105-*a* or on a cell edge of the geographic coverage area 215 of the network entity 105-*a*. The relay UE 115-*a* may operate as a relay device to improve communication throughput between the remote UE 115-*c* and the network entity 105-*a*. In such examples, the relay UE 115-*a* may receive signals from the remote UE 115-*c* via sidelink 210-*b* and may transmit signals to the network entity 105-*a* via cellular communication link 205 (e.g., via uplink). The relay UE 115-*a* and the remote UE 115-*c* may operate in sidelink mode 1. In sidelink mode 1, the network entity 105-*a* may determine and schedule one or more beams and corresponding resources for sidelink communications between the remote UE 115-*c* and the relay UE 115-*a*, as well as determine or schedule one or more beams and corresponding resources for uplink communications between the relay UE 115-*a* and the network entity 105-*a*. The relay UE 115-*a* may simultaneously receive signals from the relay UE 115-*a* and transmit signals to the network entity 105-*a* in accordance with FD relay operations.

In some cases, when operating as an FD relay, the relay UE 115-*a* may experience non-negligible SI 220. For example, when the relay UE 115-*a* is communicating with the remote UE 115-*b* via sidelink mode 2, the sidelink beams determined by the remote UE 115-*b* and the uplink beams determined by the network entity 105-*a* may not be selected to support FD operations (e.g., may result in non-negligible SI 220, CLI 225-*a*, or both). As such, the relay UE 115-*a* may experience non-negligible SI 220 when performing FD operations using the aforementioned beams (e.g., due to reflection of signals to the relay UE 115-*a*, due to the uplink and sidelink beams being transmitted and received using antenna panels of the relay UE 115-*a* that are in close proximity, etc.). For example, the relay UE 115-*a* may sense the uplink transmission being performed via the cellular communication link 205 while monitoring for the sidelink communications from the remote UE 115-*b* via the sidelink 210-*a*. Further, the sidelink transmissions from the remote UE 115-*b* may introduce CLI 225-*a* at the network entity 105-*a* (e.g., the network entity 105-*a* may sense sidelink signaling from the remote UE 115-*b* to the relay UE 115-*a* while the network entity 105-*a* is monitoring for uplink signaling via the cellular communication link 205 with the relay UE 115-*a* due to the FD operation at the relay UE 115-*a*).

In some examples, when the relay UE 115-*a* is communicating with the remote UE 115-*c* via sidelink mode 1, FD relay operations may be infeasible at the relay UE 115-*a* due to non-negligible SI 220 experienced at the relay UE 115-*a* (e.g., due to reflection of signals to the relay UE 115-*a*, due to the uplink and sidelink beams being transmitted using antenna panels of the relay UE 115-*a* that are in close proximity, etc.). Further, the sidelink transmissions from the remote UE 115-*b* may introduce CLI 225-*b* at the network entity 105-*a*. In such cases, it may be desirable to coordinate the beams and resources used for sidelink transmissions between the relay UE 115-*a* and the remote UE 115-*b* or the remote UE 115-*c* and uplink transmissions between the relay UE 115-*a* and the network entity 105-*a* in a manner that reduces the non-negligible SI 220 and CLI 225 at the relay UE 115-*a*.

In some examples, the relay UE 115-*a* may determine beams and corresponding resources for performing FD relay operations between a remote UE (e.g., a remote UE 115-*b* or a remote UE 115-*c*) and a network entity 105-*a*. The relay UE 115-*a* may determine one or more beams and corresponding resources for performing sidelink communications with the remote UE and may indicate the beams and resources to the remote UE. Likewise, the relay UE 115-*a* may determine one or more beams and corresponding resources for performing uplink communications with the network entity 105-*a* and may indicate the beams and resources to the network entity 105-*a*. The beams and resources determined by the relay UE 115-*a* may reduce the non-negligible SI 220 experienced at the relay UE 115-*a* and CLI 225 experienced at the network entity 105-*a*. Further, in the case where the relay UE 115-*a* is communicating with the remote UE 115-*c* via sidelink mode 1, having the UE determine and signal beams and resources for sidelink communications between the relay UE 115-*a* and the remote UE 115-*c* may result in reduced signaling overhead (e.g., instead of the network entity 105-*a* determining resources for sidelink communications between the relay UE 115-*a* and the remote UE 115-*c*).

To reduce the SI experienced at the relay UE 115-*a*, the relay UE 115-*a* may send, to the remote UE 115-*c* or the network entity 105-*b*, a recommendation of one or more beams for communications between the relay UE 115-*a* and the remote UE 115-*b* or the network entity 105-*a*. For example, the relay UE 115-*a* may send a recommendation of one or more sidelink transmission beams to the remote UE 115-*b*, a recommendation of one or more uplink beams to the network entity 105-*b*, or both. Such a recommendation by the relay UE 115-*a* may be based on the relay UE 115-*a* receiving an indication of one or more beams and resources selected by the network entity 105-*a* or the remote UE 115-*b*. In some examples, the remote UE 115-*b* may select one or more beams and resources for performing sidelink communications with the relay UE 115-*a* and may indicate (e.g., in a report) the one or more beams and resources to the relay UE 115-*a*. Based on the report, the relay UE 115-*a* may determine one or more beams for performing uplink communications with the network entity 105-*b* based on the one or more beams being associated with a low SI, CLI, or both, on the resources indicated by the remote UE 115-*b*. The relay UE 115-*a* may send, to the network entity 105-*a*, a recommendation of a beam to use for uplink communications on the indicated resource between the relay UE 115-*a* and the network entity 105-*a*. In some other examples, the network entity 105-*a* may select one or more beams and resources for performing uplink communications with the relay UE 115-*a* and may indicate (e.g., in a report) the one or more beams and resources to the relay UE 115-*a*. Based on the report, the relay UE 115-*a* may determine one or more beams for performing sidelink communications with the remote UE 115-*b* based on the one or more beams being associated with a low SI, CLI, or both, on the resources indicated by the network entity 105-*a*. The relay UE 115-*a* may send, to the remote UE 115-*b*, a recommendation of a beam to use for communications on the indicated resource between the relay UE 115-*a* and the remote UE 115-*b*.

Figure 3:
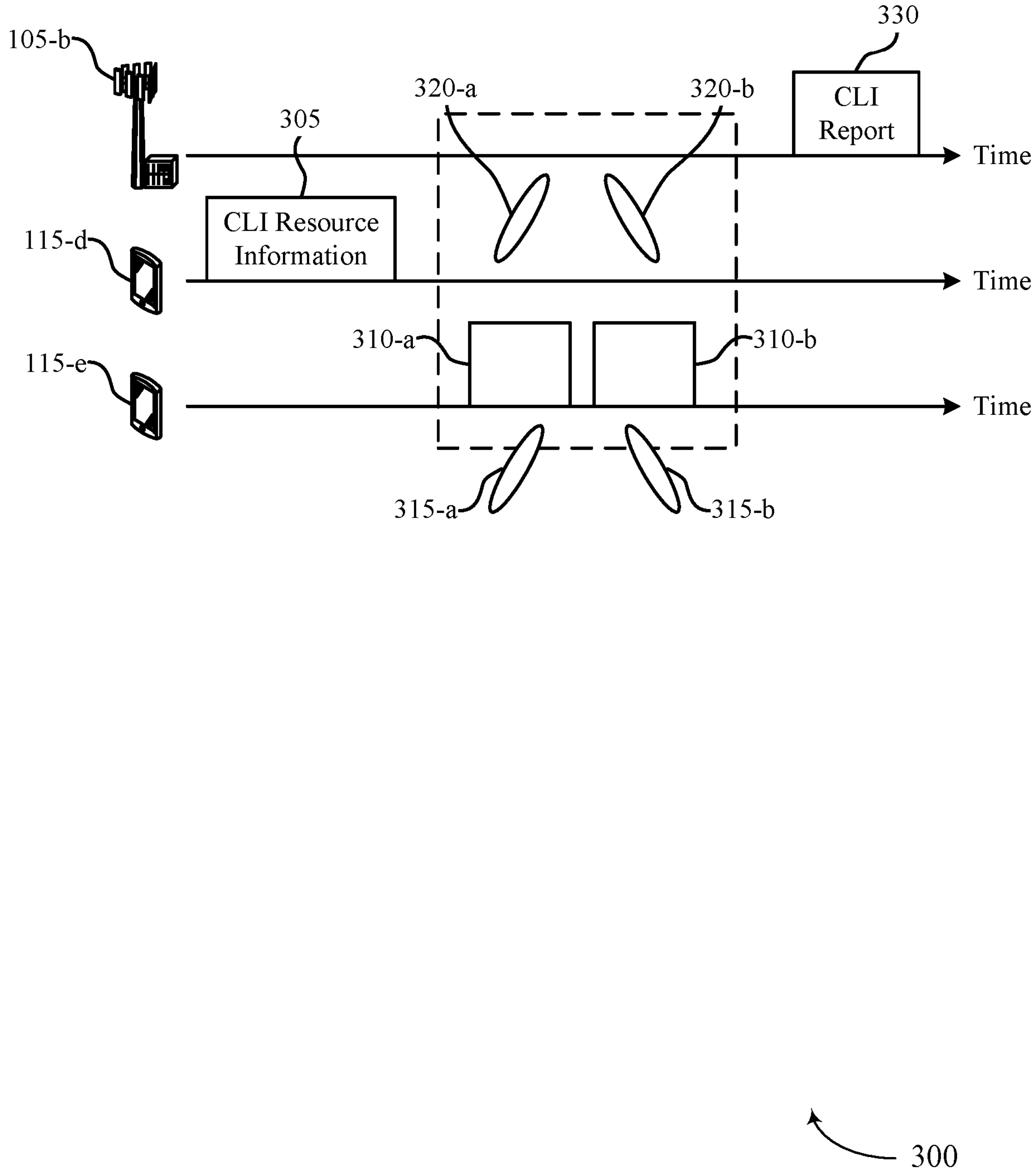
FIG. 3 shows an example of a timing diagram that supports full duplex relay procedures in accordance with one or more aspects of the present disclosure.

FIG. 3 shows an example of a timing diagram 300 that supports full duplex relay procedures in accordance with one or more aspects of the present disclosure. The timing diagram 300 may be implemented by aspects of the wireless communications system 100 and the wireless communications system 200 as described with reference to FIGS. 1 and 2. For instance, in the example of FIG. 3, a relay UE 115-*d* may be in communications with a network entity 105-*b* and a remote UE 115-*e*, which may be examples of corresponding devices as described herein, including with reference to FIGS. 1 and 2. For example, the remote UE 115-*e* may be outside of a geographic coverage area 215 associated with a network entity 105-*b* and may perform sidelink communications with the relay UE 115-*d* according to Mode 2. The relay UE 115-*d* may determine beams and corresponding resources for performing FD relay operations between a remote UE 115-*e* and a network entity 105-*b*. Because of the presence of SI at the relay UE 115-*d* and CLI at the network entity 105-*b* when operating as an FD relay device, the relay UE 115-*d* may coordinate the beams and resources to reduce interference in the wireless communications system.

In some examples, the relay UE 115-*d* may facilitate CLI measurements by the network entity 105-*b* to determine beams and resources for performing FD relay operations. To measure CLI from the remote UE 115-*e* to the network entity 105-*b*, the relay UE 115-*d* may provide remote UE transmit beam measurement information (e.g., remote-UE-to-gNB CLI measurement information) to the network entity 105-*b*. For example, utilizing or configuring additional sidelink measurement resources, the relay UE 115-*d* may inform the network entity 105-*b* (e.g., may transmit an indication or instruction via the CLI resource information 305) to measure CLI via existing sidelink reference signal occasions (e.g., measurement resource 310-*a* and measurement resource 310-*b*) for different sidelink transmit beams (e.g., sidelink beam 315-*a* and sidelink beam 315-*b*) used for transmissions from the remote UE 115-*e* to the relay UE 115-*d* for sidelink beam support. For example, the remote UE 115-*e* may transmit sidelink reference signals using the sidelink beam 315-*a* via the measurement resource 310-*a*, and using the sidelink beam 315-*b* via the measurement resource 310-*b* for sidelink beam support procedures. The relay UE 115-*d* may transmit CLI resource information 305 to the network entity 105-*b* indicating the measurement resource 310-*a* and the measurement resource 310-*b* (e.g., via which the remote UE 115-*e* will transmit sidelink reference signals for CLI measurements). Based on receiving the CLI resource information, the network entity 105-*b* may measure the measurement resources 310 (e.g., using the beam 320-*a* and the beam 320-*b* for the measurement resource 310-*a* and the measurement resource 310-*b*, respectively) to determine a CLI generated by the remote UE 115-*e* when communicating with the relay UE 115-*d* using the sidelink beams 315.

In some cases, the relay UE 115-*d* may send a request to the remote UE 115-*e* to transmit dedicated sidelink reference signals (e.g., for the network entity 105-*b*) with different sidelink transmitting beams. The relay UE 115-*d* may then inform the network entity 105-*b* (e.g., via the CLI resource information 305) to measure the CLI of those dedicated sidelink reference signal occasions. In some cases, the remote UE 115-*e* may transmit sidelink signaling or sidelink data (e.g., via a PSCCH or a PSSCH) instead of sidelink reference signals via the measurement resources 310. In such cases, the network entity 105-*b* may measure the CLI. The network entity 105-*b* may perform the CLI measurement by measuring a received signal strength, a received signal power, a received power of reference signals contained within the PSCCH or the PSSCH, or any combination thereof.

The CLI resource information 305 (e.g., indicating existing CLI measurement resources 310, or new dedicated CLI measurement resources assigned to the remote UE 115-*e*, or both) may be transmitted to the relay UE 115-*d*, the network entity 105-*b*, or both, via uplink control information (UCI), a medium access control (MAC) control element (MAC-CE), or radio resource control (RRC) signaling, among other examples.

For each sidelink reference signal occasion (e.g., for each measurement resource 310), the relay UE 115-*d* may recommend a corresponding uplink receive beam (e.g., a gNB Uu receive beam, such as the beam 320-*a* and the beam 320-*b*) for beam measurement. The relay UE 115-*d* may indicate such recommendations via the CLI resource information 305.

Based on receiving the CLI resource information 305 from the relay UE 115-*d*, the network entity 105-*b* may measure CLI of the measurement resources 310. To support FD relay beam selection by the relay UE 115-*d*, the network entity 105-*b* may transmit a CLI report 330 to the relay UE 115-*d*. The CLI report 330 may include, for example, a reference signal received power (RSRP) or a reference signal strength indicator (RSSI) for each CLI measurement resource (e.g., for each measurement resource 310). The relay UE 115-*d* may filter out (e.g., refrain from selecting) uplink and sidelink FD beam pairs associated with (e.g., that would cause) a non-negligible CLI, based on receiving the CLI report 330. The CLI report 330 may be transmitted to the relay UE 115-*d* via downlink control information (DCI), MAC-CE, or RRC signaling.

Figure 4:
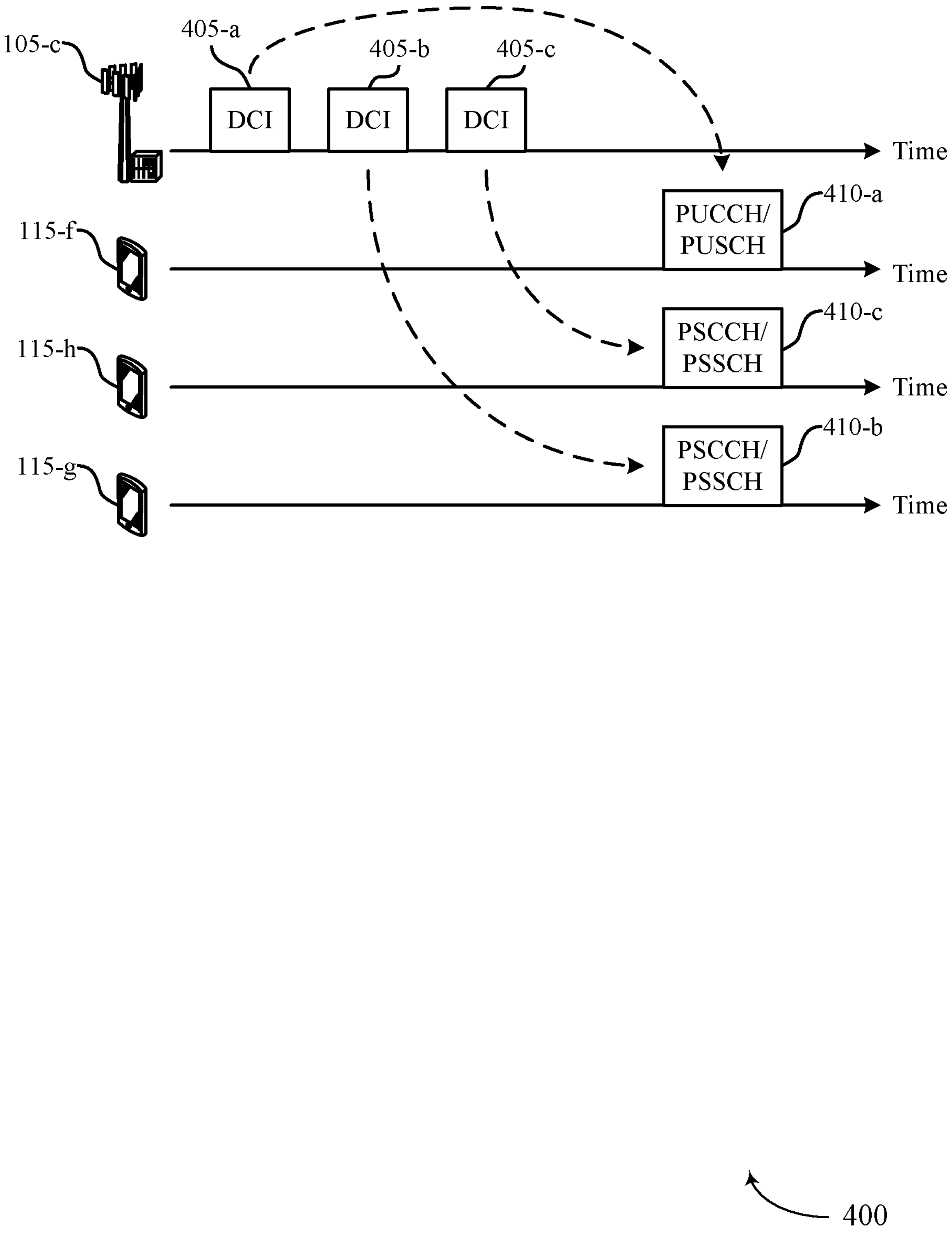
FIG. 4 shows an example of a timing diagram that supports full duplex relay procedures in accordance with one or more aspects of the present disclosure.

FIG. 4 shows an example of a timing diagram 400 that supports full duplex relay procedures in accordance with one or more aspects of the present disclosure. The timing diagram 400 may be implemented by aspects of the wireless communications system 100 and the wireless communications system 200 as described with reference to FIGS. 1 and 2. For instance, in the example of FIG. 4, a relay UE 115-*f* may be in communications with a network entity 105-*c*, a remote UE 115-*g*, and a remote UE 115-*h*, which may be examples of corresponding devices as described herein, including with reference to FIGS. 1 and 2. For example, the relay UE 115-*f* may be an example of the relay UE 115-*a*, the remote UE 115-*g* may be an example of the remote UE 115-*b*, and the remote UE 115-*h* may be an example of the remote UE 115-*c*. The remote UE 115-*g* and the remote UE 115-*h* may be within a geographic coverage area 215 associated with a network entity 105-*c* and may perform sidelink communications with the relay UE 115-*f* according to Mode 1.

The relay UE 115-*f* may transmit assistance information to the network entity 105-*c*. The assistance information may include an indication of FD relay feasibility between a remote UE 115-*g*, a remote UE 115-*h*, and a network entity 105-*b* (e.g., may indicate whether FD remote-UE-to-gNB relay is feasible). The relay UE 115-*f* may transmit the feasibility information to the network entity 105-*c* to assist the network entity 105-*c* with the scheduling of resources for FD operations. The relay UE 115-*f* may determine FD relay feasibility based on a SI measurement (e.g., by measuring uplink traffic transmitted by the relay UE 115-*f* or one or more uplink reference signals transmitted by the relay UE 115-*f*), based on a CLI measurement at the network entity 105-*c*, or any combination thereof. If the relay UE 115-*f* determines that FD relay between the remote UE 115-*g*, the remote UE 115-*h*, and the network entity 105-*b* is feasible, the relay UE 115-*f* may include a recommendation of a number (e.g., quantity) of sidelink grants in the assistance information transmitted to the network entity 105-*c*. The quantity) of sidelink grants may correspond to a quantity of remote UEs 115-capable of supporting FD operations (e.g., may transmit a physical sidelink control channel (PSCCH) or a physical sidelink shared channel (PSSCH) that may be full duplexed with a physical uplink control channel (PUCCH) or a physical uplink shared channel (PUSCH)).

Based on receiving the recommendation from the relay UE 115-*f*, the network entity 105-*c* may provide a quantity of downlink control information (DCI) 405 corresponding to the recommended number of sidelink grants. For example, FD relaying may be possible for both the remote UE 115-*g* and the remote UE 115-*h*. Thus, the network entity 105-*c* may transmit a DCI 405-*a* granting uplink resources 410-*a* (e.g., via a PUCCH or PUSCH) to the relay UE 115-*f*. The network entity 105-*c* may also provide a DCI 405-*b* granting sidelink resources (e.g., on a PSCCH or a PSSCH) for receiving sidelink signaling from the remote UE 115-*g* in a full duplex mode, and a DCI 405-*c* for receiving sidelink signaling (e.g., on a PSCCH or a PSSCH) from the remote UE 115-*h* in a full duplex mode. The network entity 105-*c* may grant the uplink resources 410-*a*, the resources 410-*b*, and the resources 410-*c* to overlap at least partially in time, supporting full duplex relaying by the relay UE 115-*f*, based on the assistance information indicating that FD mode is supported by the relay UE 115-*f* for two remote UEs 115 (e.g., a request for two sidelink grants overlapping with the uplink grant).

In some examples, the relay UE 115-*f* may also recommend scheduling information for the sidelink grants (e.g., DCIs 405-*b* and 405-*c*). The scheduling information may be defined per requested grant. The scheduling information for the sidelink grants may include candidate or proposed sidelink time resources, sidelink frequency resources, sidelink transmission timing, sidelink transmission power, sidelink beam ID, transmission configuration indicator (TCI) state ID, rank, precoding matrix, a multiple transmission and reception point (mTRP) scheme for the resources associated with the sidelink grants, or any combination thereof. The scheduling information for the sidelink grants may be associated with DCI 405-*b* and DCI 405-*c*. In some implementations, the DCI 405-*b* may have different scheduling information compared to the scheduling information corresponding to the DCI 405-*c*.

The sidelink time and frequency resources corresponding to the sidelink grants (e.g., DCI 405-*b* and DCI 405-*c*) may be relative to the allocated resources for the uplink grant (e.g., DCI 405-*a*). The relay UE 115-*f* may recommend, for each of the resourced sidelink grants, whether the sidelink frequency resources fully overlap, partially overlap, or do not overlap with the uplink frequency resources. In the instance where the sidelink frequency resources and the uplink frequency resources partially overlap, the scheduling information for the sidelink grants may further include an indication of the allowed amount of overlap between the sidelink frequency resources and the uplink frequency resources (e.g., a quantity of resources such as symbols or slots, a time duration, or the like). In the instance where the sidelink frequency resources and the uplink frequency resources do not overlap, the relay UE 115-*f* may further indicate a guard band between the sidelink frequency resources and the uplink frequency resources.

The sidelink transmission timing, sidelink transmission power, beam ID, transmission configuration indicator (TCI) ID, rank, precoding matrix, the multiple transmission and reception point (mTRP) scheme for the resources associated with the sidelink grants, or any combination thereof may be defined per sidelink grant (e.g., per DCI 405). In some examples, sidelink transmission timing may be adjusted such that the corresponding sidelink receive timing is aligned with the uplink transmission timing at the relay UE 115-*f* (e.g., to mitigate SI). In some cases, the network entity 105-*c* and the relay UE 115-*f* may exchange indications of such parameters (e.g., via the assistance information transmitted by the relay UE 115-*f*, the DCIs 405, or any combination thereof), as an extension of sidelink Mode 1 procedures and signaling (e.g., to allow the network entity 105-*c* to control such parameter values).

If the relay UE 115-*f* determines that FD relay between the remote UE 115-*g*, the remote UE 115-*h*, or both, and the network entity 105-*b* is feasible, the relay UE 115-*f* may also recommend scheduling information for the uplink grant (e.g., DCI 405-*a*) to limit SI at the relay UE 115-*f* to a tolerable level. The scheduling information for the uplink grant may include proposed or candidate uplink time resources, uplink frequency resources, uplink transmission power, uplink timing advance values, or any combination thereof. The scheduling information for the uplink resources may also include uplink multiple-input multiple-output (MIMO) parameters, which may further include a rank, precoding matrix, uplink beam IDs, uplink TCI state IDs, an uplink mTRP scheme (e.g., single DCI or multi-DCI based space division multiplexing (SDM) or frequency division multiplexing (FDM)), or any combination thereof.

Figure 5:
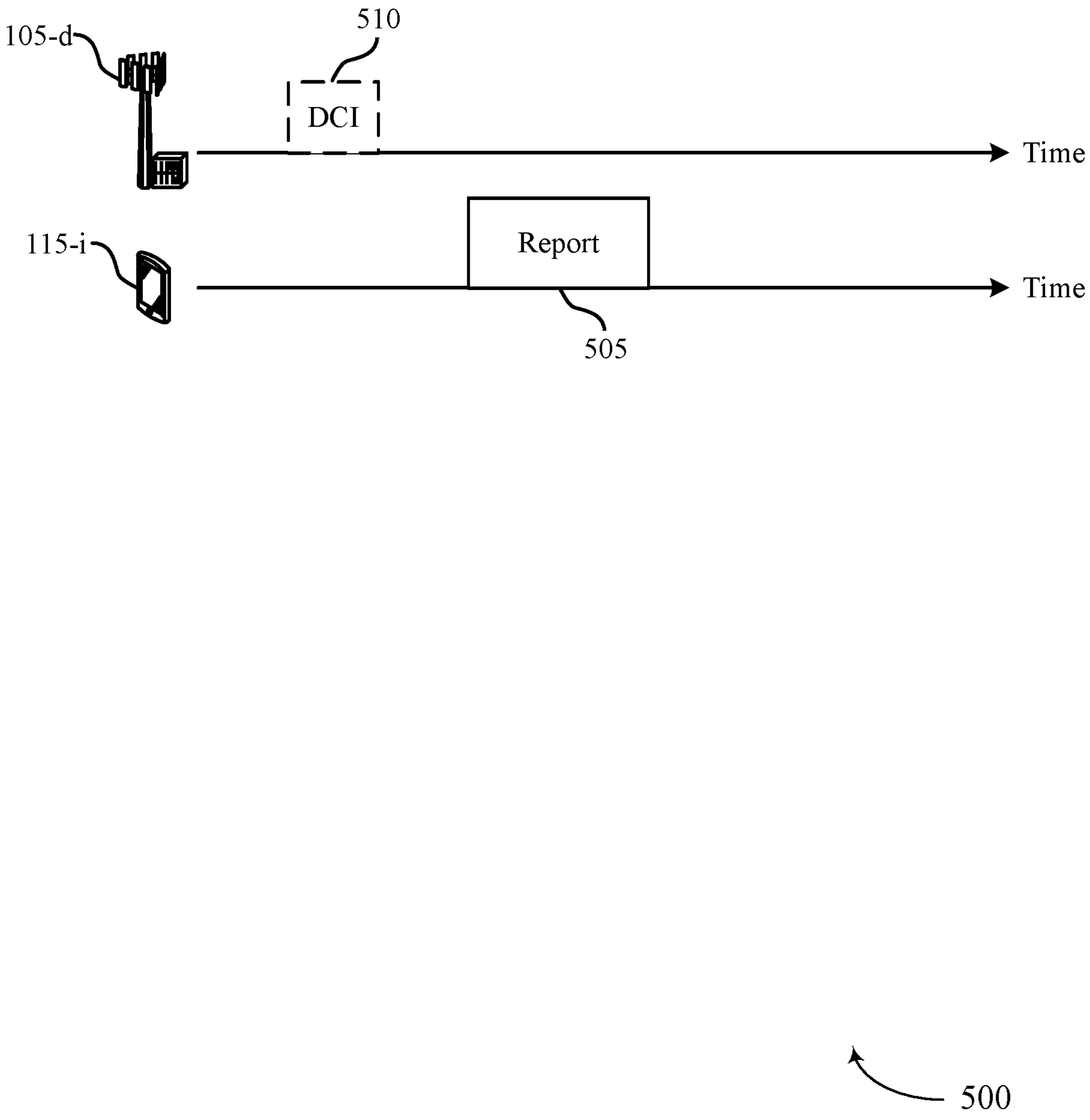
FIG. 5 shows an example of a timing diagram that supports full duplex relay procedures in accordance with one or more aspects of the present disclosure.

FIG. 5 shows an example of a timing diagram 500 that supports full duplex relay procedures in accordance with one or more aspects of the present disclosure. The timing diagram 500 may be implemented by aspects of the wireless communications system 100 and the wireless communications system 200 as described with reference to FIGS. 1 and

2. For instance, in the example of FIG. 5, a relay UE 115-*i* may be in communications with a network entity 105-*d*, which may be examples of corresponding devices as described herein, including with reference to FIGS. 1 and 2. For example, the relay UE 115-*i* may be an example of the relay UE 115-*a*.

The relay UE 115-*i* may transmit an assistance information report 505 to the network entity 105-*d*. The assistance information report 505 may be an example of CLI resource information 305 described with reference to FIG. 3, or assistance information described with reference to FIG. 2, FIG. 4, and FIG. 6, each of which may be referred to as a relay report. In some cases, the assistance information report 505 (e.g., a relay report including assistance information) may be scheduled by the network entity 105-*d*. For example, the network entity 105-*d* may transmit a DCI 510 scheduling the assistance information report 505, which may be scheduled periodically, semi-persistently, or aperiodically. In some examples, transmission or scheduling of the assistance information report 505 may reuse a configured or otherwise defined CSI framework.

In some other cases, the relay UE 115-*i* may transmit the assistance information report 505 to the network entity 105-*d* as an event triggered report or a UE autonomous report. In such cases where the assistance information report is an event triggered report, the network entity 105-*d* may configure the events and thresholds corresponding to the event triggered report. For example, in the case of an event-triggered report, the relay UE 115-*i* may transmit the assistance information report 505 based on a SI caused by at least one uplink transmission to at least one sidelink reception satisfying a threshold (e.g., is less than a threshold). The threshold may be defined in one or more standards documents, or may be indicated by the network entity 105-*d*. Additionally, or alternatively, the relay UE 115-*i* may transmit the assistance information report 505 based on a signal-to-interference-and-noise ratio (SINR) of a sidelink reception considering SI from at least one uplink transmission satisfying a threshold (e.g., is greater than a threshold). The SI threshold may be defined in one or more standards documents, or may be indicated by the network entity 105-*d*. The event triggered report or the UE autonomous report may be transmitted to the network entity 105-*d* via a UCI or a MAC-CE. In such implementations, the UCI or MAC-CE carrying the assistance information report 505 may be specified with a priority for multiplexing with other UCI types or MAC-CE types (e.g., not containing the assistance information report 505). The assistance information report 505 may be multiplexed with other UCI or MAC-CE types, and a priority level for the assistance information report 505 may be defined (e.g., in one or more standards documents or indicated in the DCI 510 or the assistance information report 505). In some cases, the assistance information report 505 (e.g., which may be an example of the relay report as described elsewhere herein) may be multiplexed with control or data information carried in a PUCCH or PUSCH. In such cases, the report may include a 1-bit indicator that may indicate whether at least one sidelink reception may be full-duplexed with the PUCCH or the PUSCH. The network entity 105-*d* may allocate a sidelink grant (e.g., via a DCI 510) for transmitting the assistance information report 505 such that the assistance information report 505 may be full-duplexed with uplink transmissions (e.g., via a PUCCH or a PUSCH in the future). In some examples, the report may include a multi-bit indicator that may indicate a number of sidelink grants that that may be full-duplexed with a PUCCH or the PUSCH. The assistance information report 505 may further include scheduling information, and any additional parameter values as described with respect to FIGS. 2-4.

Figure 6:
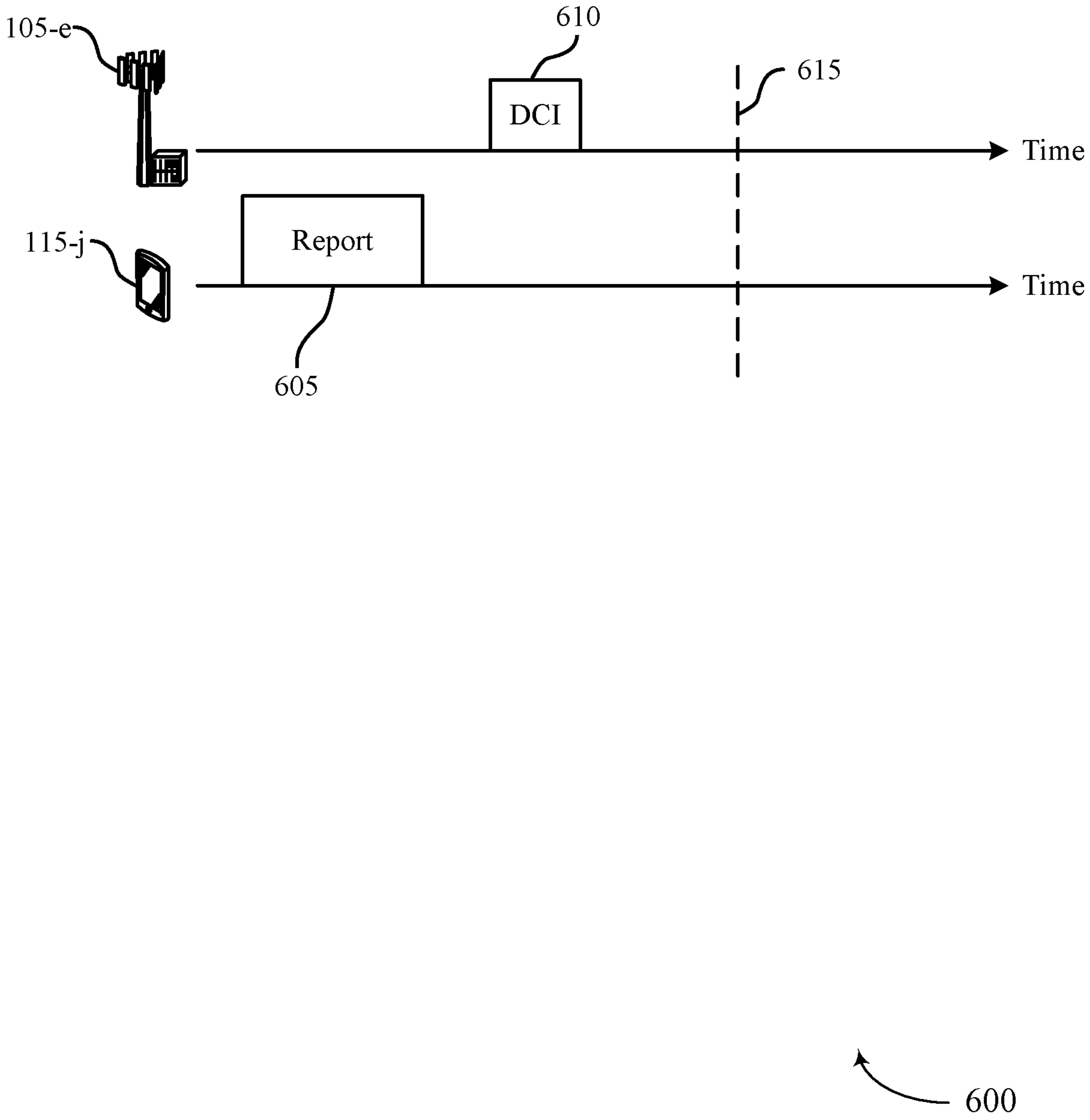
FIG. 6 shows an example of a timing diagram that supports full duplex relay procedures in accordance with one or more aspects of the present disclosure.

FIG. 6 shows an example of a timing diagram 600 that supports full duplex relay procedures in accordance with one or more aspects of the present disclosure. The timing diagram 500 may be implemented by aspects of the wireless communications system 100 and the wireless communications system 200 as described with reference to FIGS. 1 and 2. For instance, in the example of FIG. 6, a relay UE 115-*j* may be in communications with a network entity 105-*e*, which may be examples of corresponding devices as described herein, including with reference to FIGS. 1 and 2. For example, the relay UE 115-*j* may be an example of the relay UE 115-*a*.

In some implementations, the relay UE 115-*j* may determine FD relay feasibility (e.g., whether to operate in an FD or a half-duplex (HD) mode) and may transmit a report 605 including an indication of FD relay feasibility to the network entity 105-*e*. The report 605 may be an example of a relay report described herein, such as the assistance information report 505, the CLI resource information 305, or the assistance information (e.g., assistance information report 505) described with reference to FIGS. 2-5. Based on the indication, the network entity 105-*e* may request that the relay UE 115-*j* operate in a specific relay mode (e.g., FD or HD).

In some examples, whether FD or HD relay is performed by be determined by the relay UE 115-*j*. An application time 615 may be defined such that the network entity 105-*e* may schedule the requested relay mode after the application time 615. For example, the relay UE 115-*j* may indicate (e.g., via the report 605) that FD relay operations are infeasible (e.g., or are becoming infeasible). The network entity 105-*e* may not schedule sidelink frequency resources and uplink frequency resources that overlap after the application time 615. The application time 615 may be defined as a number (e.g., quantity) of symbols or a duration of time after the end of the report 605 or after the corresponding acknowledgement (e.g., DCI 610) from the network entity 105-*e*. For example, the relay UE 115-*j* operating in FD mode may indicate that FD mode is no longer feasible (e.g., via the report 605). An acknowledgement (ACK) message from the network entity 105-*e* may be a DCI 610 (e.g., which may be scheduling a new uplink grant with a same HARQ ID as the HARQ ID for the MAC-CE carrying an FD relay feasibility report). The relay UE 115-*j* may exit the FD mode at application time 615, and the network entity 105-*e* may not schedule (e.g., via the DCI 610) any FD overlapping resources for FD relay after application time 615.

Figure 7:
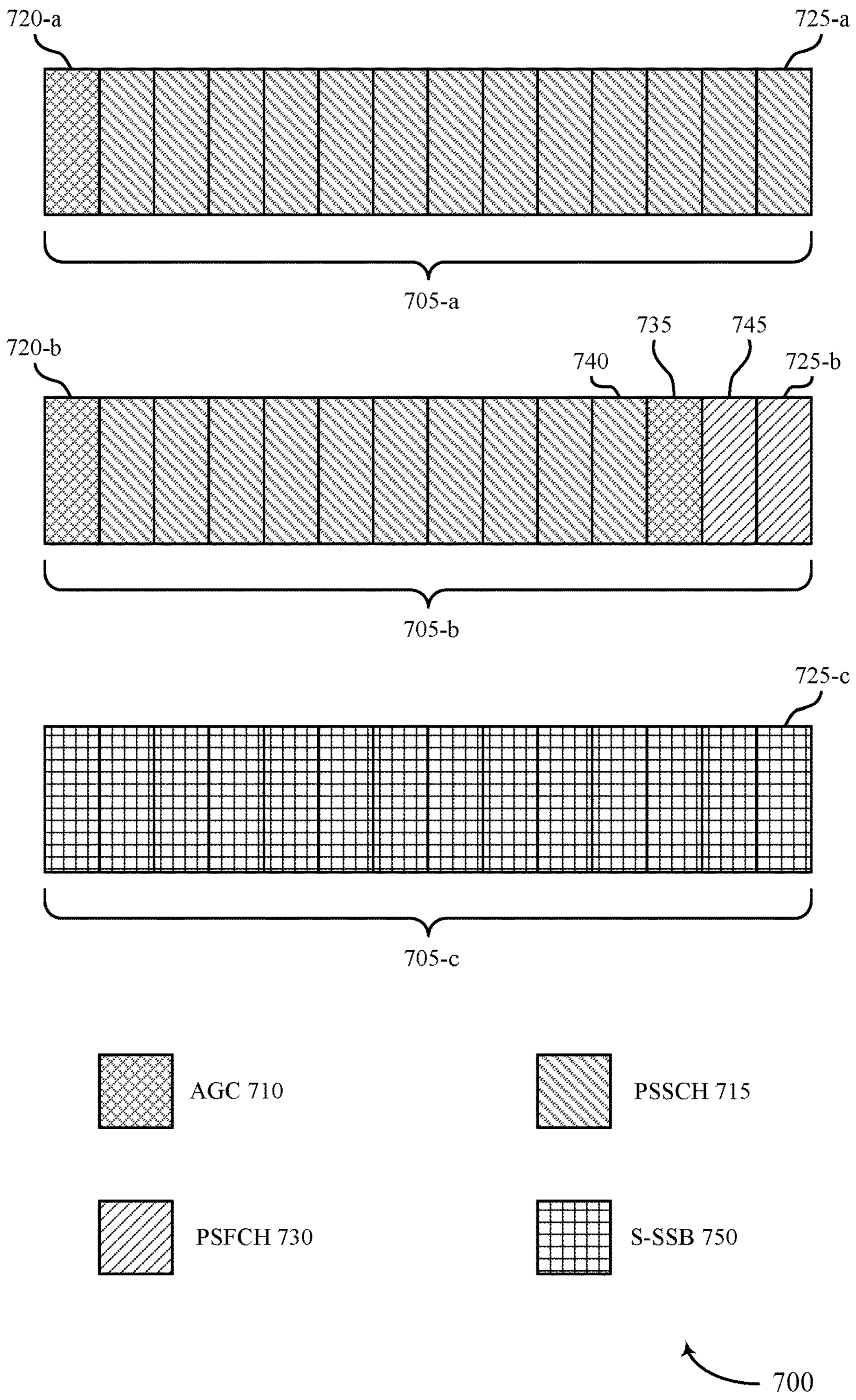
FIG. 7 shows an example of a slot configuration that supports full duplex relay procedures in accordance with one or more aspects of the present disclosure.

FIG. 7 shows an example of a slot configuration 700 that supports full duplex relay procedures in accordance with one or more aspects of the present disclosure. The slot configuration 700 may be implemented by aspects of the wireless communications system 100, the wireless communications system 200, the timing diagram 300, the timing diagram 400, the timing diagram 500, and the timing diagram 600, as described with reference to FIGS. 1-6. For instance, in the example of FIG. 7, a relay UE operating in a full-duplex mode may be in communication with a remote UE and a network entity, which may be examples of a relay UE 115-*a*, remote UE 115-*b*, remote UE 115-*c* network entity 105-*a*, or any combination thereof, as described with reference to FIG. 2. The remote UE may transmit sidelink signals to the relay UE according to a slot structure of the slots 705.

The slot 705-*a* includes multiple (e.g., 14) sidelink symbols per slot, which may further include an automatic gain control (AGC) symbol 710 and a PSCCH/PSSCH block 715

(e.g., PSSCH), which may include one or more PSCCH/PSSCH symbols, including a PSCCH/PSSCH symbol in a final symbol 725-*a*. The AGC symbol may be located in a first symbol 720-*a* of the slot 705-*a*. The slot 705-*b* includes 14 sidelink symbols per slot, which may further include an AGC symbol 710, a PSCCH/PSSCH block 715, and physical sidelink feedback channel (PSFCH) symbols 730. In some examples, an AGC symbol 710 may be located in a first symbol 720-*b* and an AGC symbol 710 may also be located in a symbol 735 of the slot. In some cases, there may be a PSCCH/PSSCH block 715, and a PSCCH/PSSCH symbol of the PSCCH/PSSCH block 715 may occupy a symbol 740 preceding the AGC symbol 710 in symbol 735. In some examples, a PSFCH symbol 730 may be located in a final symbol 725-*b* and a PSFCH symbol 730 may also be located in a symbol 745 following the AGC symbol 710 in symbol 735. In some cases, the AGC symbol 710 located in symbol 735 may be replaced with a PSCCH/PSSCH symbol (e.g., the PSCCH/PSSCH block 715) or a PSFCH symbol 730. The slot 705-*c* may include 14 sidelink symbols per slot, which may further include one or more sidelink synchronization signal block (S-SSB) symbols 750, which may be transmitted during a final symbol 725-*c* of the slot 705-*a*. In some cases, only some symbols of the slots 705 may be allocated for sidelink communications. In such cases, signals may be transmitted in accordance with the techniques described herein for a subset of symbols within a given slot 705 (e.g., for contiguous blocks of sidelink symbols).

In some implementations, one or more UEs may not support FD relay operations. In such implementations, UEs operating in an HD mode may not be permitted to transmit signals during a guard symbol, which may be located in a final symbol 725 or, in the case of slot 705-*b*, in symbol 740. As such, the remote UE may not transmit via a final symbol 725 of the slot 705, or a symbol 740 or symbol 735 prior to the symbol 745 of the slot 705-*b*. That is, such symbols may be reserved for switching between transmission and reception in HD mode. However, a UE operating in FD may not need to switch between transmission and reception and, as such, may transmit signals via a slot without relying on guard symbols. Some UEs may support a full duplex mode, and therefore could transmit via symbols reserved for HD mode switching and guard symbols.

In some examples where the relay UE is capable of FD operations, the UE may transmit signals via modified slots 705, as described herein (e.g., supporting sidelink transmissions via a final symbol of each slot 705, without use of a guard symbol). Sidelink UEs may communicate according to a slot format that does not include guard symbols (e.g., which are not needed by FD supporting UEs), resulting in better and more efficient utilization of available resources. A UE may transmit an indication of the FD capability. In some cases where the UE is operating in sidelink mode 1, the UE may transmit the capability indication to the network entity. In some other cases where the UE is operating in sidelink mode 2, the UE may transmit the capability indication to a neighbor sidelink UE. Based on transmitting the capability indication, the UE may use a modified slot 705 that has no guard symbols for sidelink transmission and reception in transmit and receive resource pools. Such a sidelink slot format may include no guard symbols, and sidelink reception and transmission of the same UE may be allowed on the same symbol. The network entity may configure any UEs reporting FD capability with sidelink resource pools in which all sidelink slots 705 are defined according to the FD slot format. Such special sidelink slot formats and corresponding resource pools can be used at least by FD capable UEs. the use of such sidelink slot formatting and corresponding transmission and reception via resource pools may be indicated (e.g., informed) by the network entity (e.g., in mode 1) or via negotiations between sidelink UEs (e.g., in mode 2).

In such examples, an FD UE that has been configured with a resource pool including the FD sidelink slot format may transmit PSCCH/PSSCH signaling (e.g., via a PSCCH/PSSCH block 715) via a final symbol 725, or any other symbol that would otherwise be allocated as a guard symbol for non-FD slot formats (e.g., the PSCCH/PSSCH block 715). Similarly, an FD UE that has been configured with such a resource pool including the FD sidelink slot format may transmit PSCCH/PSSCH signaling (e.g., via a PSCCH/PSSCH block 715) in a symbol immediately preceding symbols configured for use by a PSFCH symbol 730, if a PSFCH is configured in the slot 705 (e.g., the UE may transmit PSCCH/PSSCH signaling via symbol 740 or symbol 735 or both). Communications according to such FD slot formats may result in more efficient use of system resources, decreased latency, increased throughput, and improved user experience.

Figure 8:
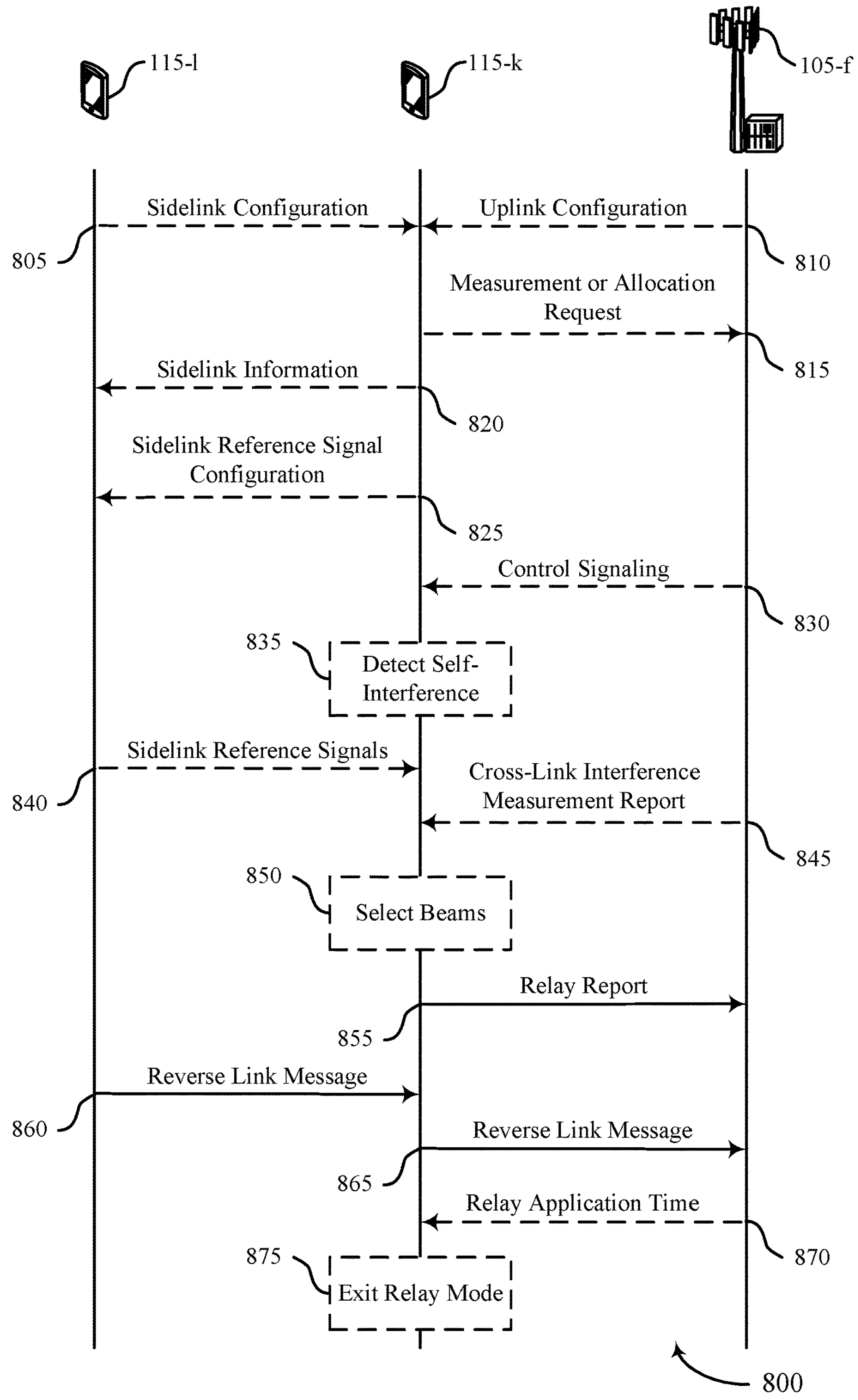
FIG. 8 shows an example of a process flow that supports full duplex relay procedures in accordance with one or more aspects of the present disclosure.

FIG. 8 shows an example of a process flow 800 that supports full duplex relay procedures in accordance with one or more aspects of the present disclosure. The process flow 800 may implement or may be implemented by aspects of the wireless communications system 100 and the wireless communications system 200 as described with reference to FIGS. 1 and 2. For instance, in the example of FIG. 8, a relay UE 115-*k* may be in communication with a remote UE 115-1 and network entity 105-*f*. The relay UE 115-*k* may be an example of a relay UE 115-*a*, the remote UE 115-1 may be an example of a remote UE 115-*b* or remote UE 115-*c*, and the network entity 105-*f* may be an example of a network entity 105-*a* as described with reference to FIGS. 1 and 2. The relay UE 115-*k* may further be an example of an FD relay device, as described herein. The relay UE 115-*k*, the remote UE 115-1, and the network entity 105-*f* may communicate via respective communication links, which may be examples of cellular communication links 205 and sidelink communication links 210, as described with reference to FIG. 2. In the following description of the process flow 800, the operations between the relay UE 115-*k*, the remote UE 115-1, and the network entity 105-*f* may be transmitted in a different order than the example order shown, or the operations between the relay UE 115-*k*, the remote UE 115-1, and the network entity 105-*f* may be performed in different orders at different times. Some operations may also be omitted from the process flow 800, and other operations may be added to the process flow 800.

As described herein, the relay UE 115-*k* may perform relay communications of a reverse link message from the remote UE 115-1 to the network entity 105-*f* in an FD mode. For instance, at 855, the relay UE 115-*k* may transmit, to the network entity 105-*f*, a relay report associated with operation of the relay UE 115-*k* in a full duplex mode to relay one or more reverse link messages from the remote UE 115-1 to the network entity 105-*f*, the one or more reverse link messages for receipt by the relay UE 115-*k* via sidelink signaling from the remote UE 115-1 and transmission by the relay UE 115-*k* via uplink signaling to the network entity 105-*f*. At 860 the relay UE 115-*k* may receive a reverse link message from the remote UE 115-1 while operating in FD mode via the sidelink signaling form the remote UE 115-1. At 865, the relay UE 115-*k* may transmit the reverse link message (e.g., based on an uplink configuration received at 810 and in accordance with the FD mode and the relay report transmitted at 855) while continuing to receive the sidelink signaling from the remote UE 115-1.

In some examples, the network entity **105-*f* may indicate beams and resources for uplink signaling to the relay UE 115-*k*, based on which the relay UE 115-*k* may configure the remote UE 115-1 with sidelink resources for the FD operations. For example, at 810 the relay UE 115-*k* may receive, from the network entity 105-*f*, an indication of an uplink resource and an uplink beam selected by the network entity 105-*f* for receiving uplink signaling from the relay UE 115-*k*. At 820, the relay UE 115-*k* may transmit sidelink information to the remote UE 115-1, indicating candidate sidelink beams or candidate sidelink resources for transmission of the reverse link message at 860. The indicated sidelink beams and resources may be selected by the relay UE 115-*k* to reduce CLI or SI or both based on the uplink configuration information received at 810**.

In some examples, the relay UE **115-*k* may receive an indication of sidelink beams and resources the remote UE 115-1 will use to transmit the reverse link message at 865, based on which the relay UE 115-*k* may indicate candidate uplink beams and resources to the network entity 105-*f*. For example, at 805, the relay UE 115-*k* may receive from the remote UE 115-1, an indication of a sidelink resource and a sidelink beam selected by the remote UE 115-1 for transmitting sidelink signaling to the relay UE 115-*k*. At 820, the relay UE 115-*k* may transmit an indication of a candidate sidelink beam or a candidate sidelink resource to the remote UE 115-1. The remote UE 115-1 may use the candidate sidelink beam or candidate sidelink resource to transmit sidelink signaling via a sidelink resource that is associated with the uplink resource indicated in 810. The relay UE 115-*k* may transmit the indication of candidate sidelink configuration based on receiving the indication of uplink configuration from the network entity 105-*f* at 810. In some examples, based on indications communicated previously (e.g., at 805, or 810), the relay UE 115-*k* may indicate, to the network entity 105-*f*, to allocate uplink beams for uplink transmissions. The relay UE 115-*k* may also indicate to the network entity 105-*f*, to measure CLI on specific uplink beams or resources (e.g., at 815**).

In some examples, at 815, the relay UE **115-*k* may transmit a measurement or allocation request message to the network entity 105-*f*. The measurement or allocation request message may include an indication of candidate beams, candidate resources, or any combination thereof, for performing one or more channel quality measurements, CLI measurements, or any combination thereof. The relay UE 115-*k* and the network entity 105-*f* may then perform beam sweeping or measurement procedures, resulting in selection of one or more beams and one or more resources for the relaying at 860 and 865. In such examples, the relay UE 115-*k* may include, in the relay report at 855, an indication of beams for uplink transmission, beams for sidelink transmission, or both, where a CLI and an SI associated with the beams and resources satisfy respective thresholds (e.g., SI and CLI is negligible). For example, the relay UE 115-*k* may measure SI with beams provided by the remote UE 115-1, the network entity 105-*f*, or both, and hence may request that the network entity 105-*f* allocate such beams, so that the relay UE 115-*k* can make SI measurement. Such SI measurement may be relied upon (e.g., at 850**) to make beam selection, which may be included in the content of relay report.

In some examples, the relay UE **115-*k* may transmit, via the relay report at 855, an indication of one or more sidelink measurement resources allocated for transmission of sidelink reference signals by the remote UE 115-1, for performing CLI measurement by the network entity 105-*f*. In such examples, the network entity 105-*f* may select beams and resources (e.g., which the network entity 105-*f* may select for relay operations at 860 and 865) based on CLI measurements performed by the network entity 105-*f* as described in greater detail with reference to FIG. 3. In some examples, the relay UE 115-*k* may indicate dedicated CLI measurement resources for CLI measurement by the network entity 105-*f*. At 825, the relay UE 115-*k* may transmit an indication of one or more sidelink measurement resources or sidelink beams to the remote UE 115-1. The remote UE 115-1 may transmit sidelink reference signals to the network entity 105-*f* based on receiving the indication of the one or more sidelink measurement resources or the one or more sidelink beams. For example, at 840, the remote UE 115-1 may transmit at least one dedicated sidelink reference signal based on receiving the indication of sidelink measurement resources at 825. The network entity 105-*f* may perform CLI measurements based on the CLI measurement resources indicated at 815 or the sidelink measurement resources used to transmit the sidelink reference signals at 840. In some examples, the network entity 105-*f* may transmit a CLI measurement report to the relay UE 115-*k* based on performing the CLI measurements. In some examples, the sidelink reference signals transmitted at 840 may be transmitted to the network entity 105-*f*. At 845, the relay UE 115-*k* may receive the cross-link interference measurement report from the network entity 105-*f*. The cross-link interference measurement report may correspond to cross-link interference generated by the remote UE 115-1. The network entity 105-*f* may transmit the cross-link interference measurement report to the relay UE 115-*k* based on receiving the relay report at 855**.

In some examples, the network entity **105-*f* may grant resources for the relay report at 855. For example, at 830, the relay UE 115-*k* may receive control signaling from the network entity 105-*f*. The control signaling may schedule periodic or aperiodic reporting indicating whether the relay UE 115-*k* is capable of supporting full duplex relaying, or any other parameter values or information included in the relay report transmitted at 855** as described herein.

At 850, the relay UE **115-*k* may select a sidelink receive beam and an uplink transmit beam. The beam selection may be based on any portion or combination of information and data exchanged prior to the beam selection (e.g., after all information, such as SI, CLI, beam preferences or suggestions, configuration information is exchanged, etc.). In some cases, the relay UE 115-*k* may select the transmit and receive beams to decrease (e.g., minimize) SI, decrease (e.g., minimize) CLI, and improving (e.g., maximizing) sidelink and uplink communication performance based on evaluating criteria. The criteria may include a SINR of sidelink communications, a SINR of uplink communications, SI at the relay UE 115-*k*, CLI at the network entity 105-*f*, or any combination thereof. The relay UE 115-*k* may select the beams at 850** according to any portion of or combination of such criteria.

At 855, the relay UE **115-*k* may transmit the relay report to the network entity 105-*f*. The relay report may be an example of a relay feasibility report, as described with reference to FIG. 6. The relay report may be associated with operation of the relay UE 115-*k* in a full duplex mode to relay one or more reverse link messages from a remote UE 115-1 to the network entity 105-*f*. The one or more reverse link messages may be received by the relay UE 115-*k* via sidelink signaling from the remote UE 115-1 and may be transmitted by the relay UE 115**-*k* via uplink signaling to the network entity 105-*f*. The relay UE 115-*k* may transmit the relay report based on receiving the control signaling from the network entity 105-*f* at 830.

The relay report may include a beam report, which itself may further include an indication of multiple beams. The multiple beams may include one or more beams for uplink transmission, one or more beams for sidelink transmission, or both. The one or more beams for uplink transmission may be associated with a self-interference value, and the one or more beams for sidelink transmission may be associated with a cross-link interference value. The relay UE 115-*k* may transmit the beam report based on the self-interference value satisfying a first threshold and the cross-link interference value satisfying a second threshold. Further, the relay UE 115-*k* may transmit the beam report based on transmitting the measurement or allocation request in 815.

In some examples where the relay UE 115-*k* may receive an indication of sidelink configuration from the remote UE 115-1 in 805, the relay report may also include an indication of either a candidate uplink resource or a candidate uplink beam, or both, for the relay UE 115-*k* to use for transmitting the uplink signaling via an uplink resource that is associated with the sidelink resources indicated by the remote UE 115-1 in 805. In some other examples where the relay UE 115-*k* may receive an indication of uplink configuration from the network entity 105-*f* in 810, the relay report may also include an indication of one or more sidelink measurement resources allocated for transmission of sidelink reference signals by the remote UE 115-1 and an indication of one or more uplink beams to use for performing cross-link interference measurements corresponding to the one or more sidelink measurement resources.

The relay report may also include an indication that the relay UE 115-*k* supports relaying the one or more reverse link messages in the full duplex mode. Based receiving the relay report, the network entity 105-*f* may allocate sidelink resources to the relay UE 115-*k* and the remote UE 115-1 and uplink resources to the relay UE 115-*k*. In some cases, the sidelink resources and the uplink resources may at least partially overlap in time according to the full duplex mode.

The relay report may also include an indication of a quantity of sidelink grants corresponding to respective UEs 115 of multiple sidelink UEs 115 including the remote UE 115-1. Each of the quantity of sidelink grants for sidelink resources may overlap at least partially in time with uplink resources corresponding to an uplink grant. The relay report may further include an indication of one or more parameter values including time and frequency resources, a transmit power, a beam identifier, a transmission configuration indicator state identifier, a rank, a precoding matrix, a multi-transmission reception point parameter value, or any combination thereof.

In some examples, the relay UE 115-*k* may transmit the relay report at 855 autonomously, or in response to a triggering event. For example, at 835, the relay UE 115-*k* may detect self-interference between an uplink transmission and a sidelink reception. In some examples, the relay UE 115-*k* may determine that the self-interference is below a threshold value and may transmit the relay report based on the determining. In some examples, the relay UE 115-*k* may determine that CLI satisfies a threshold (e.g., based on receiving the CLI measurement report at 845), in which case the relay UE 115-*k* may transmit the relay report at 855 based thereon.

At 860, the relay UE 115-*k* may receive a reverse link message from the remote UE 115-1. The relay UE 115-*k* may be operating in a full duplex mode when receiving the reverse link message. The remote UE 115-1 may transmit the reverse link message based on the sidelink signaling configured at 820, the information included within the relay report at 855, the beam selection at 850, or any combination thereof.

At 865, the relay UE 115-*k* may transmit a reverse link message to the network entity 105-*f*. The relay UE 115-*k* may be operating in a full duplex mode when transmitting the reverse link message. The relay UE 115-*k* may transmit the reverse link message based on the uplink signaling configured at 810, the information included within the relay report at 855, the beam selection at 850, or any combination thereof.

At 870, the relay UE 115-*k* may receive an indication of a full duplex relay application time from the network entity 105-*f*. The full duplex relay application time may be relative to the relay report transmitted at 855 (e.g., or transmitted subsequent to the reverse link message relayed at 865). For example, the relay report may include an indication that the relay UE 115-*k* does not or will no longer support FD mode.

At 875, the relay UE 115-*k* may exit a full duplex mode. In some cases, the relay UE 115-*k* may exit the full duplex mode based on receiving the indication of the full duplex application time at 870. Specifically, the relay UE 115-*k* may exit the full duplex mode upon expiration of the full duplex relay application time.

Figure 9:
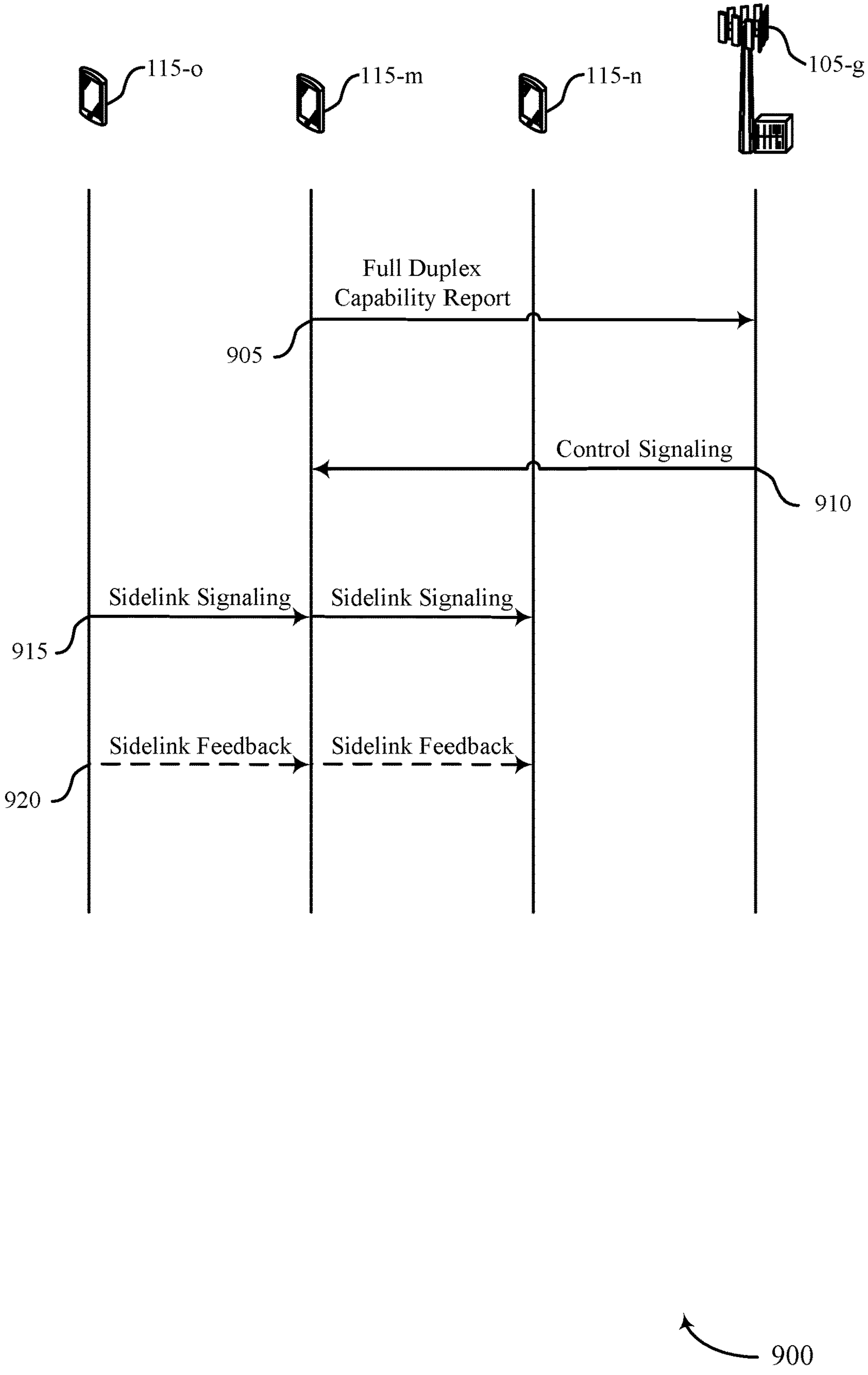
FIG. 9 shows an example of a process flow that supports full duplex relay procedures in accordance with one or more aspects of the present disclosure.

FIG. 9 shows an example of a process flow 900 that supports full duplex relay procedures in accordance with one or more aspects of the present disclosure. The process flow 900 may implement or may be implemented by aspects of the wireless communications system 100 as described with reference to FIG. 1. For instance, in the example of FIG. 9, a UE 115-*m* may be in communication with a UE 115-*n*, a UE 115-*o*, and a network entity 105-*g*. The UE 115-*m*, the UE 115-*n*, and the UE 115-*o* may be examples of UEs 115, and the network entity 105-*g* may be an example of a network entity 105 as described with reference to FIG. 1. The UE 115-*m* may further be an example of an FD relay device, as described herein. Further, the UE 115-*m*, the UE 115-*n*, the UE 115-*o*, and the network entity 105-*g* may communicate over communication links (e.g., uplink, sidelink), which may be examples of communication links 125 with respect to FIG. 1. In the following description of the process flow 900, the operations between the UE 115-*m*, the UE 115-*n*, the UE 115-*o*, and the network entity 105-*g* may be transmitted in a different order than the example order shown, or the operations between the UE 115-*m*, the UE 115-*n*, the UE 115-*o*, and the network entity 105-*g* may be performed in different orders at different times. Some operations may also be omitted from the process flow 900, and other operations may be added to the process flow 900.

At 905, the UE 115-*m* may transmit a full duplex capability report. The full duplex capability report may indicate that the UE 115-*m* may support full duplex communications.

At 910, the UE 115-*m* may receive control signaling from the network entity 105-*g*. The control signaling may indicate a sidelink resource pool to the UE 115-*m*. The sidelink resource pool may include multiple sidelink slots, and each slot of the multiple slots may correspond to a full duplex format supporting sidelink transmission via a final symbol of a sidelink allocation. Each sidelink slot may further include multiple sidelink symbols.

At 915, the UE 115-*m* may transmit sidelink signaling to the UE 115-*n* and receive sidelink signaling from the UE 115-*o*. The UE 115-*m* may transmit and receive the sidelink signaling during one or more of the multiple sidelink symbols of at least one sidelink slot of multiple sidelink slots. In some cases, the UE 115-*m* may further transmit and receive the sidelink signaling during a final symbol of the at least one sidelink symbol. Additionally, or alternatively, the UE 115-*m* may transmit and receive the sidelink signaling during a first symbol of at least one sidelink slot preceding a second symbol that is adjacent to the first symbol and allocated for a physical sidelink feedback channel. In some cases, the sidelink signaling may include control signaling, sidelink data, sidelink feedback, or any combination thereof. In such cases, the control signaling, sidelink data, and sidelink feedback may be FD multiplexed over one signal.

At 920, the UE 115-*m* may receive sidelink feedback from the UE 115-*n*. The UE 115-*n* may transmit the sidelink signaling during the second symbol of the at least one sidelink slot. In some cases, the sidelink feedback may be FD multiplexed with the sidelink signaling in 915. For example, the UE 115-*m* may transmit sidelink signaling (e.g., sidelink data via a PSSCH) to the UE 115-*n*, while simultaneously receiving sidelink signaling (e.g., sidelink data or sidelink feedback signaling via a PSFCH). Similarly, the UE 115-*m* may transmit or receive sidelink feedback signaling at 920 while simultaneously transmitting or receiving sidelink data signaling or sidelink feedback signaling. In some examples, the UE 115-*m* may simultaneously receive sidelink signaling form the UE 115-*o* while transmitting sidelink feedback signaling to the UE 115-*o* responsive to the sidelink signaling received at 915.

Figure 10:
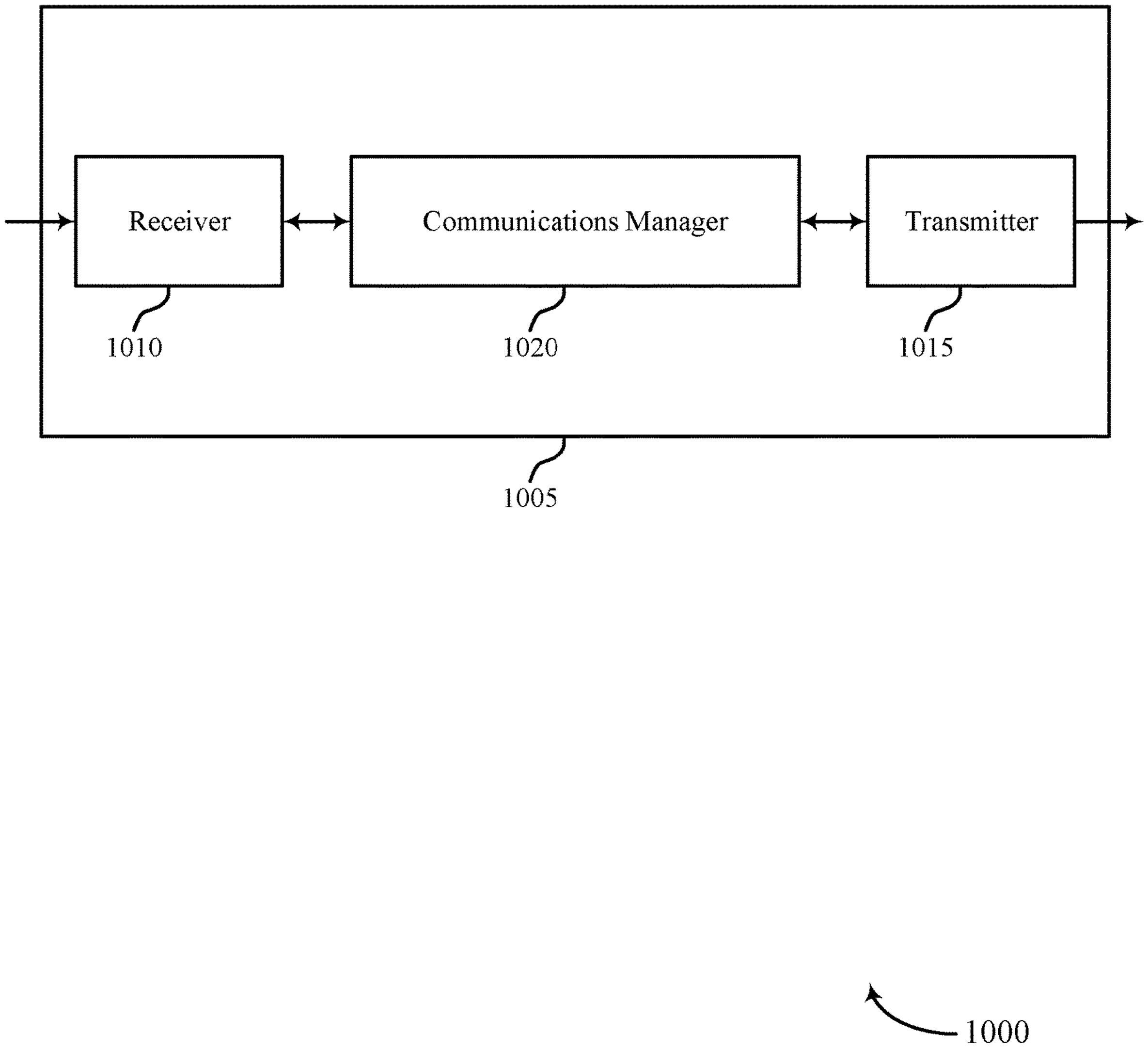
FIGS. 10 and 11 show block diagrams of devices that support full duplex relay procedures in accordance with one or more aspects of the present disclosure.

FIG. 10 shows a block diagram 1000 of a device 1005 that supports full duplex relay procedures in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to full duplex relay procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to full duplex relay procedures). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of full duplex relay procedures as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, a FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may be configured to receive or transmit messages or other signaling as described herein via a transceiver. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first UE in accordance with examples as disclosed herein. For example, the communications manager 1020 is capable of, configured to, or operable to support a means for transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The communications manager 1020 is capable of, configured to, or operable to support a means for receiving, at the first UE while operating in the full duplex mode, a reverse link message for the network entity via the sidelink signaling from the second UE. The communications manager 1020 is capable of, configured to, or operable to support a means for transmitting, by the first UE in accordance with the full duplex mode and the relay report, the reverse link message to the network entity via the uplink signaling while continuing to receive the sidelink signaling from the second UE.

Additionally, or alternatively, the communications manager 1020 may support wireless communications at a UE in accordance with examples as disclosed herein. For example, the communications manager 1020 is capable of, configured to, or operable to support a means for transmitting a full duplex capability report indicating that the UE is capable of supporting a full duplex mode of communication. The communications manager 1020 is capable of, configured to, or operable to support a means for receiving, based on transmitting the full duplex capability report, control signaling indicating a sidelink resource pool including a set of multiple sidelink symbols, where each sidelink symbol of the set of multiple sidelink symbols corresponds to a full duplex format. The communications manager 1020 is capable of, configured to, or operable to support a means for transmitting sidelink signaling via one or more symbols of the set of multiple sidelink symbols according to a full duplex format.

By including or configuring the communications manager 1020 in accordance with examples as described herein, the device 1005 (e.g., a processor controlling or otherwise coupled with the receiver 1010, the transmitter 1015, the communications manager 1020, or any combination thereof) may support techniques for coordinating full-duplex relaying and reducing self-interference and cross-link interference at a UE.

Figure 11:
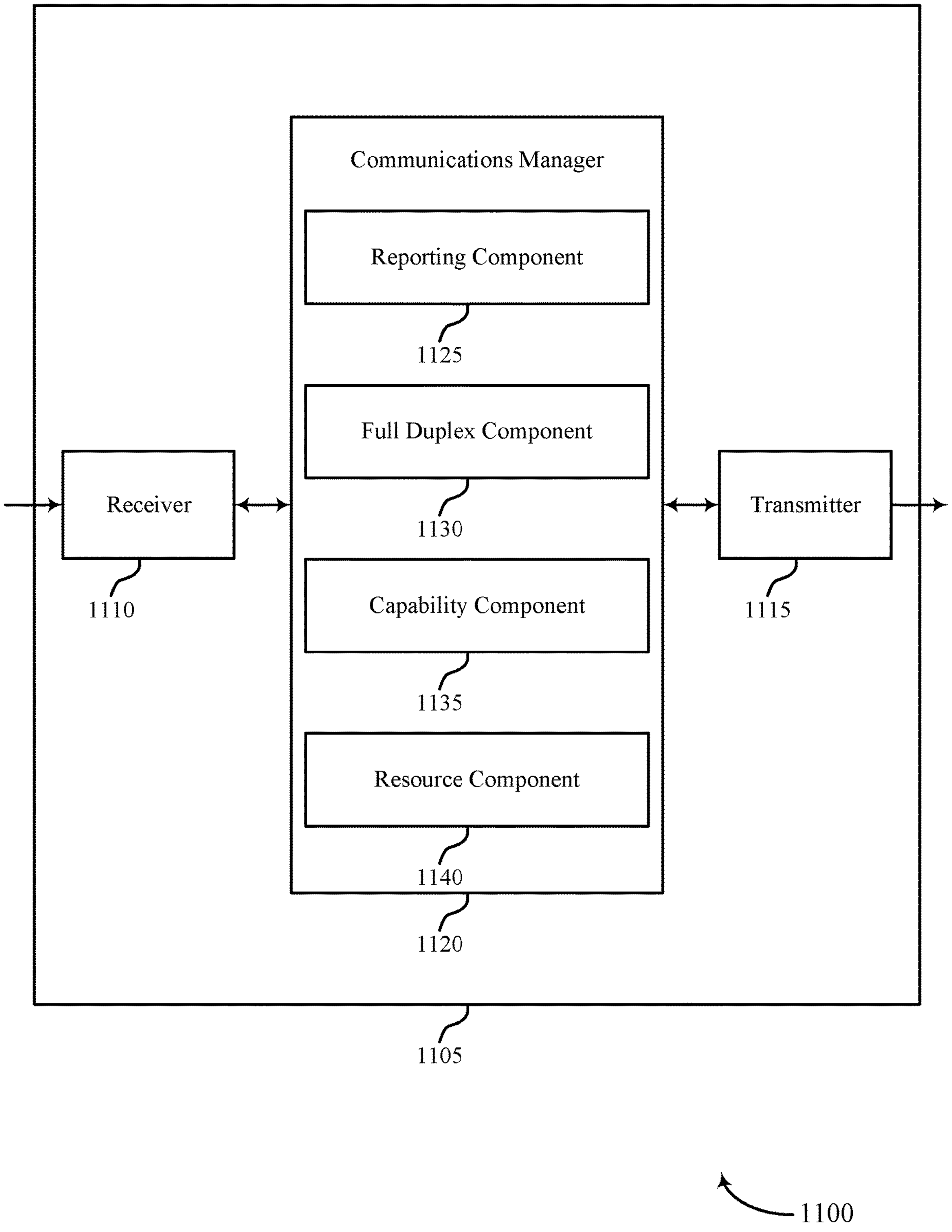

FIG. 11 shows a block diagram 1100 of a device 1105 that supports full duplex relay procedures in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to full duplex relay procedures). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to full duplex relay procedures). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of full duplex relay procedures as described herein. For example, the communications manager 1120 may include a reporting component 1125, a full duplex component 1130, a capability component 1135, a resource component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first UE in accordance with examples as disclosed herein. The reporting component 1125 is capable of, configured to, or operable to support a means for transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The full duplex component 1130 is capable of, configured to, or operable to support a means for receiving, at the first UE while operating in the full duplex mode, a reverse link message for the network entity via the sidelink signaling from the second UE. The full duplex component 1130 is capable of, configured to, or operable to support a means for transmitting, by the first UE in accordance with the full duplex mode and the relay report, the reverse link message to the network entity via the uplink signaling while continuing to receive the sidelink signaling from the second UE.

Additionally, or alternatively, the communications manager 1120 may support wireless communications at a UE in accordance with examples as disclosed herein. The capability component 1135 is capable of, configured to, or operable to support a means for transmitting a full duplex capability report indicating that the UE is capable of supporting a full duplex mode of communication. The resource component 1140 is capable of, configured to, or operable to support a means for receiving, based on transmitting the full duplex capability report, control signaling indicating a sidelink resource pool including a set of multiple sidelink symbols, where each sidelink symbol of the set of multiple sidelink symbols corresponds to a full duplex format. The full duplex component 1130 is capable of, configured to, or operable to support a means for transmitting sidelink signaling via one or more symbols of the set of multiple sidelink symbols according to a full duplex format.

Figure 12:
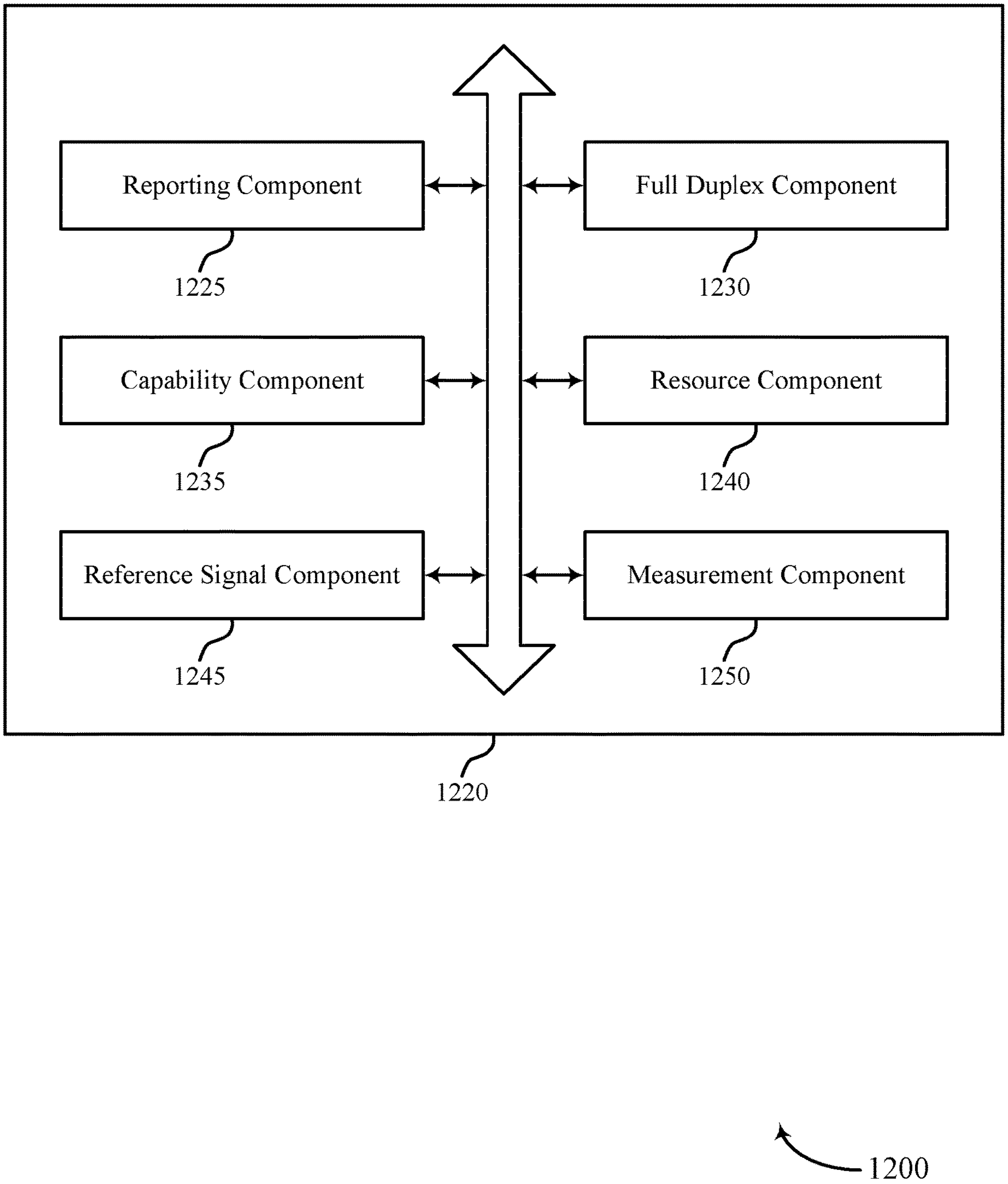
FIG. 12 shows a block diagram of a communications manager that supports full duplex relay procedures in accordance with one or more aspects of the present disclosure.

FIG. 12 shows a block diagram 1200 of a communications manager 1220 that supports full duplex relay procedures in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of full duplex relay procedures as described herein. For example, the communications manager 1220 may include a reporting component 1225, a full duplex component 1230, a capability component 1235, a resource component 1240, a reference signal component 1245, a measurement component 1250, or any combination thereof. Each of these components may communicate, directly or indirectly, with one another (e.g., via one or more buses).

The communications manager 1220 may support wireless communications at a first UE in accordance with examples as disclosed herein. The reporting component 1225 is capable of, configured to, or operable to support a means for transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The full duplex component 1230 is capable of, configured to, or operable to support a means for receiving, at the first UE while operating in the full duplex mode, a reverse link message for the network entity via the sidelink signaling from the second UE. In some examples, the full duplex component 1230 is capable of, configured to, or operable to support a means for transmitting, by the first UE in accordance with the full duplex mode and the relay report, the reverse link message to the network entity via the uplink signaling while continuing to receive the sidelink signaling from the second UE.

In some examples, the reporting component 1225 is capable of, configured to, or operable to support a means for transmitting, via the relay report, a beam report including an indication of a set of multiple beams, where the set of multiple beams includes one or more beams for uplink transmission, one or more beams for sidelink transmission, or both, where a cross-link interference value corresponding to the one or more beams for sidelink transmission of the set of multiple beams satisfies a first threshold, where a self-interference value corresponding to the one or more beams for uplink transmission of the set of multiple beams satisfies a second threshold, or any combination thereof.

In some examples, the measurement component 1250 is capable of, configured to, or operable to support a means for transmitting a measurement request message including an indication of a set of multiple candidate beams, candidate resources, or any combination thereof, for performing one or more channel quality measurements, cross-link interference measurements, or any combination thereof, where transmitting the beam report including the indication of the set of multiple beams is based on transmitting the measurement request message.

In some examples, the resource component 1240 is capable of, configured to, or operable to support a means for receiving, from the second UE, an indication of a sidelink resource and a sidelink beam selected by the second UE for transmitting the sidelink signaling to the first UE, where the relay report includes an indication of a candidate uplink resource or a candidate uplink beam for the first UE to use for transmitting the uplink signaling via an uplink resource that is associated with the sidelink resource.

In some examples, the resource component 1240 is capable of, configured to, or operable to support a means for receiving, from the network entity, an indication of an uplink resource and an uplink beam selected by the network entity for receiving the uplink signaling from the first UE. In some examples, the resource component 1240 is capable of, configured to, or operable to support a means for transmitting, to the second UE, an indication of a candidate sidelink beam or a candidate sidelink resource for the second UE to use for transmitting the sidelink signaling via a sidelink resource that is associated with the uplink resource.

In some examples, the reference signal component 1245 is capable of, configured to, or operable to support a means for transmitting, via the relay report, an indication of one or more sidelink measurement resources, allocated for transmission of sidelink reference signals by the second UE, for performing cross-link interference measurements by the network entity.

In some examples, the reference signal component 1245 is capable of, configured to, or operable to support a means for transmitting, to the second UE, an indication of the one or more sidelink measurement resources or of sidelink beams via which the second UE is to transmit sidelink reference signals associated with the cross-link interference measurements.

In some examples, the reporting component 1225 is capable of, configured to, or operable to support a means for transmitting, via the relay report, an indication to the network entity of one or more uplink beams to use for performing the cross-link interference measurements corresponding to the one or more sidelink measurement resources.

In some examples, the measurement component 1250 is capable of, configured to, or operable to support a means for receiving, from the network entity based on the relay report, a cross-link interference measurement report corresponding to cross-link interference generated by the second UE. In some examples, the full duplex component 1230 is capable of, configured to, or operable to support a means for selecting a sidelink receive beam and an uplink transmit beam based on having a low corresponding value in the cross-link interference measurement report, where transmitting the reverse link message via the uplink signaling while continuing to receive the sidelink signaling in accordance with the full duplex mode is based on selecting the sidelink receive beam and the uplink transmit beam.

In some examples, the capability component 1235 is capable of, configured to, or operable to support a means for transmitting, via the relay report, an indication that the first UE supports relaying the one or more reverse link messages in the full duplex mode, where the network entity allocates sidelink resources to the first UE and the second UE and uplink resources to the UE based on the indication that the first UE supports relaying, where the sidelink resources and the uplink resources at least partially overlap in time according to the full duplex mode.

In some examples, the full duplex component 1230 is capable of, configured to, or operable to support a means for transmitting, via the relay report, an indication of a quantity of sidelink grants corresponding to respective UEs of a set of multiple sidelink UEs including the second UE, each of the quantity of sidelink grants for sidelink resources that overlap at least partially in time with uplink resources corresponding to an uplink grant, where receiving the sidelink signaling and transmitting the uplink signaling is based on the indication of the quantity of sidelink grants.

In some examples, the reporting component 1225 is capable of, configured to, or operable to support a means for transmitting, via the relay report for each sidelink grant of the quantity of sidelink grants, an indication of one or more parameter values including time and frequency resources, a transmit power, a beam identifier, a transmission configuration indicator state identifier, a rank, a precoding matrix, a multi-transmission reception point parameter value, or any combination thereof.

In some examples, the capability component 1235 is capable of, configured to, or operable to support a means for receiving, from the network entity, control signaling scheduling periodic or aperiodic reporting indicating whether the first UE is capable of supporting full duplex relaying, where transmitting the relay report is based on receiving the control signaling.

In some examples, the measurement component 1250 is capable of, configured to, or operable to support a means for detecting, between an uplink transmission and a sidelink reception, that self-interference is below a threshold, where transmitting the relay report is based on the detecting.

In some examples, to support transmitting the relay report, the reporting component 1225 is capable of, configured to, or operable to support a means for multiplexing the relay report with an uplink data message via a physical uplink shared channel or with a control message via a physical uplink control channel.

In some examples, the full duplex component 1230 is capable of, configured to, or operable to support a means for receiving, from the network entity, an indication of a full duplex relay application time. In some examples, the full duplex component 1230 is capable of, configured to, or operable to support a means for exiting the full duplex mode upon expiration of the full duplex relay application time after transmitting the relay report.

Additionally, or alternatively, the communications manager 1220 may support wireless communications at a UE in accordance with examples as disclosed herein. The capability component 1235 is capable of, configured to, or operable to support a means for transmitting a full duplex capability report indicating that the UE is capable of supporting a full duplex mode of communication. The resource component 1240 is capable of, configured to, or operable to support a means for receiving, based on transmitting the full duplex capability report, control signaling indicating a sidelink resource pool including a set of multiple sidelink symbols, where each sidelink symbol of the set of multiple sidelink symbols corresponds to a full duplex format. In some examples, the full duplex component 1230 is capable of, configured to, or operable to support a means for transmitting sidelink signaling via one or more symbols of the set of multiple sidelink symbols according to a full duplex format.

In some examples, to support transmitting the sidelink signaling, the full duplex component 1230 is capable of, configured to, or operable to support a means for transmitting the sidelink signaling during a final symbol of the at least one sidelink symbol.

In some examples, to support transmitting the sidelink signaling, the full duplex component 1230 is capable of, configured to, or operable to support a means for transmitting the sidelink signaling during a first symbol preceding a second symbol that is adjacent to the first symbol and allocated for a physical sidelink feedback channel.

In some examples, the full duplex component 1230 is capable of, configured to, or operable to support a means for receiving sidelink feedback signaling via the second symbol based on the full duplex mode.

In some examples, to support transmitting the full duplex capability report, the capability component 1235 is capable of, configured to, or operable to support a means for transmitting the full duplex capability report to a controlling UE of a set of multiple sidelink UEs, or a network entity.

Figure 13:
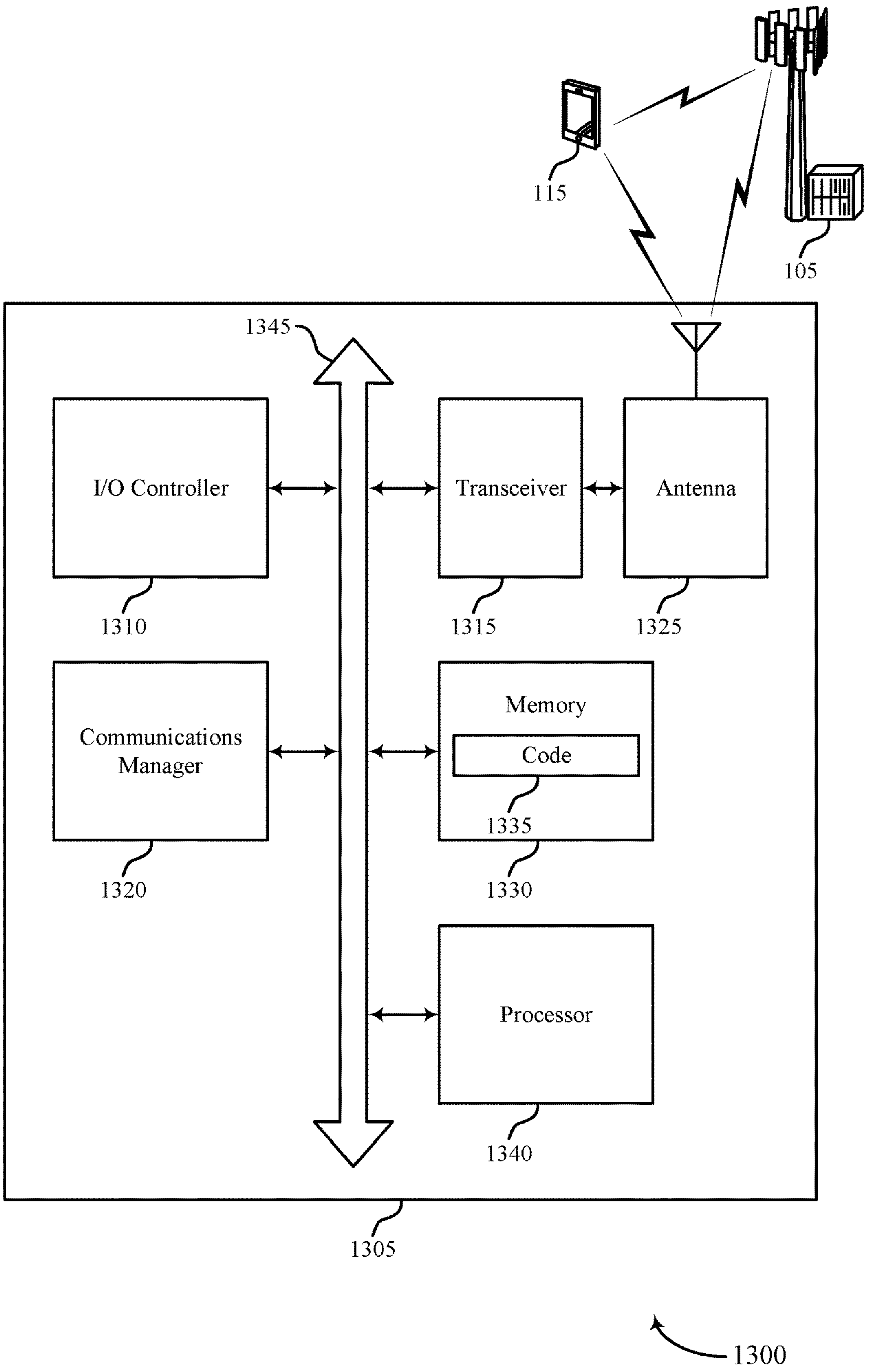
FIG. 13 shows a diagram of a system including a device that supports full duplex relay procedures in accordance with one or more aspects of the present disclosure.

FIG. 13 shows a diagram of a system 1300 including a device 1305 that supports full duplex relay procedures in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, a FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in memory (e.g., the memory 1330) to cause the device 1305 to perform various functions (e.g., functions or tasks supporting full duplex relay procedures). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a first UE in accordance with examples as disclosed herein. For example, the communications manager 1320 is capable of, configured to, or operable to support a means for transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The communications manager 1320 is capable of, configured to, or operable to support a means for receiving, at the first UE while operating in the full duplex mode, a reverse link message for the network entity via the sidelink signaling from the second UE. The communications manager 1320 is capable of, configured to, or operable to support a means for transmitting, by the first UE in accordance with the full duplex mode and the relay report, the reverse link message to the network entity via the uplink signaling while continuing to receive the sidelink signaling from the second UE.

Additionally, or alternatively, the communications manager 1320 may support wireless communications at a UE in accordance with examples as disclosed herein. For example, the communications manager 1320 is capable of, configured to, or operable to support a means for transmitting a full duplex capability report indicating that the UE is capable of supporting a full duplex mode of communication. The communications manager 1320 is capable of, configured to, or operable to support a means for receiving, based on transmitting the full duplex capability report, control signaling indicating a sidelink resource pool including a set of multiple sidelink symbols, where each sidelink symbol of the set of multiple sidelink symbols corresponds to a full duplex format. The communications manager 1320 is capable of, configured to, or operable to support a means for transmitting sidelink signaling via one or more symbols of the set of multiple sidelink symbols according to a full duplex format.

By including or configuring the communications manager 1320 in accordance with examples as described herein, the device 1305 may support techniques for improving communication throughput, coordinating full-duplex relaying, and reducing self-interference and cross-link interference at a UE.

In some examples, the communications manager 1320 may be configured to perform various operations (e.g., receiving, monitoring, transmitting) using or otherwise in cooperation with the transceiver 1315, the one or more antennas 1325, or any combination thereof. For example, the communications manager 1320 may be configured to receive or transmit messages or other signaling as described herein via a transceiver 1315. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of full duplex relay procedures as described herein, or the processor 1340 and the memory 1330 may be otherwise configured to perform or support such operations.

Figure 14:
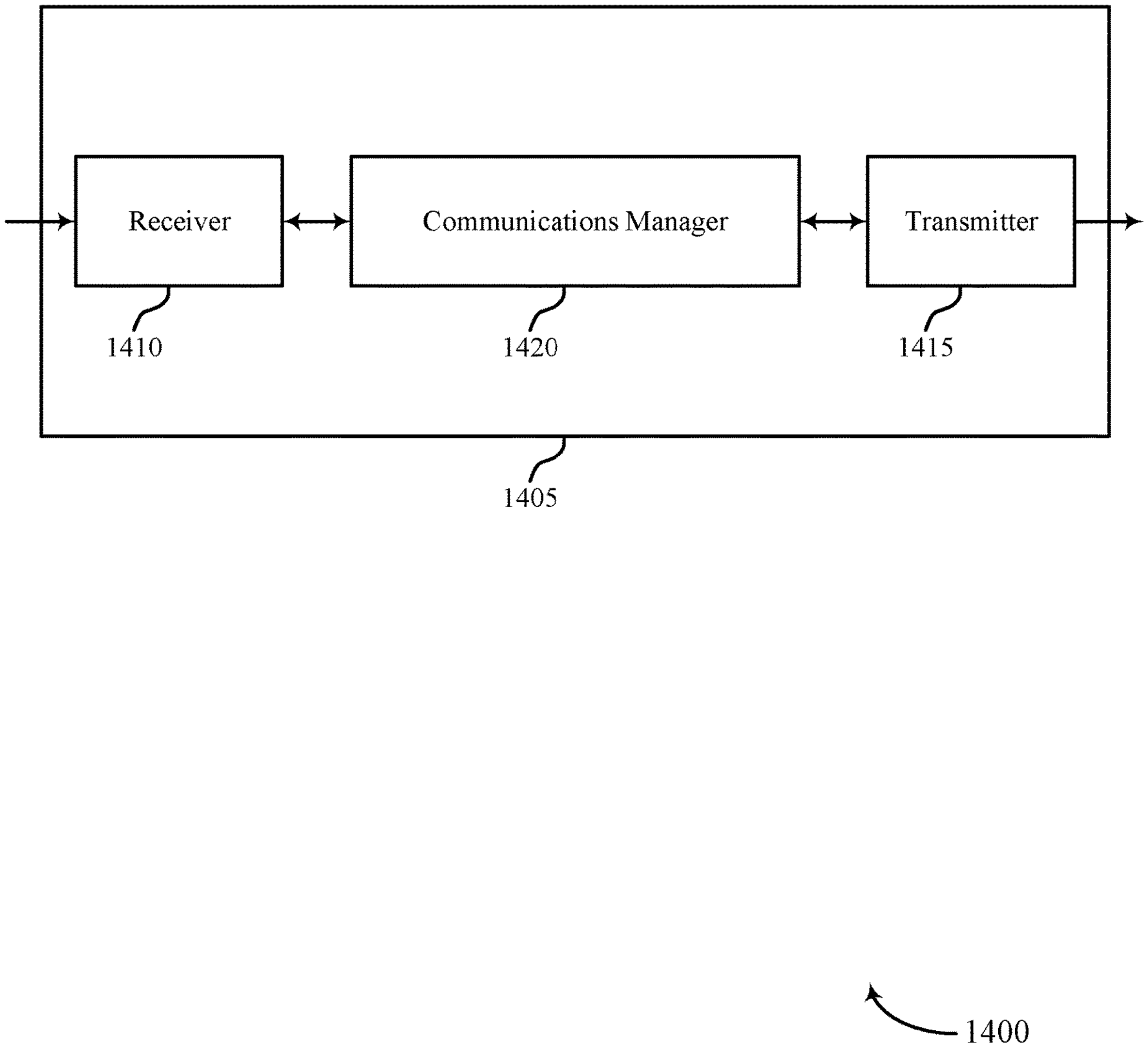
FIGS. 14 and 15 show block diagrams of devices that support full duplex relay procedures in accordance with one or more aspects of the present disclosure.

FIG. 14 shows a block diagram 1400 of a device 1405 that supports full duplex relay procedures in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of full duplex relay procedures as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 is capable of, configured to, or operable to support a means for receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The communications manager 1420 is capable of, configured to, or operable to support a means for transmitting an uplink grant to the first UE based on receiving the relay report, the uplink grant indicating uplink resources for the uplink signaling, the uplink resources at least partially overlapping in time with one or more sidelink resources for the sidelink signaling. The communications manager 1420 is capable of, configured to, or operable to support a means for receiving, from the first UE via one or more of the uplink resources associated with the uplink grant, the uplink signaling including a reverse link message from the second UE for the network entity.

Additionally, or alternatively, the communications manager 1420 may support wireless communications at a network entity in accordance with examples as disclosed herein. For example, the communications manager 1420 is capable of, configured to, or operable to support a means for receiving, from a UE a full duplex capability report indicating that the UE is capable of supporting a full duplex mode of communication. The communications manager 1420 is capable of, configured to, or operable to support a means for transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

By including or configuring the communications manager 1420 in accordance with examples as described herein, the device 1405 (e.g., a processor controlling or otherwise coupled with the receiver 1410, the transmitter 1415, the communications manager 1420, or any combination thereof) may support techniques for improving communication throughput, coordinating full-duplex relaying, and reducing self-interference and cross-link interference at a UE.

Figure 15:
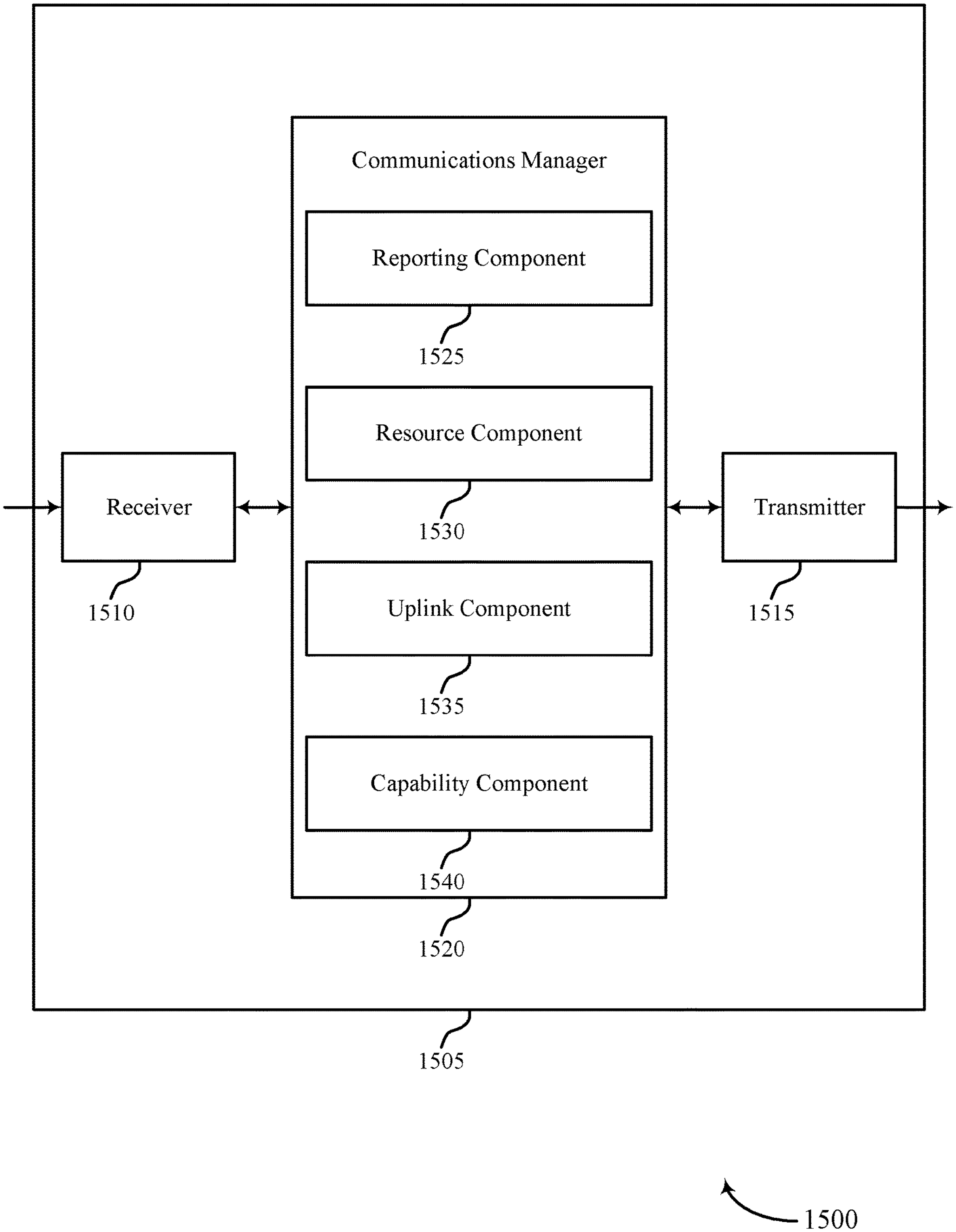

FIG. 15 shows a block diagram 1500 of a device 1505 that supports full duplex relay procedures in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of full duplex relay procedures as described herein. For example, the communications manager 1520 may include a reporting component 1525, a resource component 1530, an uplink component 1535, a capability component 1540, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The reporting component 1525 is capable of, configured to, or operable to support a means for receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The resource component 1530 is capable of, configured to, or operable to support a means for transmitting an uplink grant to the first UE based on receiving the relay report, the uplink grant indicating uplink resources for the uplink signaling, the uplink resources at least partially overlapping in time with one or more sidelink resources for the sidelink signaling. The uplink component 1535 is capable of, configured to, or operable to support a means for receiving, from the first UE via one or more of the uplink resources associated with the uplink grant, the uplink signaling including a reverse link message from the second UE for the network entity.

Additionally, or alternatively, the communications manager 1520 may support wireless communications at a network entity in accordance with examples as disclosed herein. The capability component 1540 is capable of, configured to, or operable to support a means for receiving, from a UE a full duplex capability report indicating that the UE is capable of supporting a full duplex mode of communication. The resource component 1530 is capable of, configured to, or operable to support a means for transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

Figure 16:
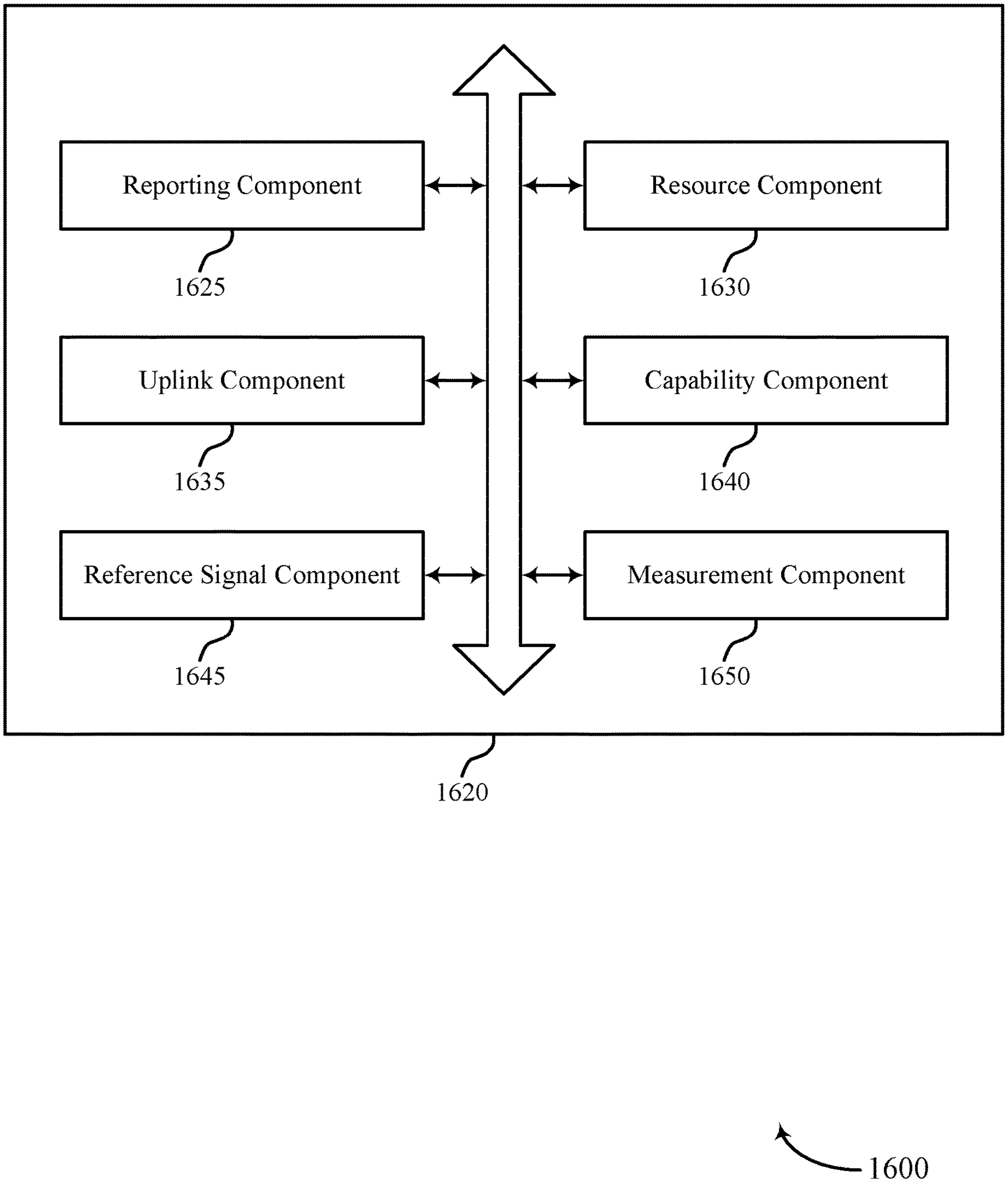
FIG. 16 shows a block diagram of a communications manager that supports full duplex relay procedures in accordance with one or more aspects of the present disclosure.

FIG. 16 shows a block diagram 1600 of a communications manager 1620 that supports full duplex relay procedures in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of full duplex relay procedures as described herein. For example, the communications manager 1620 may include a reporting component 1625, a resource component 1630, an uplink component 1635, a capability component 1640, a reference signal component 1645, a measurement component 1650, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The reporting component 1625 is capable of, configured to, or operable to support a means for receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The resource component 1630 is capable of, configured to, or operable to support a means for transmitting an uplink grant to the first UE based on receiving the relay report, the uplink grant indicating uplink resources for the uplink signaling, the uplink resources at least partially overlapping in time with one or more sidelink resources for the sidelink signaling. The uplink component 1635 is capable of, configured to, or operable to support a means for receiving, from the first UE via one or more of the uplink resources associated with the uplink grant, the uplink signaling including a reverse link message from the second UE for the network entity.

In some examples, the reporting component 1625 is capable of, configured to, or operable to support a means for receiving, via the relay report, an indication of a candidate uplink resource or a candidate uplink beam for the first UE to use for transmitting the uplink signaling via the one or more of the uplink resources, where receiving the uplink signaling includes receiving the uplink signaling via the candidate uplink resource or the candidate uplink beam.

In some examples, the uplink component 1635 is capable of, configured to, or operable to support a means for transmitting, to the first UE, an indication of an uplink resource and an uplink beam selected by the network entity for receiving the uplink signaling, where receiving the uplink signaling includes receiving the uplink signaling via the uplink resource or the uplink beam.

In some examples, the reporting component 1625 is capable of, configured to, or operable to support a means for receiving, via the relay report, an indication of one or more sidelink measurement resources allocated for transmission of sidelink reference signals by the second UE, for performing cross-link interference measurements by the network entity. In some examples, the reference signal component 1645 is capable of, configured to, or operable to support a means for receiving the sidelink reference signals via the one or more sidelink measurement resources. In some examples, the measurement component 1650 is capable of, configured to, or operable to support a means for performing one or more cross-link interference measurements based on receiving the sidelink reference signals.

In some examples, the reporting component 1625 is capable of, configured to, or operable to support a means for receiving, via the relay report, an indication of one or more beams associated with the one or more sidelink measurement resources.

In some examples, the reporting component 1625 is capable of, configured to, or operable to support a means for transmitting, to the first UE based on the relay report, a cross-link interference measurement report corresponding to cross-link interference generated by signaling from the second UE.

In some examples, the resource component 1630 is capable of, configured to, or operable to support a means for receiving, via the relay report, an indication that the first UE supports relaying the one or more reverse link messages in the full duplex mode, where the network entity allocates sidelink resources to the first UE and the second UE and allocates uplink resources to the first UE based on the indication that the first UE supports relaying, where the sidelink resources and the uplink resources at least partially overlap in time according to the full duplex mode.

In some examples, the resource component 1630 is capable of, configured to, or operable to support a means for receiving, via the relay report, an indication of a quantity of sidelink grants corresponding to respective UEs of a set of multiple sidelink UEs including the second UE, each of the quantity of sidelink grants for sidelink resources that overlap at least partially in time with uplink resources corresponding to an uplink grant, where receiving the uplink signaling is based on the indication of the quantity of sidelink grants.

In some examples, the capability component 1640 is capable of, configured to, or operable to support a means for transmitting, to the first UE, control signaling scheduling periodic or aperiodic reporting indicating whether the first UE is capable of supporting full duplex relaying, where receiving the relay report is based on transmitting the control signaling.

Additionally, or alternatively, the communications manager 1620 may support wireless communications at a network entity in accordance with examples as disclosed herein. The capability component 1640 is capable of, configured to, or operable to support a means for receiving, from a UE a full duplex capability report indicating that the UE is capable of supporting a full duplex mode of communication. In some examples, the resource component 1630 is capable of, configured to, or operable to support a means for transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

Figure 17:
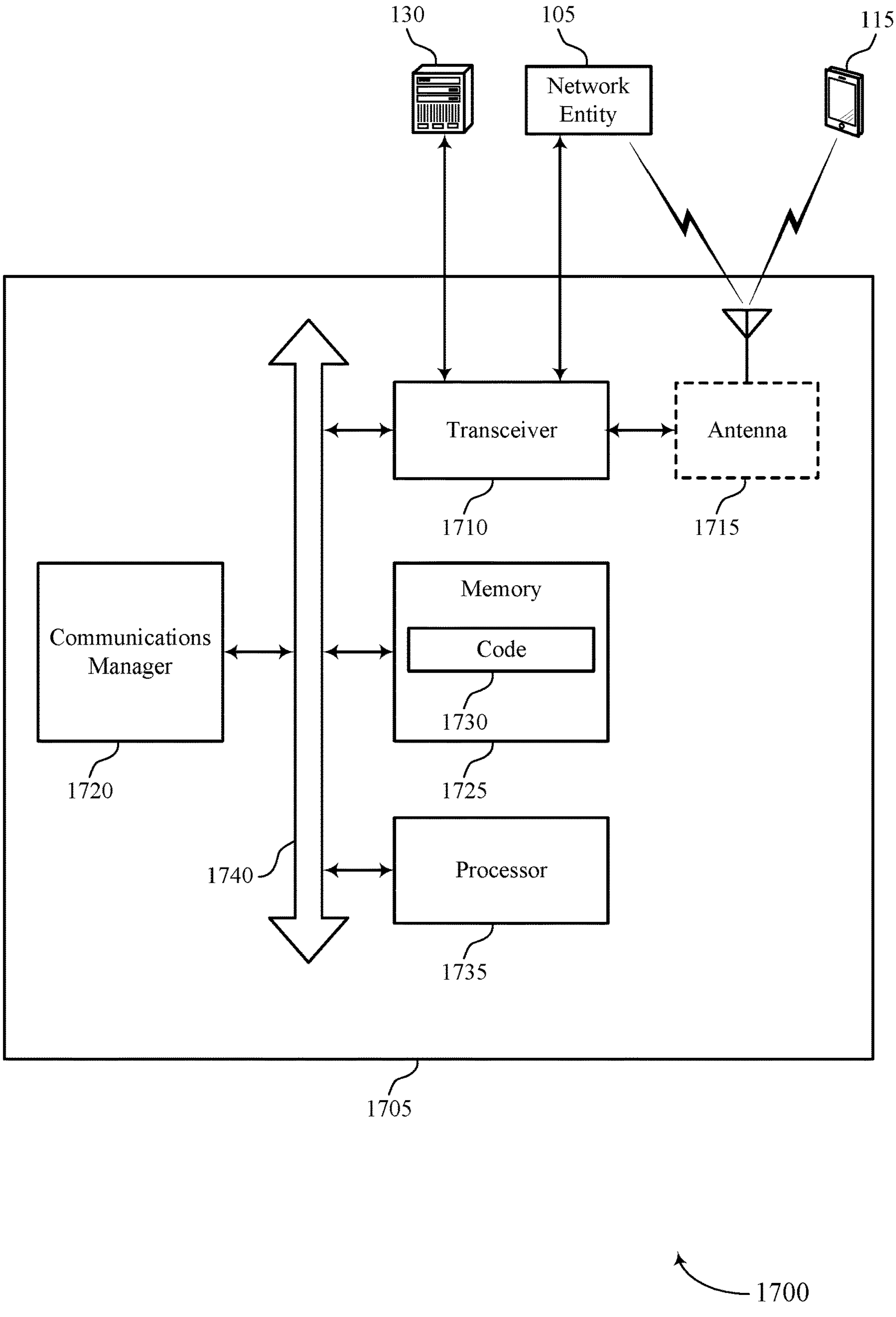
FIG. 17 shows a diagram of a system including a device that supports full duplex relay procedures in accordance with one or more aspects of the present disclosure.

FIG. 17 shows a diagram of a system 1700 including a device 1705 that supports full duplex relay procedures in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or any combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, a FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in memory (e.g., the memory 1725) to cause the device 1705 to perform various functions (e.g., functions or tasks supporting full duplex relay procedures). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705 and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105 and may include a controller or scheduler for controlling communications with UEs 115 in cooperation with other network entities 105. In some examples, the communications manager 1720 may support an X2 interface within a LTE/LTE-A wireless communications network technology to provide communication between network entities 105.

The communications manager 1720 may support wireless communications at a network entity in accordance with examples as disclosed herein. For example, the communications manager 1720 is capable of, configured to, or operable to support a means for receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The communications manager 1720 is capable of, configured to, or operable to support a means for transmitting an uplink grant to the first UE based on receiving the relay report, the uplink grant indicating uplink resources for the uplink signaling, the uplink resources at least partially overlapping in time with one or more sidelink resources for the sidelink signaling. The communications manager 1720 is capable of, configured to, or operable to support a means for receiving, from the first UE via one or more of the uplink resources associated with the uplink grant, the uplink signaling including a reverse link message from the second UE for the network entity.

Additionally, or alternatively, the communications manager 1720 may support wireless communications at a network entity in accordance with examples as disclosed herein. For example, the communications manager 1720 is capable of, configured to, or operable to support a means for receiving, from a UE a full duplex capability report indicating that the UE is capable of supporting a full duplex mode of communication. The communications manager 1720 is capable of, configured to, or operable to support a means for transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation.

By including or configuring the communications manager 1720 in accordance with examples as described herein, the device 1705 may support techniques for improving communication throughput, coordinating full-duplex relaying, and reducing self-interference and cross-link interference at a UE.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. For example, the communications manager 1720 may be configured to receive or transmit messages or other signaling as described herein via a transceiver 1710. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of full duplex relay procedures as described herein, or the processor 1735 and the memory 1725 may be otherwise configured to perform or support such operations.

Figure 18:
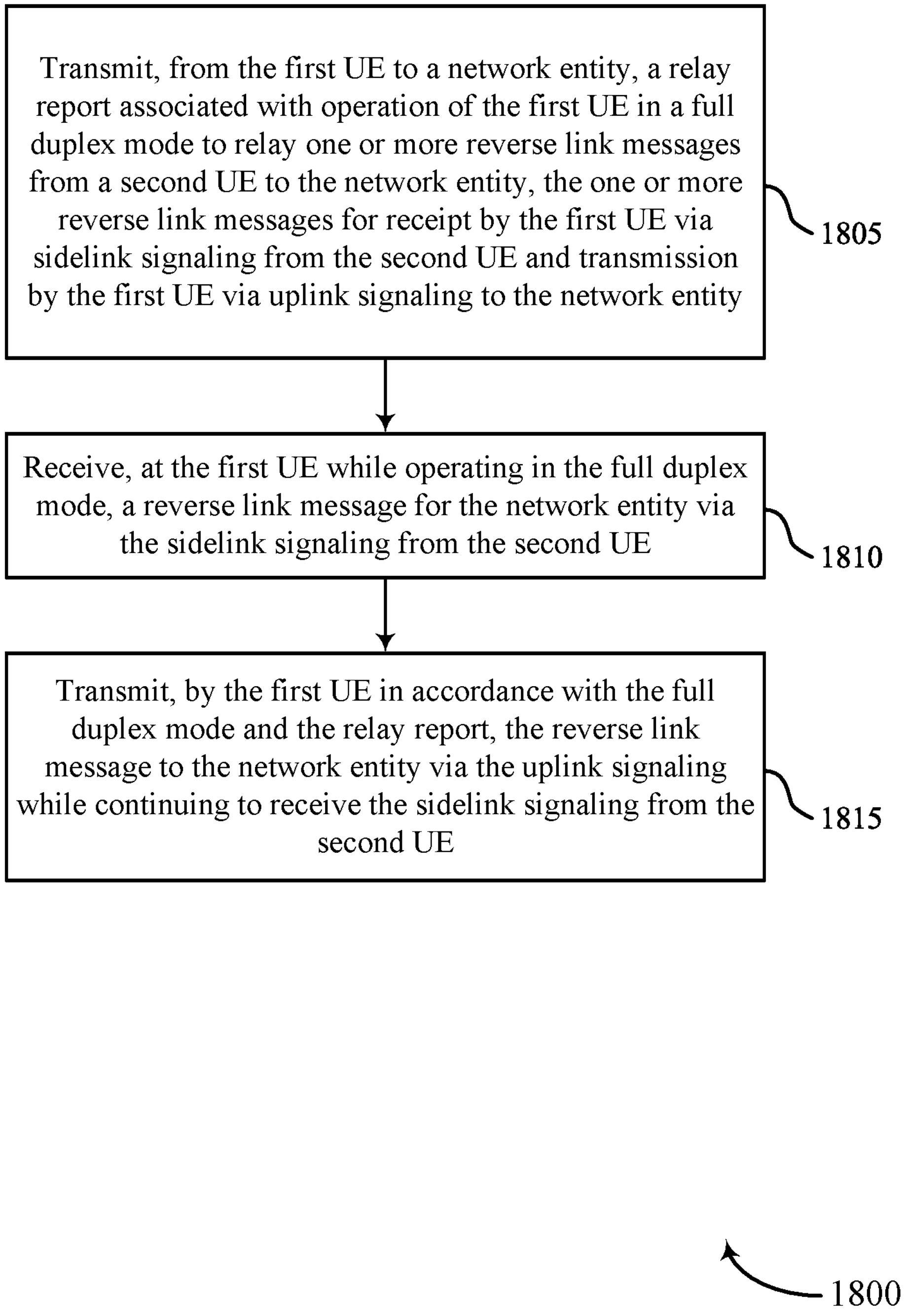
FIGS. 18 through 25 show flowcharts illustrating methods that support full duplex relay procedures in accordance with one or more aspects of the present disclosure.

FIG. 18 shows a flowchart illustrating a method 1800 that supports full duplex relay procedures in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the wireless UE to perform the described functions. Additionally, or alternatively, the wireless UE may perform aspects of the described functions using special-purpose hardware.

At 1805, the method may include transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The operations of 1805 may be performed in accordance with examples as disclosed herein. In some examples, aspects of the operations of 1805 may be performed by a reporting component 1225 as described with reference to FIG. 12. Additionally, or alternatively, means for performing 1805 may, but not necessarily, include, for example, antenna 1325, transceiver 1315, communications manager 1320, memory 1330 (including code 1335), processor 1340, bus 1345, or any combination thereof.

At 1810, the method may include receiving, at the first UE while operating in the full duplex mode, a reverse link message for the network entity via the sidelink signaling from the second UE. The operations of 1810 may be performed in accordance with examples as disclosed herein. In some examples, aspects of the operations of 1810 may be performed by a full duplex component 1230 as described with reference to FIG. 12. Additionally, or alternatively, means for performing 1810 may, but not necessarily, include, for example, antenna 1325, transceiver 1315, communications manager 1320, memory 1330 (including code 1335), processor 1340, bus 1345, or any combination thereof.

At 1815, the method may include transmitting, by the first UE in accordance with the full duplex mode and the relay report, the reverse link message to the network entity via the uplink signaling while continuing to receive the sidelink signaling from the second UE. The operations of 1815 may be performed in accordance with examples as disclosed herein. In some examples, aspects of the operations of 1815 may be performed by a full duplex component 1230 as described with reference to FIG. 12. Additionally, or alternatively, means for performing 1815 may, but not necessarily, include, for example, antenna 1325, transceiver 1315, communications manager 1320, memory 1330 (including code 1335), processor 1340, bus 1345, or any combination thereof.

Figure 19:
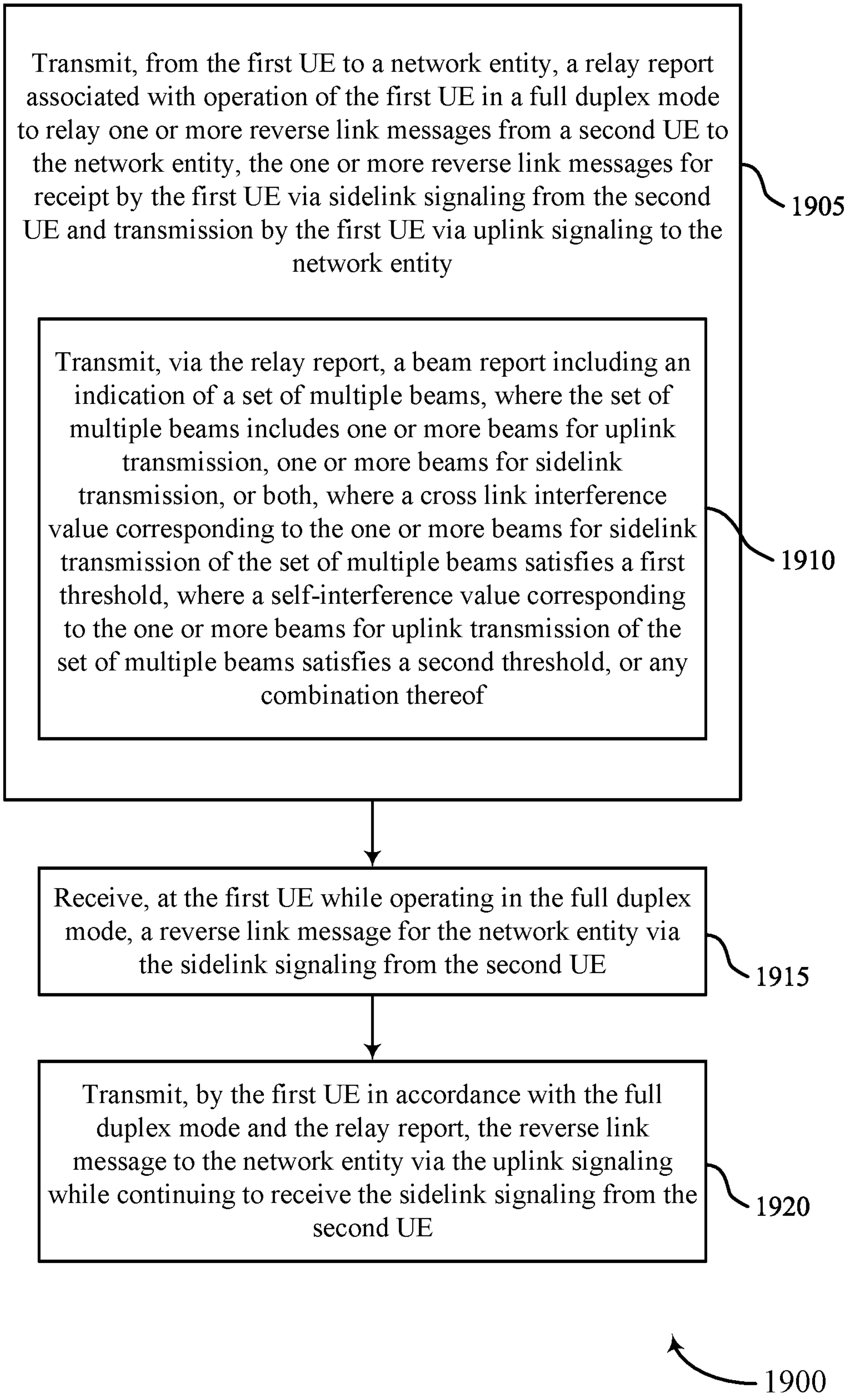

FIG. 19 shows a flowchart illustrating a method 1900 that supports full duplex relay procedures in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the wireless UE to perform the described functions. Additionally, or alternatively, the wireless UE may perform aspects of the described functions using special-purpose hardware.

At 1905, the method may include transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The operations of 1905 may be performed in accordance with examples as disclosed herein. In some examples, aspects of the operations of 1905 may be performed by a reporting component 1225 as described with reference to FIG. 12. Additionally, or alternatively, means for performing 1905 may, but not necessarily, include, for example, antenna 1325, transceiver 1315, communications manager 1320, memory 1330 (including code 1335), processor 1340, bus 1345, or any combination thereof.

At 1910, the method may include transmitting, via the relay report, a beam report including an indication of a set of multiple beams, where the set of multiple beams includes one or more beams for uplink transmission, one or more beams for sidelink transmission, or both, where a cross-link interference value corresponding to the one or more beams for sidelink transmission of the set of multiple beams satisfies a first threshold, where a self-interference value corresponding to the one or more beams for uplink transmission of the set of multiple beams satisfies a second threshold, or any combination thereof. The operations of 1910 may be performed in accordance with examples as disclosed herein. In some examples, aspects of the operations of 1910 may be performed by a reporting component 1225 as described with reference to FIG. 12. Additionally, or alternatively, means for performing 1910 may, but not necessarily, include, for example, antenna 1325, transceiver 1315, communications manager 1320, memory 1330 (including code 1335), processor 1340, bus 1345, or any combination thereof.

At 1915, the method may include receiving, at the first UE while operating in the full duplex mode, a reverse link message for the network entity via the sidelink signaling from the second UE. The operations of 1915 may be performed in accordance with examples as disclosed herein. In some examples, aspects of the operations of 1915 may be performed by a full duplex component 1230 as described with reference to FIG. 12. Additionally, or alternatively, means for performing 1915 may, but not necessarily, include, for example, antenna 1325, transceiver 1315, communications manager 1320, memory 1330 (including code 1335), processor 1340, bus 1345, or any combination thereof.

At 1920, the method may include transmitting, by the first UE in accordance with the full duplex mode and the relay report, the reverse link message to the network entity via the uplink signaling while continuing to receive the sidelink signaling from the second UE. The operations of 1920 may be performed in accordance with examples as disclosed herein. In some examples, aspects of the operations of 1920 may be performed by a full duplex component 1230 as described with reference to FIG. 12. Additionally, or alternatively, means for performing 1920 may, but not necessarily, include, for example, antenna 1325, transceiver 1315, communications manager 1320, memory 1330 (including code 1335), processor 1340, bus 1345, or any combination thereof.

Figure 20:
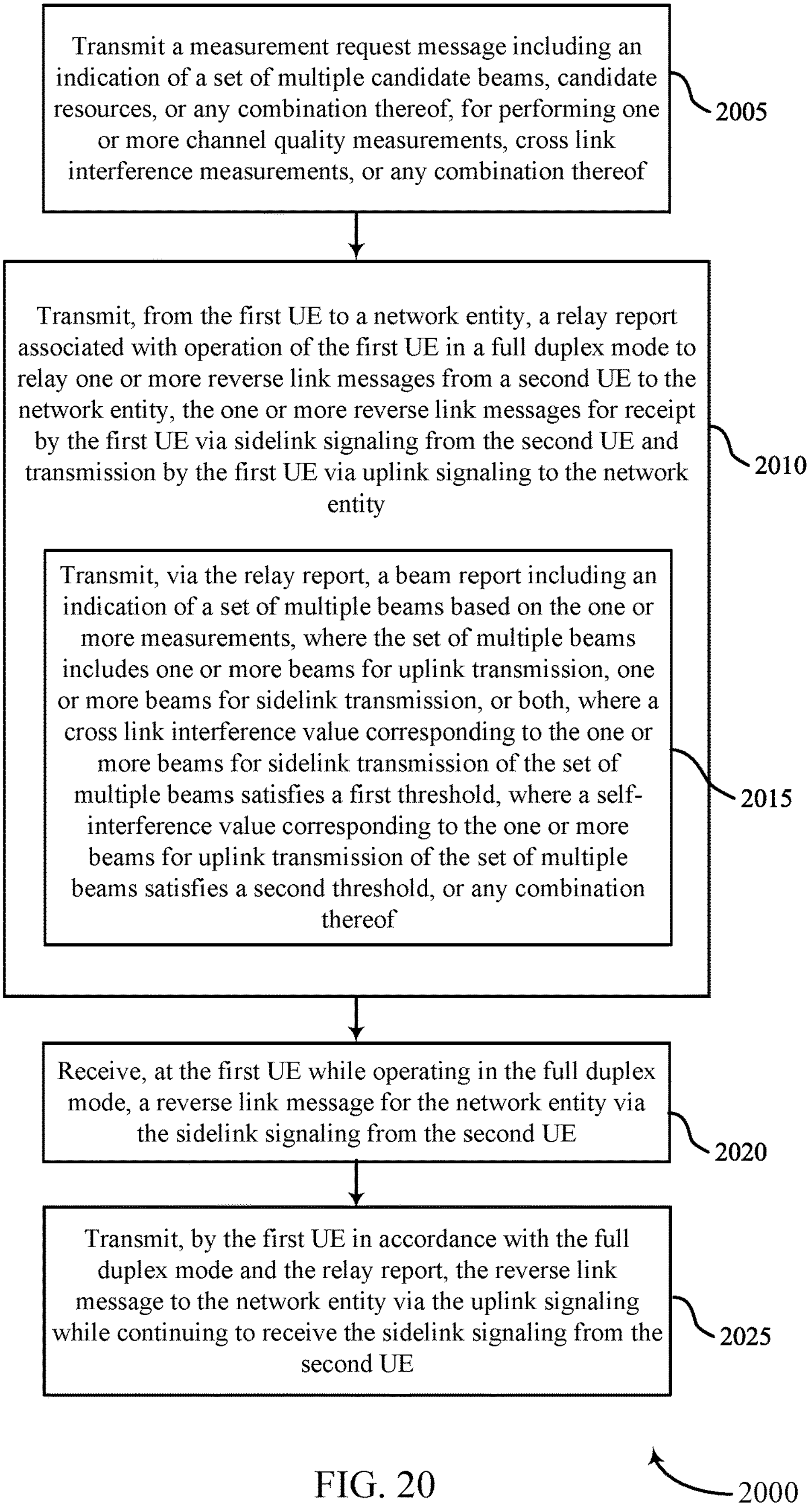

FIG. 20 shows a flowchart illustrating a method 2000 that supports full duplex relay procedures in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the wireless UE to perform the described functions. Additionally, or alternatively, the wireless UE may perform aspects of the described functions using special-purpose hardware.

At 2005, the method may include transmitting a measurement request message including an indication of a set of multiple candidate beams, candidate resources, or any combination thereof, for performing one or more channel quality measurements, cross-link interference measurements, or any combination thereof. The operations of 2005 may be performed in accordance with examples as disclosed herein. In some examples, aspects of the operations of 2005 may be performed by a measurement component 1250 as described with reference to FIG. 12. Additionally, or alternatively, means for performing 2005 may, but not necessarily, include, for example, antenna 1325, transceiver 1315, communications manager 1320, memory 1330 (including code 1335), processor 1340, bus 1345, or any combination thereof.

At 2010, the method may include transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The operations of 2010 may be performed in accordance with examples as disclosed herein. In some examples, aspects of the operations of 2010 may be performed by a reporting component 1225 as described with reference to FIG. 12. Additionally, or alternatively, means for performing 2010 may, but not necessarily, include, for example, antenna 1325, transceiver 1315, communications manager 1320, memory 1330 (including code 1335), processor 1340, bus 1345, or any combination thereof.

At 2015, the method may include transmitting, via the relay report, a beam report including an indication of a set of multiple beams based on the one or more measurements, where the set of multiple beams includes one or more beams for uplink transmission, one or more beams for sidelink transmission, or both, where a cross-link interference value corresponding to the one or more beams for sidelink transmission of the set of multiple beams satisfies a first threshold, where a self-interference value corresponding to the one or more beams for uplink transmission of the set of multiple beams satisfies a second threshold, or any combination thereof. The operations of 2015 may be performed in accordance with examples as disclosed herein. In some examples, aspects of the operations of 2015 may be performed by a reporting component 1225 as described with reference to FIG. 12. Additionally, or alternatively, means for performing 2015 may, but not necessarily, include, for example, antenna 1325, transceiver 1315, communications manager 1320, memory 1330 (including code 1335), processor 1340, bus 1345, or any combination thereof.

At 2020, the method may include receiving, at the first UE while operating in the full duplex mode, a reverse link message for the network entity via the sidelink signaling from the second UE. The operations of 2020 may be performed in accordance with examples as disclosed herein. In some examples, aspects of the operations of 2020 may be performed by a full duplex component 1230 as described with reference to FIG. 12. Additionally, or alternatively, means for performing 2020 may, but not necessarily, include, for example, antenna 1325, transceiver 1315, communications manager 1320, memory 1330 (including code 1335), processor 1340, bus 1345, or any combination thereof.

At 2025, the method may include transmitting, by the first UE in accordance with the full duplex mode and the relay report, the reverse link message to the network entity via the uplink signaling while continuing to receive the sidelink signaling from the second UE. The operations of 2025 may be performed in accordance with examples as disclosed herein. In some examples, aspects of the operations of 2025 may be performed by a full duplex component 1230 as described with reference to FIG. 12. Additionally, or alternatively, means for performing 2025 may, but not necessarily, include, for example, antenna 1325, transceiver 1315, communications manager 1320, memory 1330 (including code 1335), processor 1340, bus 1345, or any combination thereof.

Figure 21:
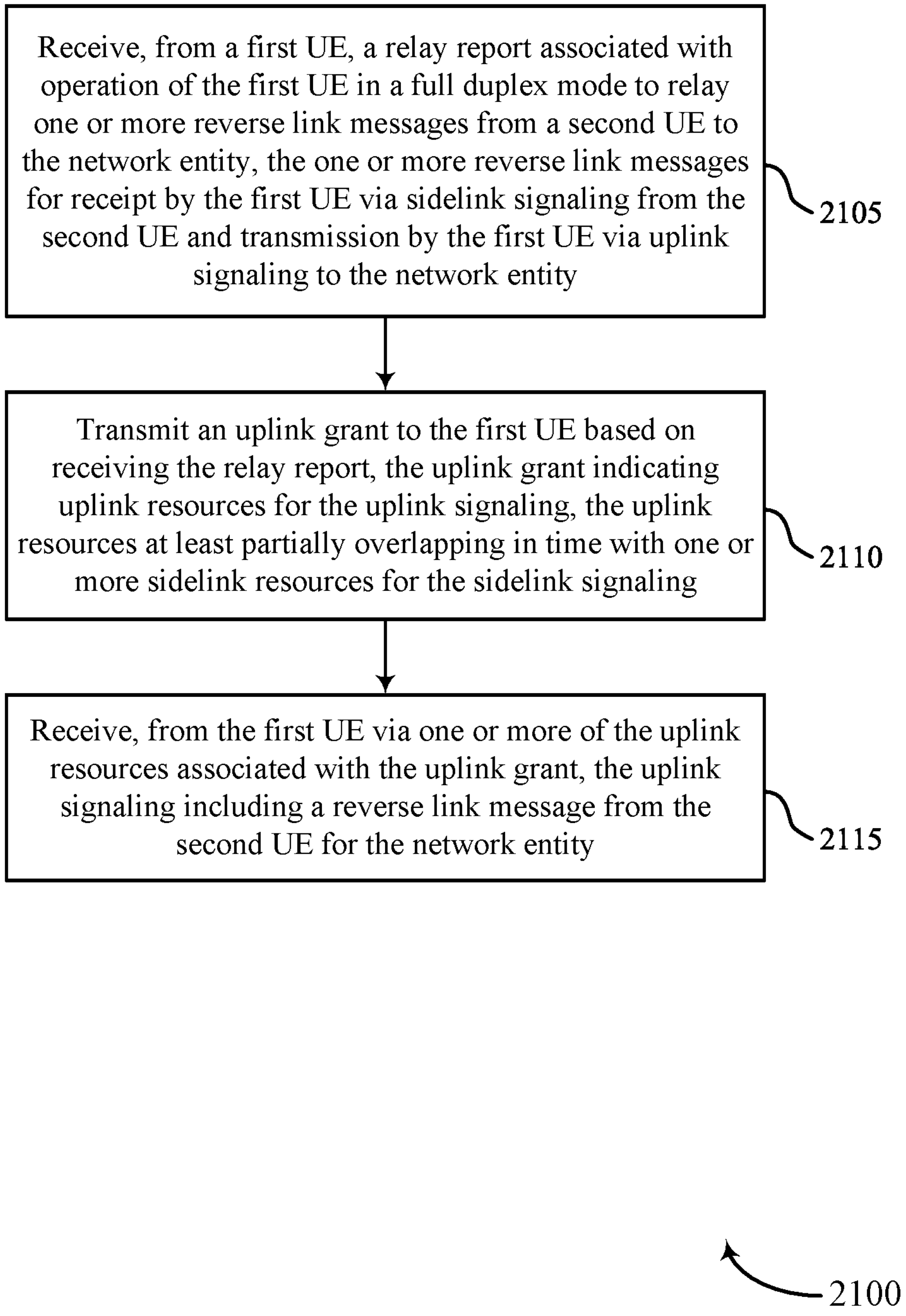

FIG. 21 shows a flowchart illustrating a method 2100 that supports full duplex relay procedures in accordance with aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the wireless network entity to perform the described functions. Additionally, or alternatively, the wireless network entity may perform aspects of the described functions using special-purpose hardware.

At 2105, the method may include receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The operations of 2105 may be performed in accordance with examples as disclosed herein. In some examples, aspects of the operations of 2105 may be performed by a reporting component 1625 as described with reference to FIG. 16. Additionally, or alternatively, means for performing 2105 may, but not necessarily, include, for example, antenna 1715, transceiver 1710, communications manager 1720, memory 1725 (including code 1730), processor 1735, bus 1740, or any combination thereof.

At 2110, the method may include transmitting an uplink grant to the first UE based on receiving the relay report, the uplink grant indicating uplink resources for the uplink signaling, the uplink resources at least partially overlapping in time with one or more sidelink resources for the sidelink signaling. The operations of 2110 may be performed in accordance with examples as disclosed herein. In some examples, aspects of the operations of 2110 may be performed by a resource component 1630 as described with reference to FIG. 16. Additionally, or alternatively, means for performing 2110 may, but not necessarily, include, for example, antenna 1715, transceiver 1710, communications manager 1720, memory 1725 (including code 1730), processor 1735, bus 1740, or any combination thereof.

At 2115, the method may include receiving, from the first UE via one or more of the uplink resources associated with the uplink grant, the uplink signaling including a reverse link message from the second UE for the network entity. The operations of 2115 may be performed in accordance with examples as disclosed herein. In some examples, aspects of the operations of 2115 may be performed by an uplink component 1635 as described with reference to FIG. 16. Additionally, or alternatively, means for performing 2115 may, but not necessarily, include, for example, antenna 1715, transceiver 1710, communications manager 1720, memory 1725 (including code 1730), processor 1735, bus 1740, or any combination thereof.

Figure 22:
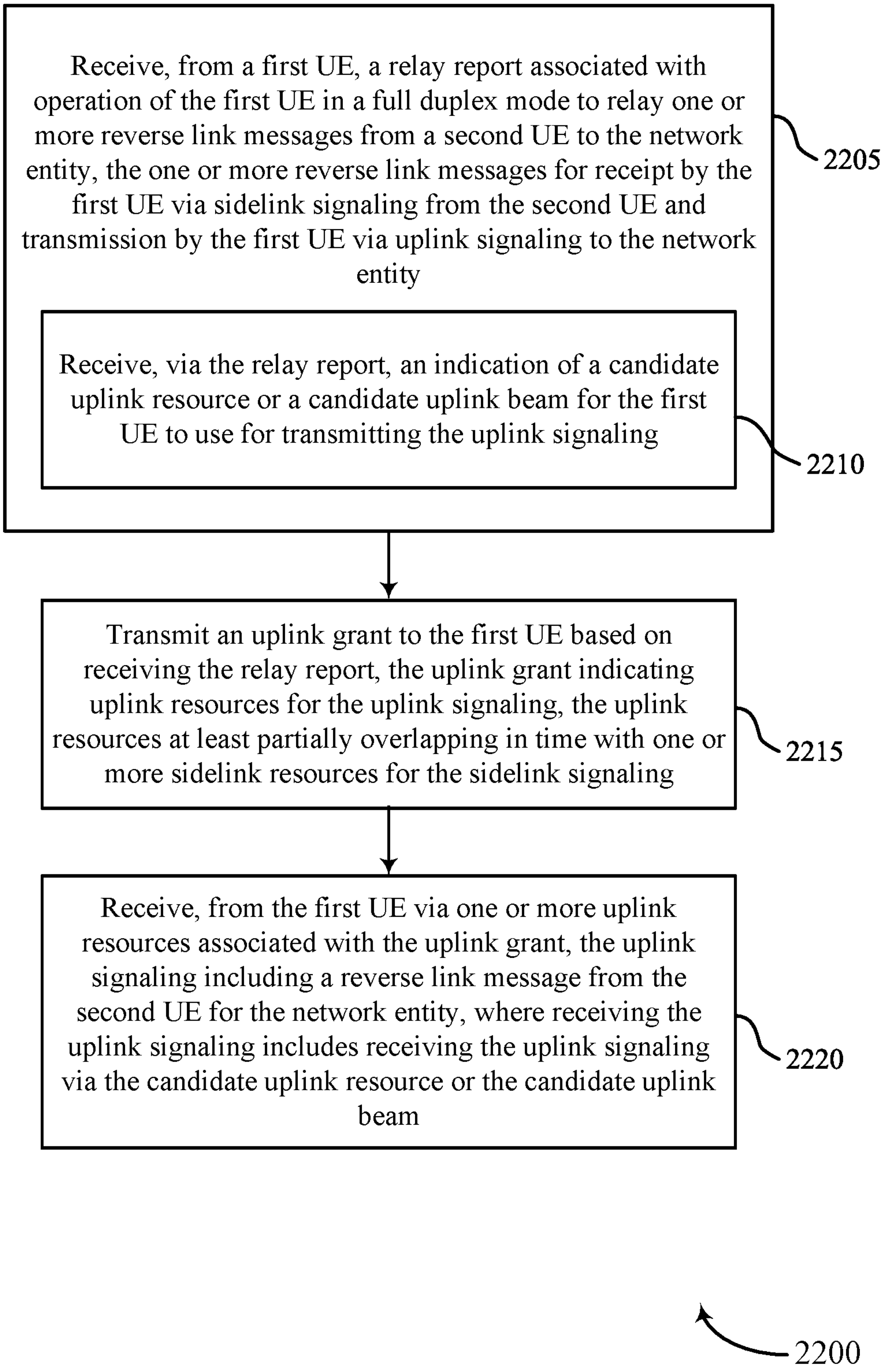

FIG. 22 shows a flowchart illustrating a method 2200 that supports full duplex relay procedures in accordance with aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the wireless network entity to perform the described functions. Additionally, or alternatively, the wireless network entity may perform aspects of the described functions using special-purpose hardware.

At 2205, the method may include receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity. The operations of 2205 may be performed in accordance with examples as disclosed herein. In some examples, aspects of the operations of 2205 may be performed by a reporting component 1625 as described with reference to FIG. 16. Additionally, or alternatively, means for performing 2205 may, but not necessarily, include, for example, antenna 1715, transceiver 1710, communications manager 1720, memory 1725 (including code 1730), processor 1735, bus 1740, or any combination thereof.

At 2210, the method may include receiving, via the relay report, an indication of a candidate uplink resource or a candidate uplink beam for the first UE to use for transmitting the uplink signaling. The operations of 2210 may be performed in accordance with examples as disclosed herein. In some examples, aspects of the operations of 2210 may be performed by a reporting component 1625 as described with reference to FIG. 16. Additionally, or alternatively, means for performing 2210 may, but not necessarily, include, for example, antenna 1715, transceiver 1710, communications manager 1720, memory 1725 (including code 1730), processor 1735, bus 1740, or any combination thereof.

At 2215, the method may include transmitting an uplink grant to the first UE based on receiving the relay report, the uplink grant indicating uplink resources for the uplink signaling, the uplink resources at least partially overlapping in time with one or more sidelink resources for the sidelink signaling. The operations of 2215 may be performed in accordance with examples as disclosed herein. In some examples, aspects of the operations of 2215 may be performed by a resource component 1630 as described with reference to FIG. 16. Additionally, or alternatively, means for performing 2215 may, but not necessarily, include, for example, antenna 1715, transceiver 1710, communications manager 1720, memory 1725 (including code 1730), processor 1735, bus 1740, or any combination thereof.

At 2220, the method may include receiving, from the first UE via one or more of the uplink resources associated with the uplink grant, the uplink signaling including a reverse link message from the second UE for the network entity, where receiving the uplink signaling includes receiving the uplink signaling via the candidate uplink resource or the candidate uplink beam. The operations of 2220 may be performed in accordance with examples as disclosed herein. In some examples, aspects of the operations of 2220 may be performed by an uplink component 1635 as described with reference to FIG. 16. Additionally, or alternatively, means for performing 2220 may, but not necessarily, include, for example, antenna 1715, transceiver 1710, communications manager 1720, memory 1725 (including code 1730), processor 1735, bus 1740, or any combination thereof.

Figure 23:
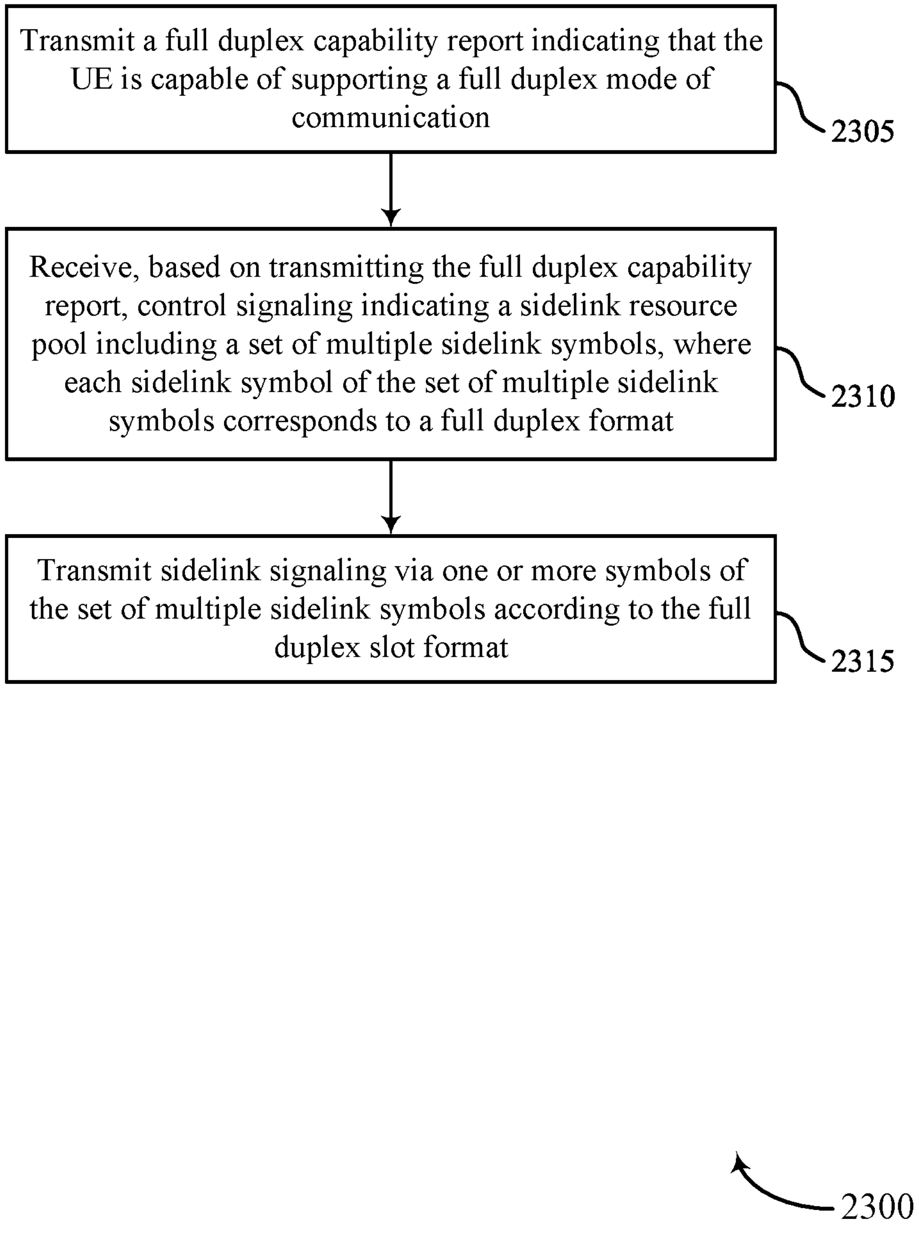

FIG. 23 shows a flowchart illustrating a method 2300 that supports full duplex relay procedures in accordance with aspects of the present disclosure. The operations of the method 2300 may be implemented by a UE or its components as described herein. For example, the operations of the method 2300 may be performed by a UE 115 as described with reference to FIGS. 1 through 13. In some examples, a UE may execute a set of instructions to control the functional elements of the wireless UE to perform the described functions. Additionally, or alternatively, the wireless UE may perform aspects of the described functions using special-purpose hardware.

At 2305, the method may include transmitting a full duplex capability report indicating that the UE is capable of supporting a full duplex mode of communication. The operations of 2305 may be performed in accordance with examples as disclosed herein. In some examples, aspects of the operations of 2305 may be performed by a capability component 1235 as described with reference to FIG. 12. Additionally, or alternatively, means for performing 2305 may, but not necessarily, include, for example, antenna 1715, transceiver 1710, communications manager 1720, memory 1725 (including code 1730), processor 1735, bus 1740, or any combination thereof.

At 2310, the method may include receiving, based on transmitting the full duplex capability report, control signaling indicating a sidelink resource pool including a set of multiple sidelink symbols, where each sidelink symbol of the set of multiple sidelink symbols corresponds to a full duplex format. The operations of 2310 may be performed in accordance with examples as disclosed herein. In some examples, aspects of the operations of 2310 may be performed by a resource component 1240 as described with reference to FIG. 12. Additionally, or alternatively, means for performing 2310 may, but not necessarily, include, for example, antenna 1715, transceiver 1710, communications manager 1720, memory 1725 (including code 1730), processor 1735, bus 1740, or any combination thereof.

At 2315, the method may include transmitting sidelink signaling via one or more symbols of the set of multiple sidelink symbols according to a full duplex format. The operations of 2315 may be performed in accordance with examples as disclosed herein. In some examples, aspects of the operations of 2315 may be performed by a full duplex component 1230 as described with reference to FIG. 12. Additionally, or alternatively, means for performing 2315 may, but not necessarily, include, for example, antenna 1715, transceiver 1710, communications manager 1720, memory 1725 (including code 1730), processor 1735, bus 1740, or any combination thereof.

Figure 24:
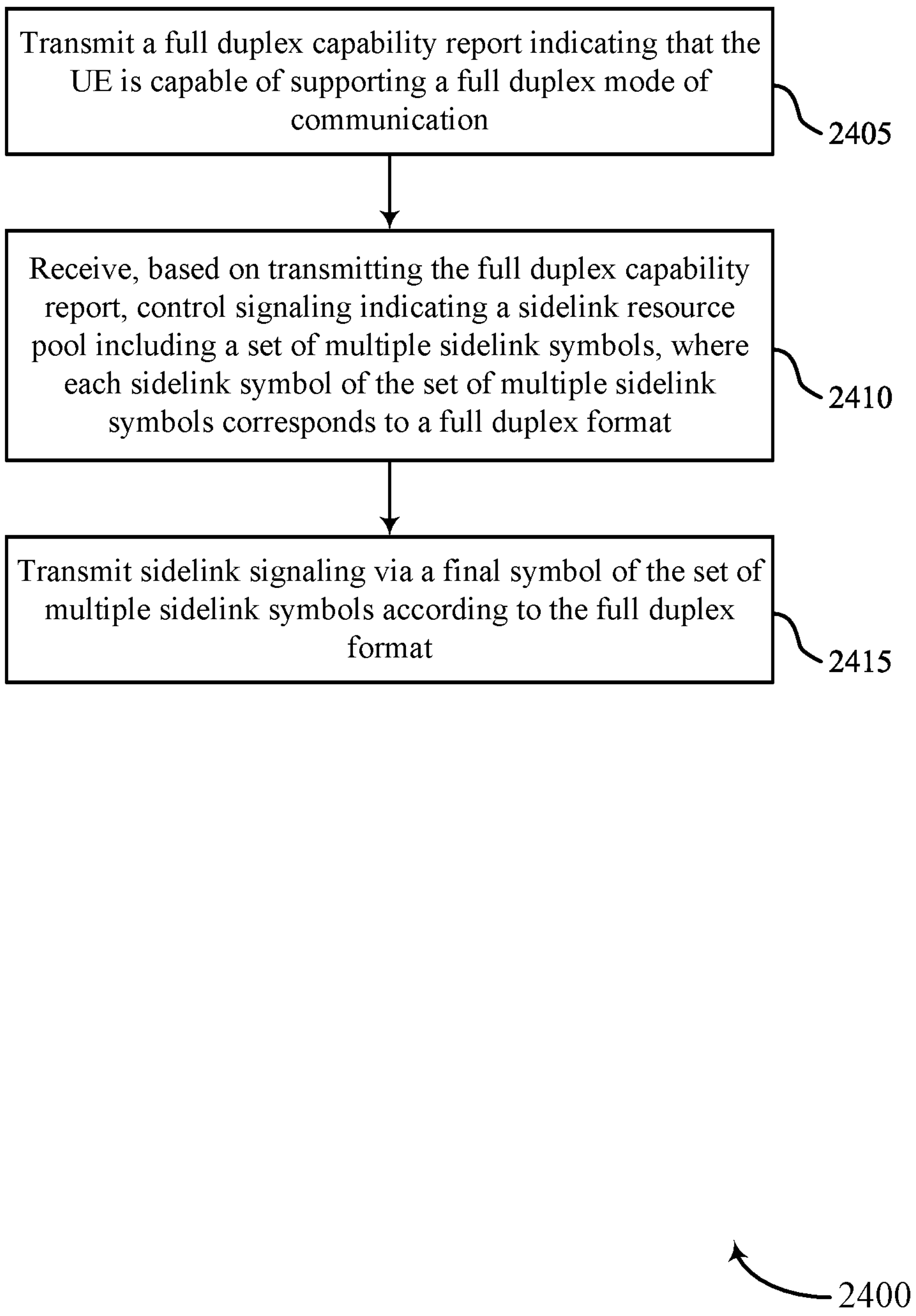

FIG. 24 shows a flowchart illustrating a method 2400 that supports full duplex relay procedures in accordance with aspects of the present disclosure. The operations of the method 2400 may be implemented by a UE or its components as described herein. For example, the operations of the method 2400 may be performed by a UE 115 as described with reference to FIGS. 1 through 13. In some examples, a UE may execute a set of instructions to control the functional elements of the wireless UE to perform the described functions. Additionally, or alternatively, the wireless UE may perform aspects of the described functions using special-purpose hardware.

At 2405, the method may include transmitting a full duplex capability report indicating that the UE is capable of supporting a full duplex mode of communication. The operations of 2405 may be performed in accordance with examples as disclosed herein. In some examples, aspects of the operations of 2405 may be performed by a capability component 1235 as described with reference to FIG. 12. Additionally, or alternatively, means for performing 2405 may, but not necessarily, include, for example, antenna 1715, transceiver 1710, communications manager 1720, memory 1725 (including code 1730), processor 1735, bus 1740, or any combination thereof.

At 2410, the method may include receiving, based on transmitting the full duplex capability report, control signaling indicating a sidelink resource pool including a set of multiple sidelink symbols, where each sidelink symbol of the set of multiple sidelink symbols corresponds to a full duplex format. The operations of 2410 may be performed in accordance with examples as disclosed herein. In some examples, aspects of the operations of 2410 may be performed by a resource component 1240 as described with reference to FIG. 12. Additionally, or alternatively, means for performing 2410 may, but not necessarily, include, for example, antenna 1715, transceiver 1710, communications manager 1720, memory 1725 (including code 1730), processor 1735, bus 1740, or any combination thereof.

At 2415, the method may include transmitting sidelink signaling via a final symbol of the set of multiple sidelink symbols according to the full duplex format. The operations of 2415 may be performed in accordance with examples as disclosed herein. In some examples, aspects of the operations of 2415 may be performed by a full duplex component 1230 as described with reference to FIG. 12. Additionally, or alternatively, means for performing 2415 may, but not necessarily, include, for example, antenna 1715, transceiver 1710, communications manager 1720, memory 1725 (including code 1730), processor 1735, bus 1740, or any combination thereof.

Figure 25:
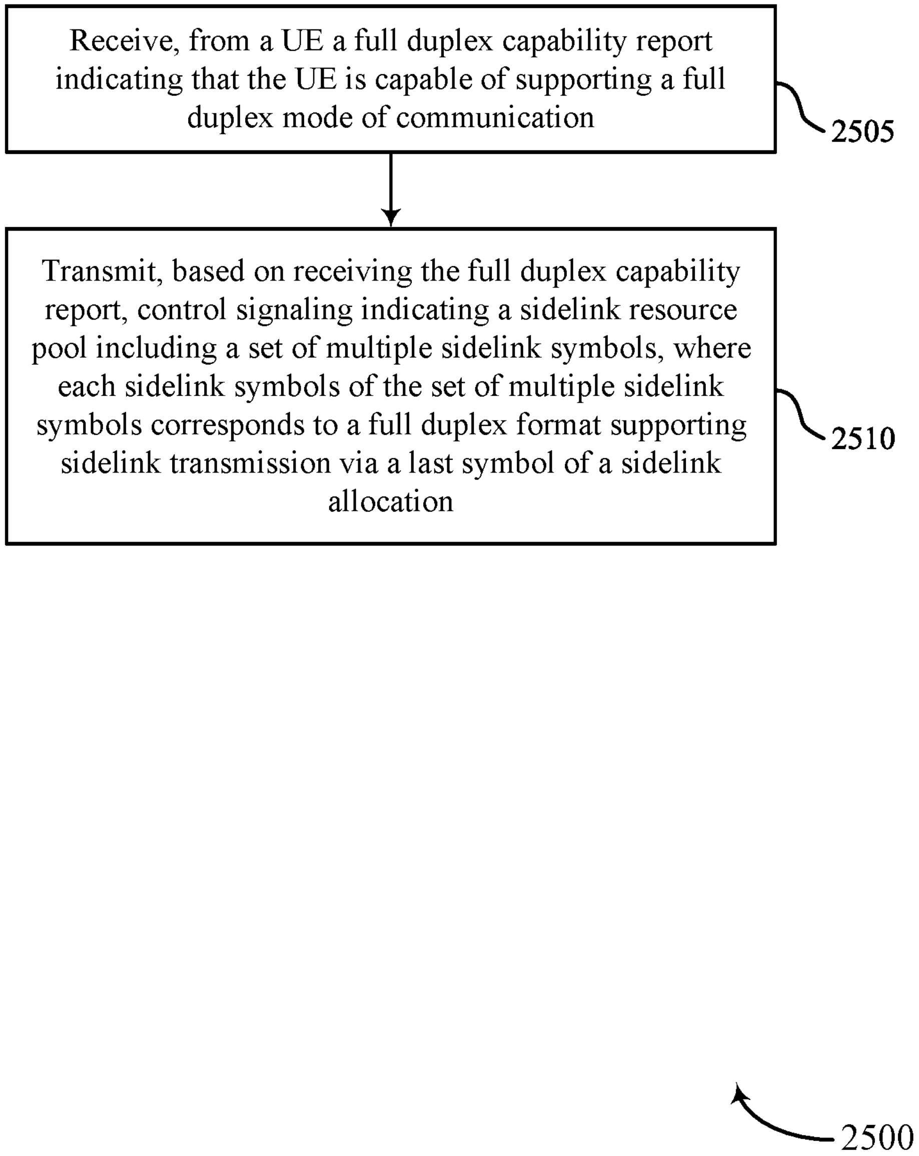

FIG. 25 shows a flowchart illustrating a method 2500 that supports full duplex relay procedures in accordance with aspects of the present disclosure. The operations of the method 2500 may be implemented by a network entity or its components as described herein. For example, the operations of the method 2500 may be performed by a network entity as described with reference to FIGS. 1 through 9 and 14 through 17. In some examples, a network entity may execute a set of instructions to control the functional elements of the wireless network entity to perform the described functions. Additionally, or alternatively, the wireless network entity may perform aspects of the described functions using special-purpose hardware.

At 2505, the method may include receiving, from a UE a full duplex capability report indicating that the UE is capable of supporting a full duplex mode of communication. The operations of 2505 may be performed in accordance with examples as disclosed herein. In some examples, aspects of the operations of 2505 may be performed by a capability component 1640 as described with reference to FIG. 16. Additionally, or alternatively, means for performing 2505 may, but not necessarily, include, for example, antenna 1715, transceiver 1710, communications manager 1720, memory 1725 (including code 1730), processor 1735, bus 1740, or any combination thereof.

At 2510, the method may include transmitting, based on receiving the full duplex capability report, control signaling indicating a sidelink resource pool including a set of multiple sidelink symbols, where each sidelink symbol of the set of multiple sidelink symbols corresponds to a full duplex format supporting sidelink transmission via a final symbol of a sidelink allocation. The operations of 2510 may be performed in accordance with examples as disclosed herein. In some examples, aspects of the operations of 2510 may be performed by a resource component 1630 as described with reference to FIG. 16. Additionally, or alternatively, means for performing 2510 may, but not necessarily, include, for example, antenna 1715, transceiver 1710, communications manager 1720, memory 1725 (including code 1730), processor 1735, bus 1740, or any combination thereof.

The following provides an overview of aspects of the present disclosure:

Aspect 1: A method for wireless communications at a first UE, comprising: transmitting, from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, receiving, at the first UE while operating in the full duplex mode, a reverse link message for the network entity via the sidelink signaling from the second UE, and transmitting, by the first UE in accordance with the full duplex mode and the relay report, the reverse link message to the network entity via the uplink signaling while continuing to receive the sidelink signaling from the second UE.

Aspect 2: The method of aspect 1, further comprising: transmitting, via the relay report, a beam report comprising an indication of a plurality of beams, wherein the plurality of beams comprises one or more beams for uplink transmission, one or more beams for sidelink transmission, or both, wherein a cross-link interference value corresponding to the one or more beams for sidelink transmission of the plurality of beams satisfies a first threshold, and wherein a self-interference value corresponding to the one or more beams for uplink transmission of the plurality of beams satisfies a second threshold, or any combination thereof.

Aspect 3: The method of aspect 2, further comprising: transmitting a measurement request message comprising an indication of a plurality of candidate beams, candidate resources, or any combination thereof, for performing one or more channel quality measurements, cross-link interference measurements, or any combination thereof, wherein transmitting the beam report comprising the indication of the plurality of beams is based at least in part on transmitting the measurement request message.

Aspect 4: The method of any of aspects 1 through 3, further comprising: receiving, from the second UE, an indication of a sidelink resource and a sidelink beam selected by the second UE for transmitting the sidelink signaling to the first UE, wherein the relay report comprises an indication of a candidate uplink resource or a candidate uplink beam for the first UE to use for transmitting the uplink signaling via an uplink resource that is associated with the sidelink resource.

Aspect 5: The method of any of aspects 1 through 4, further comprising: receiving, from the network entity, an indication of an uplink resource and an uplink beam selected by the network entity for receiving the uplink signaling from the first UE, and transmitting, to the second UE, an indication of a candidate sidelink beam or a candidate sidelink resource for the second UE to use for transmitting the sidelink signaling via a sidelink resource that is associated with the uplink resource.

Aspect 6: The method of any of aspects 1 through 5, further comprising: transmitting, via the relay report, an indication of one or more sidelink measurement resources (e.g., allocated for transmission of sidelink reference signals by the second UE) for performing cross-link interference measurements by the network entity.

Aspect 7: The method of aspect 6, further comprising: transmitting, to the second UE, an indication of the one or more sidelink measurement resources or of sidelink beams via which the second UE is to transmit sidelink reference signals associated with the cross-link interference measurements.

Aspect 8: The method of any of aspects 6 through 7, further comprising: transmitting, via the relay report, an indication to the network entity of one or more uplink beams to use for performing the cross-link interference measurements corresponding to the one or more sidelink measurement resources.

Aspect 9: The method of any of aspects 1 through 8, further comprising: receiving, from the network entity based at least in part on the relay report, a cross-link interference measurement report corresponding to cross-link interference generated by the second UE, and selecting a sidelink receive beam and an uplink transmit beam based at least in part on having a low corresponding value in the cross-link interference measurement report, wherein transmitting the reverse link message via the uplink signaling while continuing to receive the sidelink signaling in accordance with the full duplex mode is based at least in part on selecting the sidelink receive beam and the uplink transmit beam.

Aspect 10: The method of any of aspects 1 through 9, further comprising: transmitting, via the relay report, an indication that the first UE supports relaying the one or more reverse link messages in the full duplex mode, wherein the network entity allocates sidelink resources to the first UE and the second UE and allocates uplink resources to the UE based at least in part on the indication that the first UE supports relaying, wherein the sidelink resources and the uplink resources at least partially overlap in time according to the full duplex mode.

Aspect 11: The method of aspect 10, further comprising: transmitting, via the relay report, an indication of a quantity of sidelink grants corresponding to respective UEs of a plurality of sidelink UEs comprising the second UE, each of the quantity of sidelink grants for sidelink resources that overlap at least partially in time with uplink resources corresponding to an uplink grant, wherein receiving the sidelink signaling and transmitting the uplink signaling is based at least in part on the indication of the quantity of sidelink grants.

Aspect 12: The method of aspect 11, further comprising: transmitting, via the relay report for each sidelink grant of the quantity of sidelink grants, an indication of one or more parameter values comprising time and frequency resources, a transmit power, a beam identifier, a transmission configuration indicator state identifier, a rank, a precoding matrix, a multi-transmission reception point parameter value, or any combination thereof.

Aspect 13: The method of any of aspects 1 through 12, further comprising: receiving, from the network entity, control signaling scheduling periodic or aperiodic reporting indicating whether the first UE is capable of supporting full duplex relaying, wherein transmitting the relay report is based at least in part on receiving the control signaling.

Aspect 14: The method of any of aspects 1 through 13, further comprising: detecting, between an uplink transmission and a sidelink reception, that self-interference is below a threshold, wherein transmitting the relay report is based at least in part on the detecting.

Aspect 15: The method of any of aspects 1 through 14, wherein transmitting the relay report comprises: multiplexing the relay report with an uplink data message via a physical uplink shared channel or with a control message via a physical uplink control channel.

Aspect 16: The method of any of aspects 1 through 15, further comprising: receiving, from the network entity, an indication of a full duplex relay application time, and exiting the full duplex mode upon expiration of the full duplex relay application time after transmitting the relay report.

Aspect 17: A method for wireless communications at a network entity, comprising: receiving, from a first UE, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity, transmitting an uplink grant to the first UE based at least in part on receiving the relay report, the uplink grant indicating uplink resources for the uplink signaling, the uplink resources at least partially overlapping in time with one or more sidelink resources for the sidelink signaling, and receiving, from the first UE via one or more of the uplink resources associated with the uplink grant, the uplink signaling comprising a reverse link message from the second UE for the network entity.

Aspect 18: The method of aspect 17, further comprising: receiving, via the relay report, an indication of a candidate uplink resource or a candidate uplink beam for the first UE to use for transmitting the uplink signaling via the one or more of the uplink resources, wherein receiving the uplink signaling comprises receiving the uplink signaling via the candidate uplink resource or the candidate uplink beam.

Aspect 19: The method of any of aspects 17 through 18, further comprising: transmitting, to the first UE, an indication of an uplink resource and an uplink beam selected by the network entity for receiving the uplink signaling, wherein receiving the uplink signaling comprises receiving the uplink signaling via the uplink resource or the uplink beam.

Aspect 20: The method of any of aspects 17 through 19, further comprising: receiving, via the relay report, an indication of one or more sidelink measurement resources allocated for transmission of sidelink reference signals by the second UE, for performing cross-link interference measurements by the network entity, receiving the sidelink reference signals via the one or more sidelink measurement resources, and performing one or more cross-link interference measurements based at least in part on receiving the sidelink reference signals.

Aspect 21: The method of aspect 20, further comprising: receiving, via the relay report, an indication of one or more beams associated with the one or more sidelink measurement resources.

Aspect 22: The method of any of aspects 17 through 21, further comprising: transmitting, to the first UE based at least in part on the relay report, a cross-link interference measurement report corresponding to cross-link interference associated with (e.g., generated by) signaling from the second UE.

Aspect 23: The method of any of aspects 17 through 22, further comprising: receiving, via the relay report, an indication that the first UE supports relaying the one or more reverse link messages in the full duplex mode, wherein the network entity allocates sidelink resources to the first UE and the second UE and allocates uplink resources to the first UE based at least in part on the indication that the first UE supports relaying, wherein the sidelink resources and the uplink resources at least partially overlap in time according to the full duplex mode.

Aspect 24: The method of aspect 23, further comprising: receiving, via the relay report, an indication of a quantity of sidelink grants corresponding to respective UEs of a plurality of sidelink UEs comprising the second UE, each of the quantity of sidelink grants for sidelink resources that overlap at least partially in time with uplink resources corresponding to an uplink grant, wherein receiving the uplink signaling is based at least in part on the indication of the quantity of sidelink grants.

Aspect 25: The method of any of aspects 17 through 24, further comprising: transmitting, to the first UE, control signaling scheduling periodic or aperiodic reporting indicating whether the first UE is capable of supporting full duplex relaying, wherein receiving the relay report is based at least in part on transmitting the control signaling.

Aspect 26: A method for wireless communications at a UE, comprising: transmitting a full duplex capability report indicating that the UE is capable of supporting a full duplex mode of communication, receiving, based at least in part on transmitting the full duplex capability report, control signaling indicating a sidelink resource pool comprising a plurality of sidelink symbols, wherein each sidelink symbol of the plurality of sidelink symbols corresponds to a full duplex format, and transmitting sidelink signaling via one or more symbols of the plurality of sidelink symbols according to the full duplex format.

Aspect 27: The method of aspect 26, wherein transmitting the sidelink signaling comprises: transmitting the sidelink signaling via a final symbol of the plurality of sidelink symbols.

Aspect 28: The method of any of aspects 26 through 27, wherein transmitting the sidelink signaling comprises: transmitting the sidelink signaling during a first symbol preceding a second symbol that is adjacent to the first symbol and allocated for a physical sidelink feedback channel.

Aspect 29: The method of aspect 28, further comprising: receiving sidelink feedback signaling via the second symbol based at least in part on the full duplex mode.

Aspect 30: A method for wireless communications at a network entity, comprising: receiving, from a UE a full duplex capability report indicating that the UE is capable of supporting a full duplex mode of communication, and transmitting, based at least in part on receiving the full duplex capability report, control signaling indicating a sidelink resource pool comprising a plurality of sidelink symbols, wherein each sidelink symbol of the plurality of sidelink symbols corresponds to a full duplex format supporting sidelink transmission via a final symbol of a sidelink allocation.

Aspect 31: An apparatus comprising memory, a transceiver, and at least one processor coupled with the memory and the transceiver, the at least one processor configured to perform a method of any of aspects 1 through 16.

Aspect 32: An apparatus for wireless communications at a first UE, comprising at least one means for performing a method of any of aspects 1 through 16.

Aspect 33: A non-transitory computer-readable medium storing code for wireless communications at a first UE, the code comprising instructions executable by a processor to perform a method of any of aspects 1 through 16.

Aspect 34: An apparatus comprising memory and at least one processor coupled with the memory and the transceiver, the at least one processor configured to perform a method of any of aspects 17 through 25.

Aspect 35: An apparatus for wireless communications at a network entity, comprising at least one means for performing a method of any of aspects 17 through 25.

Aspect 36: A non-transitory computer-readable medium storing code for wireless communications at a network entity, the code comprising instructions executable by a processor to perform a method of any of aspects 17 through 25.

Aspect 37 An apparatus comprising memory, a transceiver, and at least one processor coupled with the memory and the transceiver, the at least one processor configured to perform a method of any of aspects 26 through 29.

Aspect 38: An apparatus for wireless communications at a UE, comprising at least one means for performing a method of any of aspects 26 through 29.

Aspect 39: A non-transitory computer-readable medium storing code for wireless communications at a UE, the code comprising instructions executable by a processor to perform a method of any of aspects 26 through 29.

Aspect 40: An apparatus comprising memory and at least one processor coupled with the memory and the transceiver, the at least one processor configured to perform a method of aspect 30.

Aspect 41: An apparatus for wireless communications at a network entity, comprising at least one means for performing a method of aspect 30.

Aspect 42: A non-transitory computer-readable medium storing code for wireless communications at a network entity, the code comprising instructions executable by a processor to perform a method of any of aspects 30 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as any combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
- memory;
- a transceiver; and
- at least one processor of a first user equipment (UE), the at least one processor coupled with the memory and the transceiver and configured to cause the apparatus to:
  - transmit, via the transceiver and from the first UE to a network entity, a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity;
  - receive, via the transceiver and while operating in the full duplex mode, a reverse link message for the network entity via the sidelink signaling from the second UE; and
  - transmit, via the transceiver and in accordance with the full duplex mode and the relay report, the reverse link message to the network entity via the uplink signaling while continuing to receive the sidelink signaling from the second UE.

2. The apparatus of claim 1, the at least one processor further configured to cause the apparatus to:
- transmit, via the transceiver and via the relay report, a beam report comprising an indication of a plurality of beams, wherein the plurality of beams comprises one or more beams for uplink transmission, one or more beams for sidelink transmission, or both, wherein a cross-link interference value corresponding to the one or more beams for sidelink transmission of the plurality of beams satisfies a first threshold, and wherein a self-interference value corresponding to the one or more beams for uplink transmission of the plurality of beams satisfies a second threshold, or any combination thereof.

3. The apparatus of claim 2, the at least one processor further configured to cause the apparatus to:
- transmit, via the transceiver, a measurement request message comprising an indication of a plurality of candidate beams, candidate resources, or any combination thereof, for performing one or more channel quality measurements, cross-link interference measurements, or any combination thereof, wherein the at least one processor is configured to cause the apparatus to transmit the beam report comprising the indication of the plurality of beams based at least in part on transmitting the measurement request message.

4. The apparatus of claim 1, the at least one processor further configured to cause the apparatus to:

receive, via the transceiver and from the second UE, an indication of a sidelink resource and a sidelink beam selected by the second UE for transmitting the sidelink signaling to the first UE, wherein the relay report comprises an indication of a candidate uplink resource or a candidate uplink beam for the first UE to use for transmitting the uplink signaling via an uplink resource that is associated with the sidelink resource.

5. The apparatus of claim 1, the at least one processor further configured to cause the apparatus to:

receive, via the transceiver and from the network entity, an indication of an uplink resource and an uplink beam selected by the network entity for receiving the uplink signaling from the first UE; and transmit, to the second UE, an indication of a candidate sidelink beam or a candidate sidelink resource for the second UE to use for transmitting the sidelink signaling via a sidelink resource that is associated with the uplink resource.

6. The apparatus of claim 1, the at least one processor further configured to cause the apparatus to:

transmit, via the transceiver and via the relay report, an indication of one or more sidelink measurement resources for performing cross-link interference measurements by the network entity.

7. The apparatus of claim 6, the at least one processor further configured to cause the apparatus to:

transmit, via the transceiver and to the second UE, an indication of the one or more sidelink measurement resources or of sidelink beams via which the second UE is to transmit sidelink reference signals associated with the cross-link interference measurements.

8. The apparatus of claim 6, the at least one processor further configured to cause the apparatus to:

transmit, via the transceiver and via the relay report, an indication to the network entity of one or more uplink beams to use for performing the cross-link interference measurements corresponding to the one or more sidelink measurement resources.

9. The apparatus of claim 1, the at least one processor further configured to cause the apparatus to:

receive, via the transceiver and from the network entity based at least in part on the relay report, a cross-link interference measurement report corresponding to cross-link interference generated by the second UE; and select a sidelink receive beam and an uplink transmit beam based at least in part on having a low corresponding value in the cross-link interference measurement report, wherein the at least one processor is configured to cause the apparatus to transmit the reverse link message via the uplink signaling while continuing to receive the sidelink signaling in accordance with the full duplex mode based at least in part on selecting the sidelink receive beam and the uplink transmit beam.

10. The apparatus of claim 1, the at least one processor further configured to cause the apparatus to:

transmit, via the transceiver and via the relay report, an indication that the first UE supports relaying the one or more reverse link messages in the full duplex mode, wherein an allocation of sidelink resources to the first UE and the second UE and an allocation of uplink resources to the UE are based at least in part on the indication that the first UE supports relaying, and wherein the sidelink resources and the uplink resources at least partially overlap in time according to the full duplex mode.

11. The apparatus of claim 10, the at least one processor further configured to cause the apparatus to:

transmit, via the transceiver and via the relay report, an indication of a quantity of sidelink grants corresponding to respective UEs of a plurality of sidelink UEs comprising the second UE, each of the quantity of sidelink grants for sidelink resources that overlap at least partially in time with uplink resources corresponding to an uplink grant, wherein the at least one processor is configured to cause the apparatus to receive the sidelink signaling and transmit the uplink signaling based at least in part on the indication of the quantity of sidelink grants.

12. The apparatus of claim 11, the at least one processor further configured to cause the apparatus to:

transmit, via the transceiver and via the relay report for each sidelink grant of the quantity of sidelink grants, an indication of one or more parameter values comprising time and frequency resources, a transmit power, a beam identifier, a transmission configuration indicator state identifier, a rank, a precoding matrix, a multi-transmission reception point parameter value, or any combination thereof.

13. The apparatus of claim 1, the at least one processor further configured to cause the apparatus to:

receive, via the transceiver and from the network entity, control signaling scheduling periodic or aperiodic reporting indicating whether the first UE is capable of supporting full duplex relaying, wherein the at least one processor is configured to cause the apparatus to transmit the relay report based at least in part on receiving the control signaling.

14. The apparatus of claim 1, the at least one processor further configured to cause the apparatus to:

detect, between an uplink transmission and a sidelink reception, that self-interference is below a threshold, wherein the at least one processor is configured to cause the apparatus to transmit the relay report based at least in part on the detecting.

15. The apparatus of claim 1, wherein, to transmit the relay report, the at least one processor is configured to cause the apparatus to:

multiplex the relay report with an uplink data message via a physical uplink shared channel or with a control message via a physical uplink control channel.

16. The apparatus of claim 1, the at least one processor further configured to cause the apparatus to:

receive, via the transceiver and from the network entity, an indication of a full duplex relay application time; and exit the full duplex mode upon expiration of the full duplex relay application time after transmitting the relay report.

17. An apparatus for wireless communications, comprising:

memory; and at least one processor of a network entity, the at least one processor coupled with the memory and configured to cause the apparatus to:

receive, from a first user equipment (UE), a relay report associated with operation of the first UE in a full duplex mode to relay one or more reverse link messages from a second UE to the network entity, the one or more reverse link messages for receipt by the first UE via sidelink signaling from the second UE and transmission by the first UE via uplink signaling to the network entity;

transmit an uplink grant to the first UE based at least in part on receiving the relay report, the uplink grant indicating uplink resources for the uplink signaling, the uplink resources at least partially overlapping in time with one or more sidelink resources for the sidelink signaling; and receive, from the first UE via one or more of the uplink resources associated with the uplink grant, the uplink signaling comprising a reverse link message from the second UE for the network entity.

18. The apparatus of claim 17, the at least one processor further configured to cause the apparatus to:

receive, via the relay report, an indication of a candidate uplink resource or a candidate uplink beam for the first UE to use for transmitting the uplink signaling via the one or more of the uplink resources, wherein, to receive the uplink signaling, the at least one processor is configured to cause the apparatus to receive the uplink signaling via the candidate uplink resource or the candidate uplink beam.

19. The apparatus of claim 17, the at least one processor further configured to cause the apparatus to:

transmit, to the first UE, an indication of an uplink resource and an uplink beam selected by the network entity for receiving the uplink signaling, wherein, to receive the uplink signaling, the at least one processor is configured to cause the apparatus to receive the uplink signaling via the uplink resource or the uplink beam.

20. The apparatus of claim 17, the at least one processor further configured to cause the apparatus to:

receive, via the relay report, an indication of one or more sidelink measurement resources allocated for transmission of sidelink reference signals by the second UE, for performing cross-link interference measurements by the network entity;

receive the sidelink reference signals via the one or more sidelink measurement resources; and perform one or more cross-link interference measurements based at least in part on receiving the sidelink reference signals.

21. The apparatus of claim 20, the at least one processor further configured to cause the apparatus to:

receive, via the relay report, an indication of one or more beams associated with the one or more sidelink measurement resources.

22. The apparatus of claim 17, the at least one processor further configured to cause the apparatus to:

transmit, to the first UE based at least in part on the relay report, a cross-link interference measurement report corresponding to cross-link interference associated with signaling from the second UE.

23. The apparatus of claim 17, the at least one processor further configured to cause the apparatus to:

receive, via the relay report, an indication that the first UE supports relaying the one or more reverse link messages in the full duplex mode, wherein an allocation of sidelink resources to the first UE and the second UE and an allocation of uplink resources to the first UE are based at least in part on the indication that the first UE supports relaying, wherein the sidelink resources and the uplink resources at least partially overlap in time according to the full duplex mode.

24. The apparatus of claim 23, the at least one processor further configured to cause the apparatus to:

receive, via the relay report, an indication of a quantity of sidelink grants corresponding to respective UEs of a plurality of sidelink UEs comprising the second UE, each of the quantity of sidelink grants for sidelink resources that overlap at least partially in time with uplink resources corresponding to an uplink grant, wherein the at least one processor is configured to cause the apparatus to receive the uplink signaling based at least in part on the indication of the quantity of sidelink grants.

25. The apparatus of claim 17, the at least one processor further configured to cause the apparatus to:

transmit, to the first UE, control signaling scheduling periodic or aperiodic reporting indicating whether the first UE is capable of supporting full duplex relaying, wherein the at least one processor is configured to cause the apparatus to receive the relay report based at least in part on transmitting the control signaling.

26. An apparatus for wireless communications, comprising:

memory;

a transceiver; and at least one processor of a user equipment (UE), the at least one processor coupled with the memory and the transceiver and configured to cause the apparatus to:

transmit, via the transceiver, a full duplex capability report indicating that the UE is capable of supporting a full duplex mode of communication;

receive, via the transceiver and based at least in part on transmitting the full duplex capability report, control signaling indicating a sidelink resource pool comprising a plurality of sidelink symbols, wherein each sidelink symbol of the plurality of sidelink symbols corresponds to a full duplex format; and transmit, via the transceiver, sidelink signaling via one or more symbols of the plurality of sidelink symbols according to the full duplex format.

27. The apparatus of claim 26, wherein, to transmit the sidelink signaling, the at least one processor is configured to cause the apparatus to:

transmit, via the transceiver, the sidelink signaling via a final symbol of the plurality of sidelink symbols.

28. The apparatus of claim 26, wherein, to transmit the sidelink signaling, the at least one processor is configured to cause the apparatus to:

transmit, via the transceiver, the sidelink signaling during a first symbol preceding a second symbol that is adjacent to the first symbol and allocated for a physical sidelink feedback channel.

29. The apparatus of claim 28, the at least one processor further configured to cause the apparatus to:

receive, via the transceiver, sidelink feedback signaling via the second symbol based at least in part on the full duplex mode.

30. An apparatus for wireless communications, comprising:

memory; and at least one processor of a network entity, the at least one processor coupled with the memory and configured to cause the apparatus to:

receive, from a user equipment (UE) a full duplex capability report indicating that the UE is capable of supporting a full duplex mode of communication; and transmit, based at least in part on receiving the full duplex capability report, control signaling indicating a sidelink resource pool comprising a plurality of sidelink symbols, wherein each sidelink symbol of the plurality of sidelink symbols corresponds to a full duplex format supporting sidelink transmission via a final symbol of a sidelink allocation.

* * * * *